(12) United States Patent
Bursch et al.

(10) Patent No.: US 11,934,166 B2
(45) Date of Patent: Mar. 19, 2024

(54) SYSTEMS AND METHODS FOR MANAGING ENERGY AND AIR QUALITY

(71) Applicants: Paul Bursch, McMinnville, OR (US); David Burchfield, McMinnville, OR (US); Bao Tran, Saratoga, CA (US)

(72) Inventors: Paul Bursch, McMinnville, OR (US); David Burchfield, McMinnville, OR (US); Bao Tran, Saratoga, CA (US)

(73) Assignee: Building Lens Inc., Portland, OR (US)

(*) Notice: Subject to any disclaimer, the term of this patent is extended or adjusted under 35 U.S.C. 154(b) by 0 days.

(21) Appl. No.: 17/717,107

(22) Filed: Apr. 10, 2022

(65) Prior Publication Data
US 2023/0324864 A1    Oct. 12, 2023

(51) Int. Cl.
G05B 19/042 (2006.01)

(52) U.S. Cl.
CPC .... G05B 19/042 (2013.01); *G05B 2219/2614* (2013.01)

(58) Field of Classification Search
CPC ........................ G05B 19/042; G05B 2219/2614
See application file for complete search history.

(56) References Cited

U.S. PATENT DOCUMENTS

| | | | |
|---|---|---|---|
| 11,056,242 B1* | 7/2021 | Jain | G16H 10/60 |
| 2015/0070181 A1* | 3/2015 | Fadell | G08B 21/22 340/628 |
| 2018/0154297 A1* | 6/2018 | Maletich | F24F 8/10 |
| 2020/0166235 A1* | 5/2020 | Marra | F24F 7/003 |
| 2020/0240668 A1* | 7/2020 | Bassa | G05B 13/028 |
| 2020/0393152 A1* | 12/2020 | Ramirez | F24F 1/42 |
| 2022/0010996 A1* | 1/2022 | Carrieri | F24F 11/58 |
| 2022/0042694 A1* | 2/2022 | He | F24F 11/88 |
| 2022/0057099 A1* | 2/2022 | Clement | F24F 11/74 |
| 2022/0196276 A1* | 6/2022 | Mou | F24F 11/88 |
| 2022/0307715 A1* | 9/2022 | Linden | B01D 46/0028 |
| 2023/0014295 A1* | 1/2023 | Davis | F24F 3/16 |
| 2023/0250988 A1* | 8/2023 | Risbeck | F24F 8/22 700/276 |
| 2023/0273576 A1* | 8/2023 | Douglas | G05B 15/02 700/276 |

* cited by examiner

*Primary Examiner* — Michael W Choi
(74) *Attorney, Agent, or Firm* — Patent PC; Bao Tran

(57) ABSTRACT

A management system makes decisions using local and national outdoor air quality data, public health data, and building and occupant information. The system addresses the balance between healthy air and energy efficiency.

20 Claims, 24 Drawing Sheets

AirLens_Summary

Views: New View

Dashboards: Default Dashboard

Weather
| | |
|---|---|
| Site | Test Site 1 |
| Observation Time | 4/29/2022 9:10 PM |
| Sky | Clouds |
| Temperature | 50 °F |
| Feels Like | 44 °F |
| Humidity | 91% |
| Pressure | 999 mbar |
| WindSpeed | 17 mph |
| WindDirection | 110° |

Data from © OpenWeather

Pollution
| | | |
|---|---|---|
| Site | Test Site 1 | |
| Observation Time | 4/29/2022 9:00 PM | |
| Air Quality Index | 2 | Moderate |
| Carbon Monoxide | 274 μg/m³ | Good |
| Nitrogen Dioxide | 5.27 μg/m³ | Good |
| Ozone | 88.69 μg/m³ | Good |
| Particulate Matter 2.5 μm | 3.58 μg/m³ | Good |
| Particulate Matter 10 μm | 3.68 μg/m³ | Good |

Data from © OpenWeather
AQI Levels/Colors from Wikipedia

Covid 19
| | |
|---|---|
| Site | Test Site 1 |
| Observation Date | 4/29/2022 |
| Cases(7 day)/100K | 77 |
| Testing Positive | 6.2% |
| Community Transmission | |

Data from CDC

| |
|---|
| Users are enrolled in the contact tracing system (voluntarily or by operation of law) |
| Mobile devices comply with a standard to share contact tracing data with health authority |
| During use, mobile devices form a mesh network that captures the ID of every phone within a predetermined radius of the user phone |
| Periodically phone contact tracing data is uploaded and a contact trace list is maintained for a period of time |
| Mobile device can interface with a mobile pathogen sensor accessory or built-in sensor, and can also keep track of user temperature, heart rate, breathing rate to auto detect of a pandemic or mass pathogen exposure event |
| If the user tests positive for pathogen exposure, everyone in immediate contact with the user is contacted to seek medical review or treatment |

FIG. 15
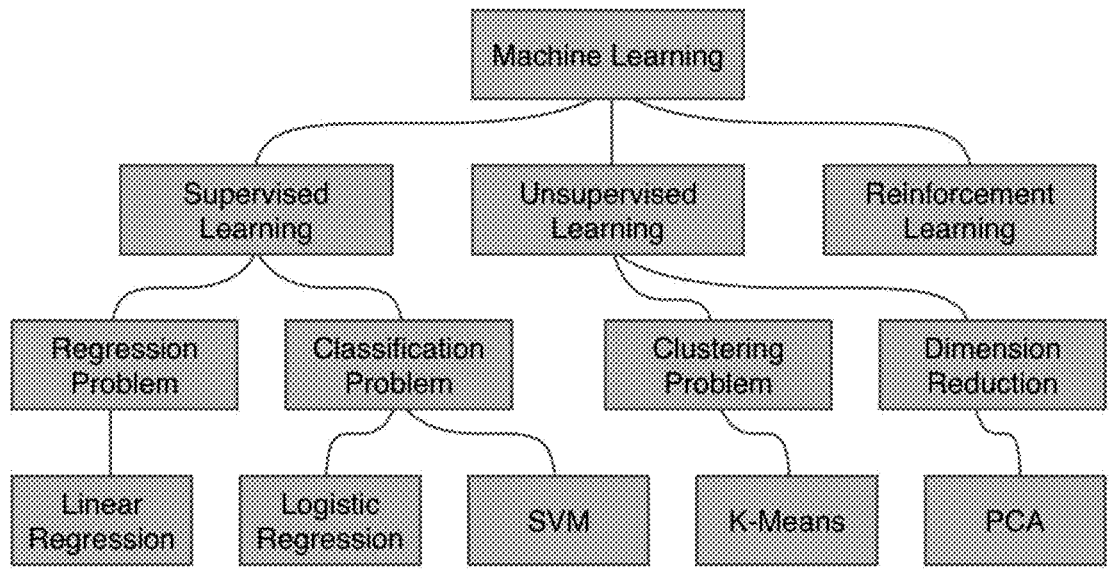
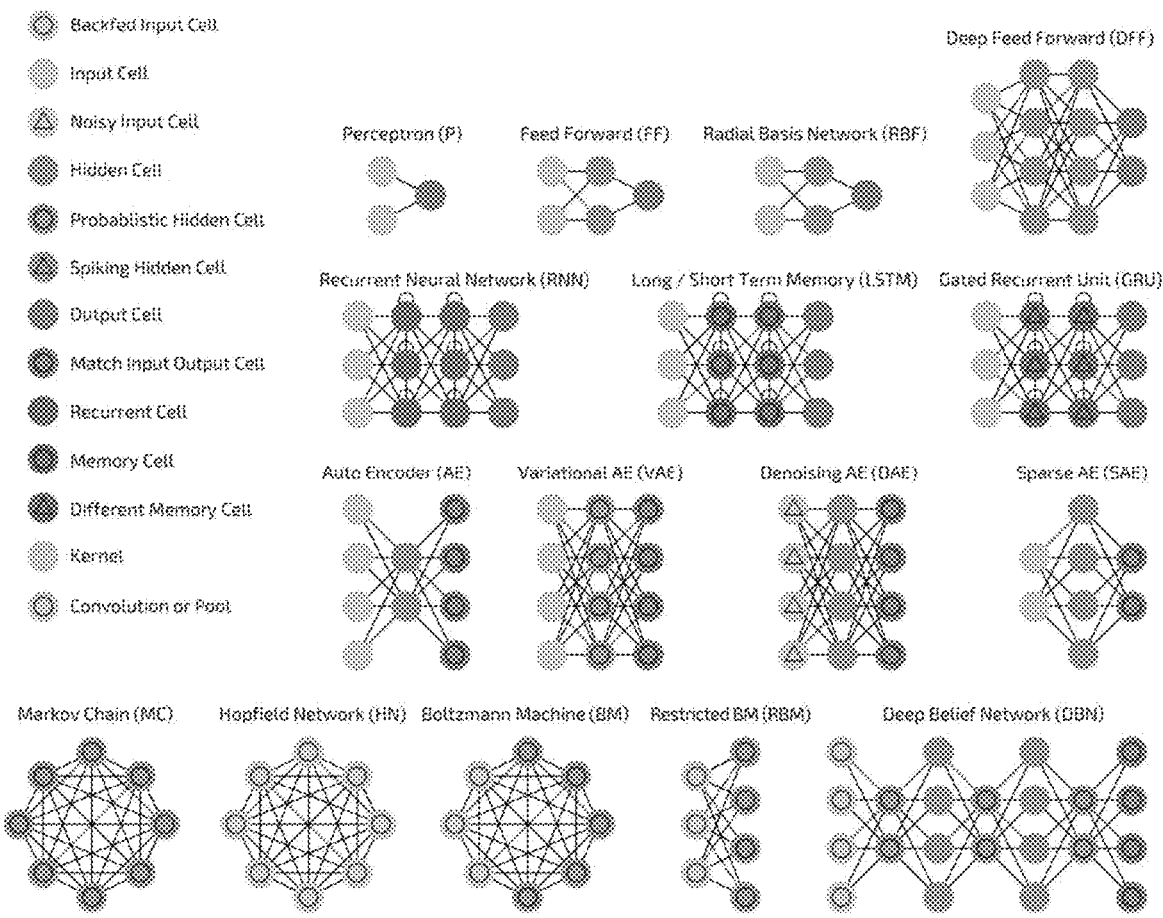

SYSTEMS AND METHODS FOR MANAGING ENERGY AND AIR QUALITY

The present invention relates to systems and methods to manage air quality and energy consumption.

BACKGROUND

The recent COVID pandemic illustrated the importance of air flow control on public health. While there is no clear evidence currently, fans and air conditioners do move air around in a room, so they theoretically pose a risk of spreading viral particles and droplets. COVID-19 is spread via droplets and airborne particles. COVID-infected people can exhale particles and droplets from respiratory fluids containing the SARS CoV-2 virus. These aerosol particles can be visible or microscopic in size. When infectious particles and droplets are exhaled, they travel outward from the source (the person). These particles carry the virus and can transmit infection. Indoors, these particles and very fine droplets can spread throughout the room and space. COVID-19 can be transmitted by contact with respiratory fluids containing the infectious SARS-2 virus. A person may become infected if they cough or speak near an infected person. Inhaling aerosol particles can expose them to the virus. Inhalation of virus can cause COVID-19 to spread at greater distances than six feet. Infected persons can spread particles throughout a room or indoor space. Even if the person leaves the room, the particles may remain in the air for hours. You can also expose someone by spraying liquids on their mucous membranes.

In a parallel trend, indoor airborne organic chemicals and odors are increasing in invisible levels in the air. It is usually two to five times more than what one would find outdoors. Volatile organic compounds (VOCs), a group of potentially harmful contaminants, are easily evaporated at room temperature. Some volatile organic compounds can be smelt strongly, but others are not odorous. The level of exposure to this group of chemicals is not determined by their odor. There are many different volatile organic compounds that are produced every day. Examples include acetone and benzene as well as ethylene glycol, formaldehyde and methylene chloride. Products such as carpets and adhesives, upholstery fabrics, vinyl flooring, composite wood products, paints and varnishes, sealing caulks and glues, as well home care products, can often release volatile organic compounds. air fresheners, air Cleaning and disinfecting chemicals, cosmetics and cigarette smoke are all sources of ozone. Cooking, cleaning up carpets, cleaning out the house, cleaning out the toilet, cleaning up after pets, cleaning up after children, cleaning up after pets, cleaning up after pets, cleaning up after children, cleaning up after pets, cleaning up after pets, cleaning up after pets, cleaning up after cats, cleaning your home, cleaning your house, cleaning your home, cleaning your house, cleaning your home, cleaning and disinfecting chemicals, cleaning up after pets, cleaning and cleaning, cleaning and maintaining your house, cleaning and vacuuming, cleaning and vacuuming, among others.

Inhaling biohazards such as Covid virus or harmful chemicals can pose health hazards depending on the amount of chemical in the air, how long and how frequently a person inhales and exhales the chemical. Scientists consider short-term (acute exposures) as exposures that last between hours and days. Long-term exposures (chronic exposures) can be years or even lifetimes. Some people may have health problems if they are exposed to low levels of volatile organic chemicals for long periods. Many studies have shown that people with asthma or sensitive skin to chemicals may experience worsening symptoms from exposure to volatile organic compound. Acute short-term exposure to high levels volatile organic compounds can cause irritation of the eye, nose, throat, and stomach. It may also lead to headaches, nausea vomiting, dizziness, or worsening asthma symptoms. Long-term (chronic) exposure to high levels volatile organic compounds increases the risk of cancer, liver damage and kidney damage as well as central nervous system damage.

SUMMARY

In one aspect, a management system makes decisions using local and national outdoor air quality data, public health data, and building and occupant information address the balance between healthy air and energy efficiency.

In another aspect, a method to manage air quality in a space includes:
collecting air flow data, energy consumption data, and air quality data from one or more sensors in the space;
performing sensor data fusion to bring together a community of data sources to trigger control system adjustments from a variety of sources to minimize energy usage;
collecting environmental and public health data to calculate risk assessments and apply mitigation tactics while optimizing building occupant health and energy efficiency; and
controlling air conditioning system in a closed loop to provide air quality in the space.

One implementation provides air sensors and augmented them with other sensors in geometric proximity (same neighborhood). Those other sources/sensors can come from nearby government (federal, local, city) sites, internet reporting sites and AQI vendor partnerships. Thus, the system has multiple sources of air quality for a given site. The system uses this information and AI fusion techniques to produce a fault tolerant assessment of air quality current conditions and forecast estimates. Additionally, these results can be used to check on the air sensors sensors to determine if they are out of calibration and initiate repair actions. Later, after the sensors saturates a given area, the system can lower cost by no longer needing to install outdoor sensors at all sites.

Advantages of the system may include one or more of the following. The system can improve air quality in a building while maintaining energy efficiency. The system may assess the nexus between energy efficiency and improving indoor air quality. Air quality is managed without adversely affecting energy consumption.

The system minimizes Covid transmission, as most Covid-19 transmission happens indoors, much of it through airborne virus-carrying particles known as aerosols, which are created when an infected person laughs, speaks or breathes. Aerosols linger in the air and can travel across rooms. The system efficiently cleans indoor air with proper ventilation, or pumping virus-laden air outdoors and replacing it with fresh air; filtration, which passes air through a filter that traps viral particles; and disinfection—killing viral particles in the air using ultraviolet light. Each strategy dilutes the amount of potential virus in the air and makes it less likely that an infected person would infect other people. Other potential benefits may include:

1. Integrate available environmental and public health data streams into a single platform to calculate risk assessments and apply appropriate mitigation tactics while optimizing building occupant health and energy efficiency.
2. Quantify relationships between exposure to indoor contaminants and the health of the building occupants
3. Develop and validate indoor air contaminant risk-mitigation control strategies for building HVAC equipment.
4. Assess the energy consumption impacts of these indoor air contaminant risk-mitigation strategies.

The system achieves sustainable, resilient building operation with a balance between energy efficiency and indoor air quality. To promote national health and be stewards of our limited resources, the system actively manages the connection between energy efficiency and Indoor Air Quality (IAQ) and applying the best practices defines the nexus.

Integrating state-of-the-art technology and available information, researching indoor airflow patterns and the effects of air contaminants on different demographics leads to applying automated best practices for building ventilation.

BRIEF DESCRIPTION OF THE DRAWINGS

FIGS. 13-14 shows more details one implementation of the air management system.

FIG. 15 shows exemplary AI networks to perform air management.

DETAILED DESCRIPTION

FIGS. 1A-1H show an exemplary air management system. The system includes sensors and software that monitor airflow patterns typical in small commercial buildings using Computational Fluid Dynamics (CFD) and indoor air contaminants' health effect on people in various building types by identifying consensus positions. The model of airflow patterns using CFD for typical ventilation systems can be used to inform proper placement of IAQ sensors The online software platform analyzes buildings to determine both their energy and IAQ baselines. The research, software, and building information are integrated, and automatic building control algorithms are implemented, delivering the best possible IAQ while considering the people in the building and energy use effects. This platform will be easily integrated with any Web-Based Building Management System (BMS), making IAQ information readily available to any user. The application of this turnkey solution gives actionable information to facility managers and clearly defines the nexus between energy efficiency and healthy indoor air. The system can be deployed at government institutions, commercial portfolios, and individual buildings.

In the following discussions, the following terms/abbreviations are used:

| | |
|---|---|
| ACH | Air Change per Hour |
| CAMS | Clean Air Management System |
| CFD | Computational Fluid Dynamics |
| CO2 | Carbon Dioxide |
| HVAC | Heating, Ventilation, and Air Conditioning |
| IAQ | Indoor Air Quality |
| inWC | Inches Water Column |
| OAF | Outside Air Fraction |
| PM | Particulate Matter |

The operation includes the following steps:
collecting air flow data, energy consumption data, and air quality data from one or more sensors in the space;
performing sensor data fusion to bring together a community of data sources to trigger control system adjustments from a variety of sources to minimize energy usage;
collecting environmental and public health data to calculate risk assessments and apply mitigation tactics while optimizing building occupant health and energy efficiency; and
controlling air conditioning system in a closed loop to provide the predetermined air quality in the space.

The system includes a software Suite of tools for Building data monitoring, analysis and control. The Cloud Software Suite of Applications (SuperApp) Providing Intelligent Tools for Buildings Services. It Integrates Smart Building Systems (Building Service Providers) Providing Monitoring, Analytic and Supervisory services.

Figures 1, 1A:
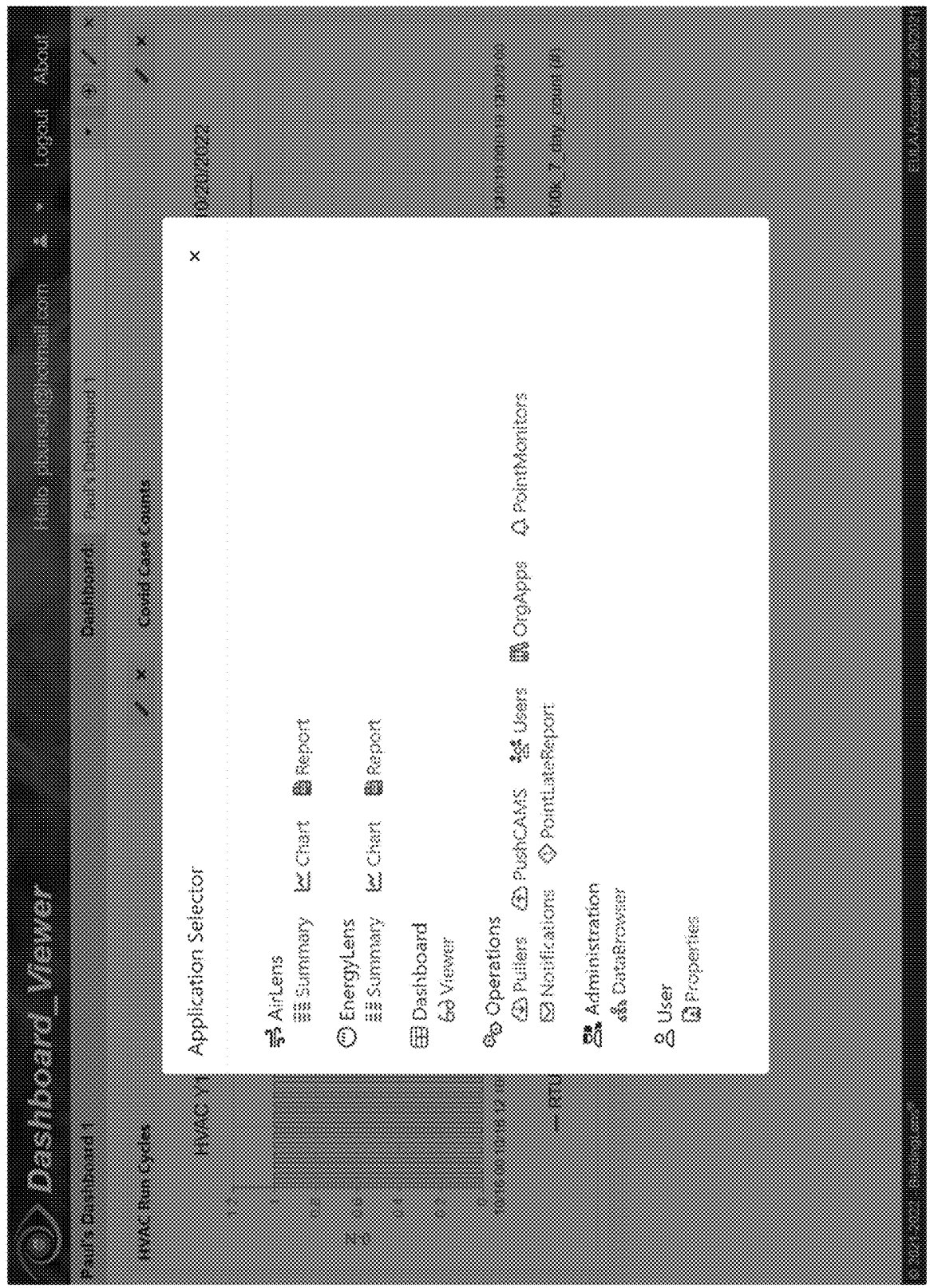
FIGS. 1A-1H show an exemplary air management system.
Figures 1, 1A, 2:
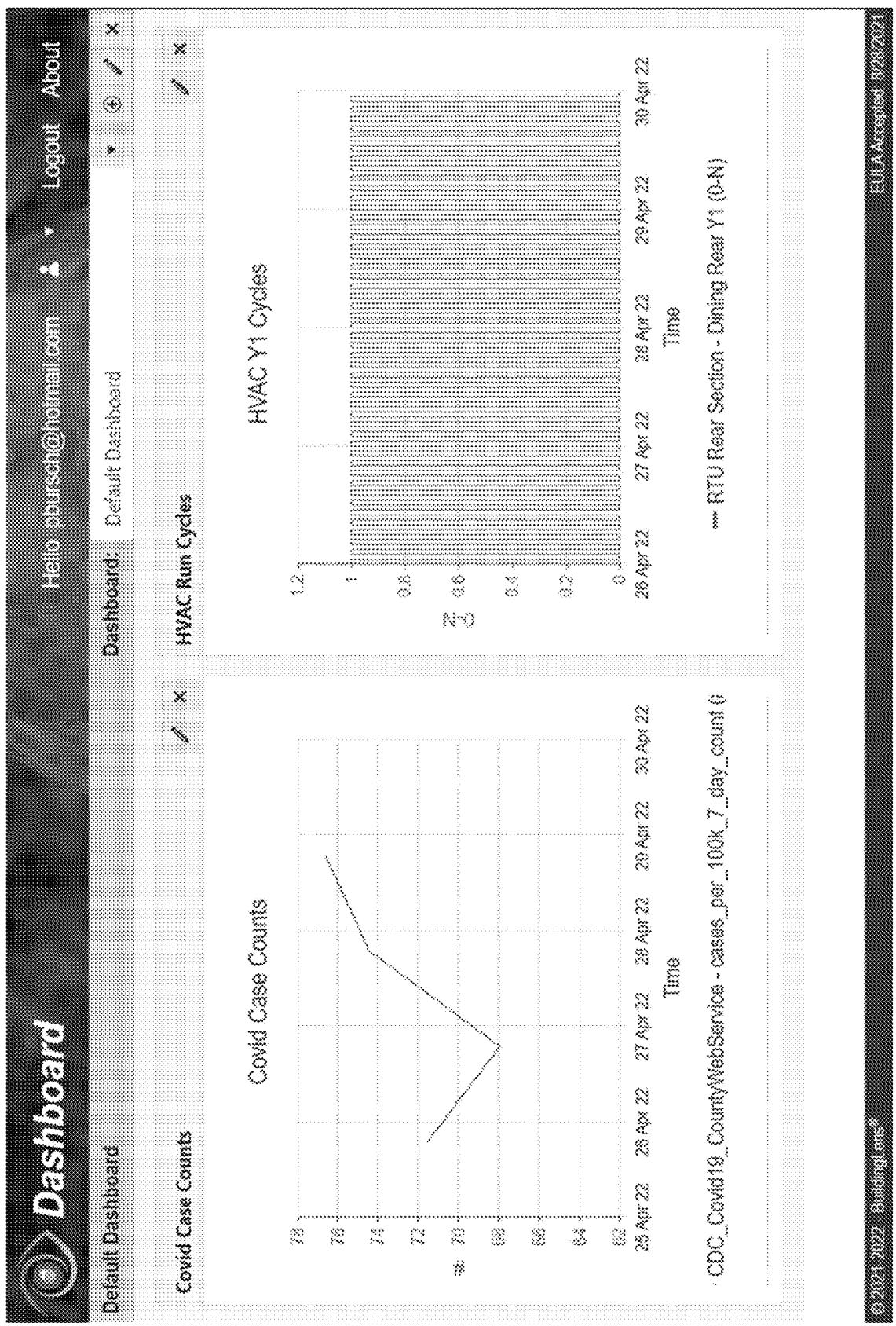
FIG. 2 shows an exemplary Alg. 5.1—Flow Diagram to Maintain/implement the correct relative pressure in each space.
Figure 1B:
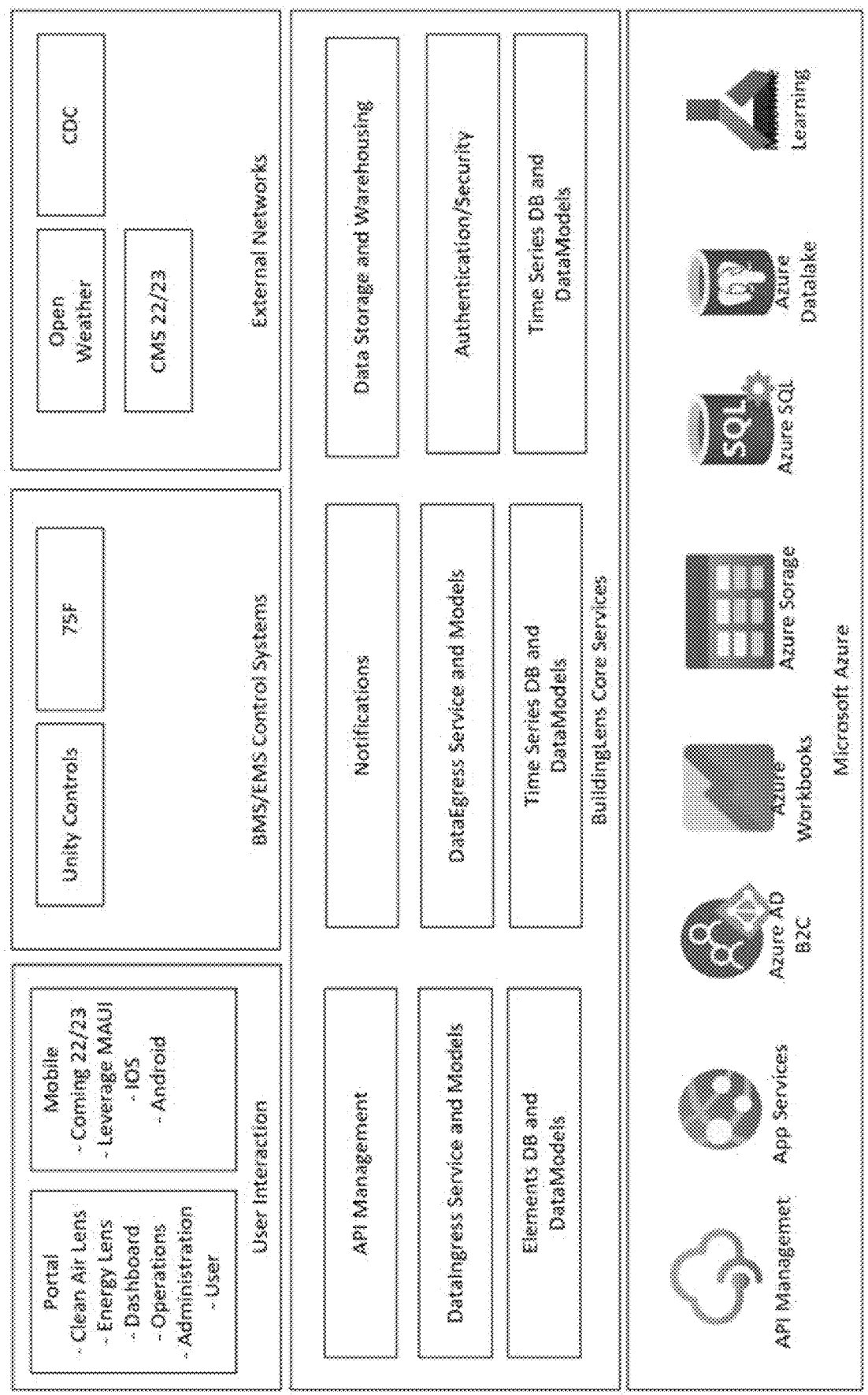
Figure 1C:
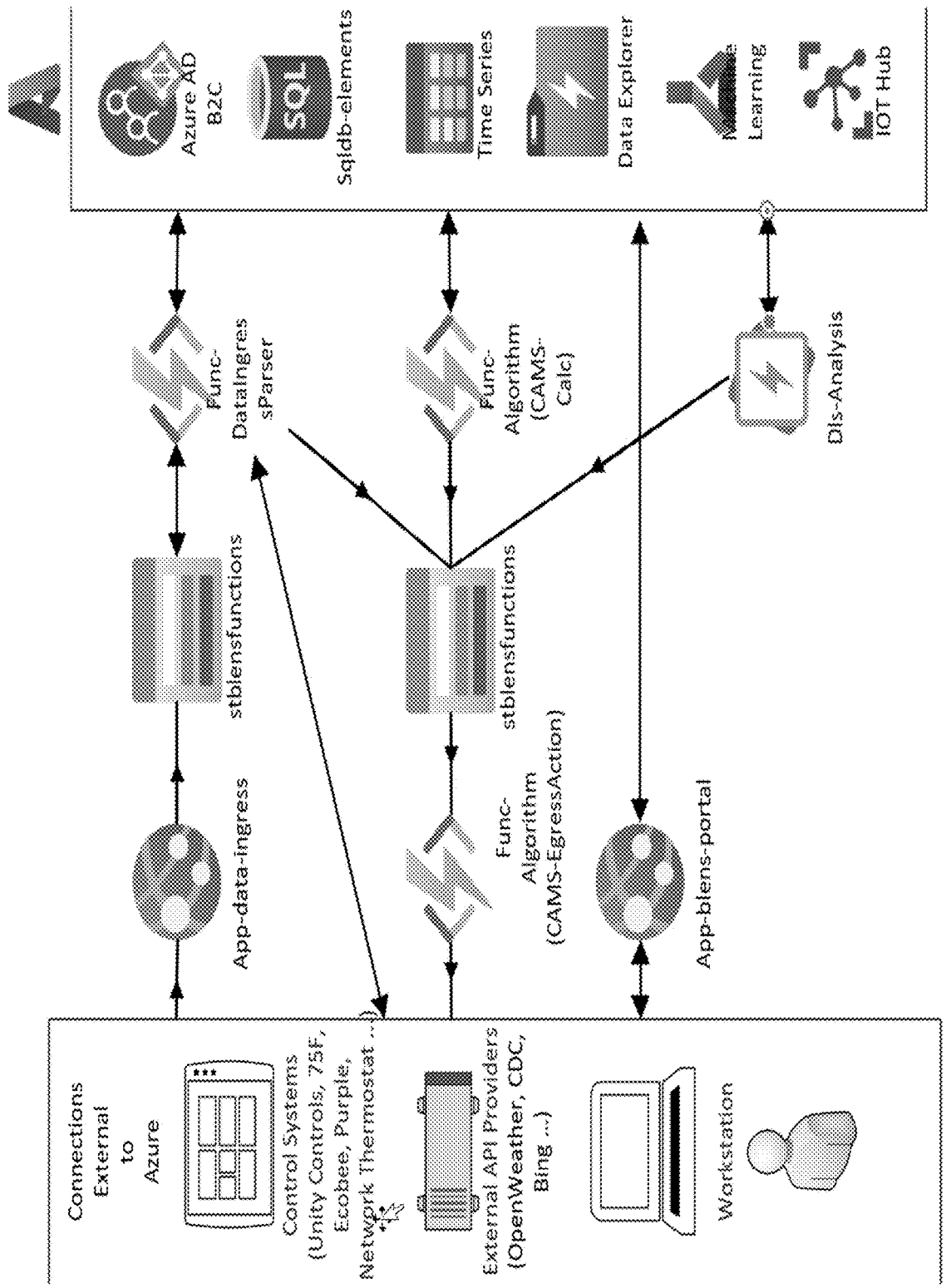
Figure 1D:
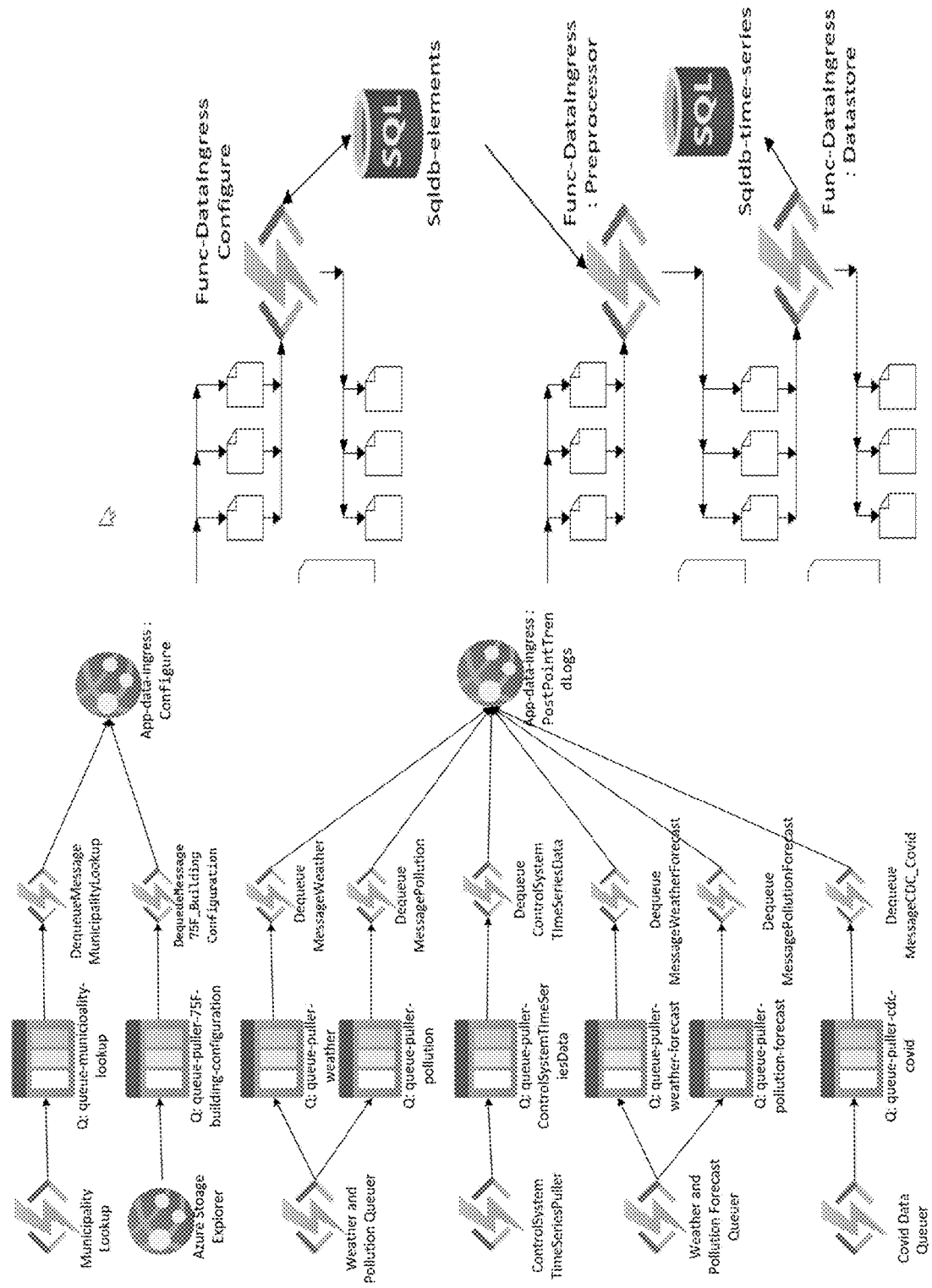
Figure 1E:
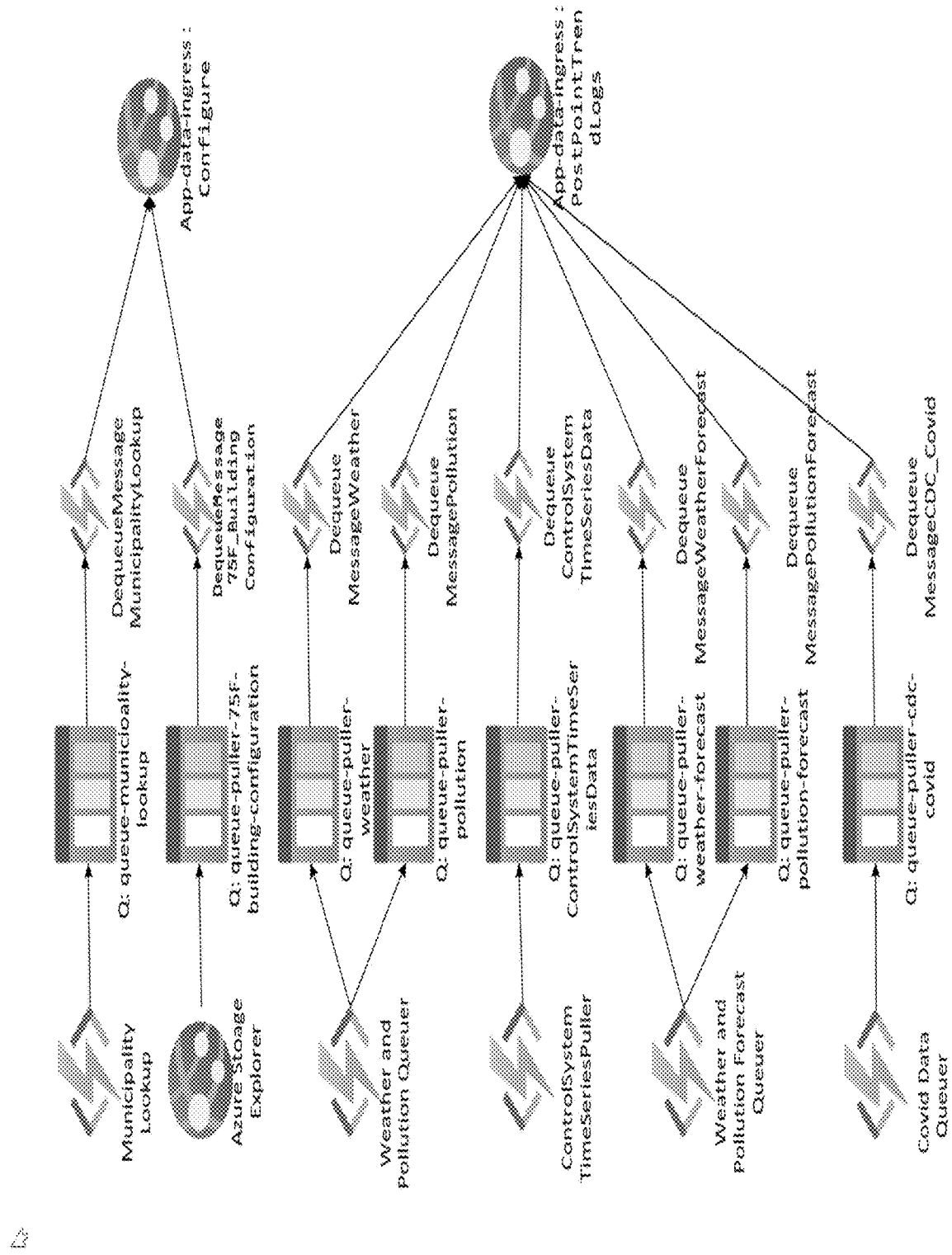
Figure 1F:
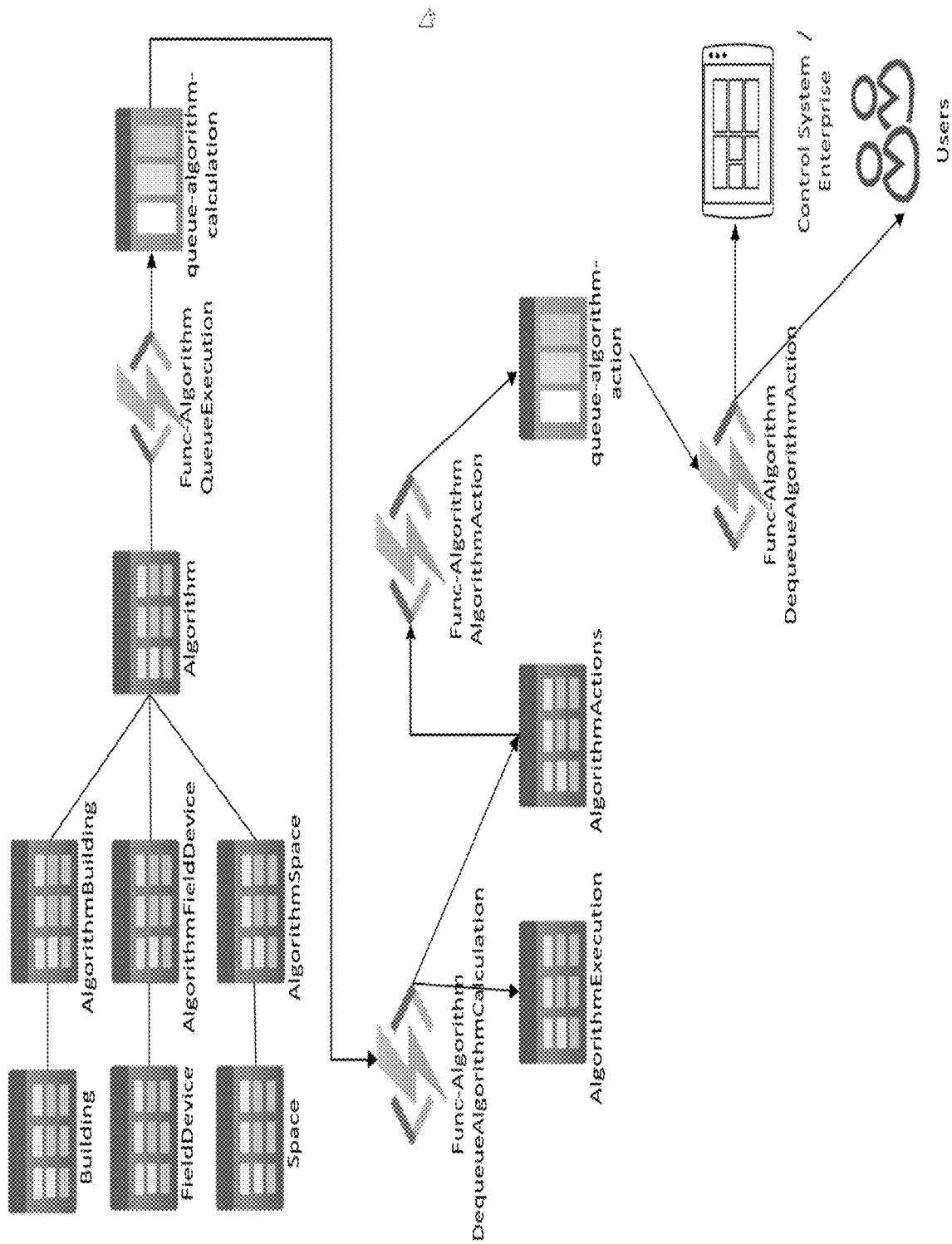
Figure 1G:
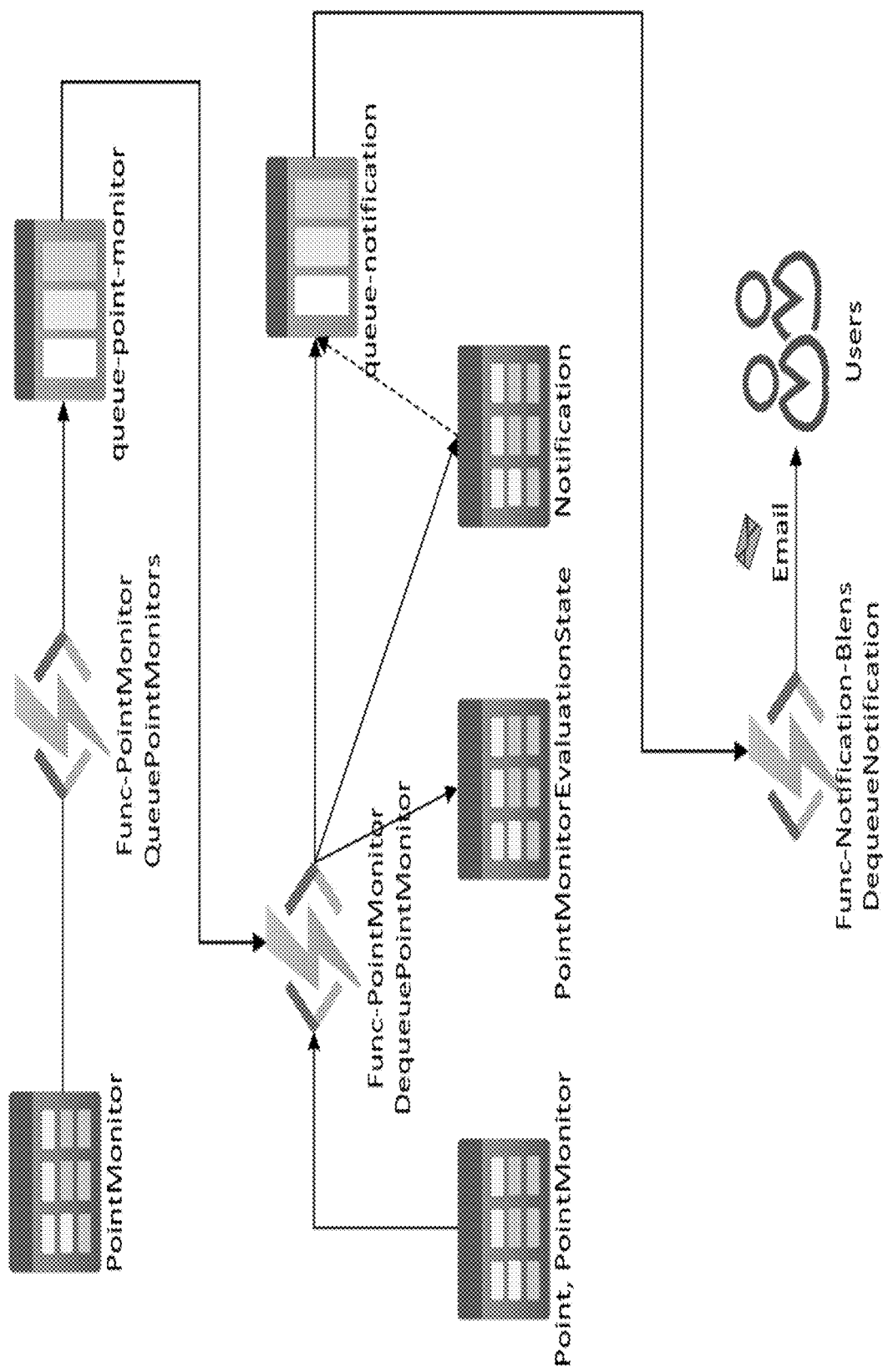
Figure 1H:
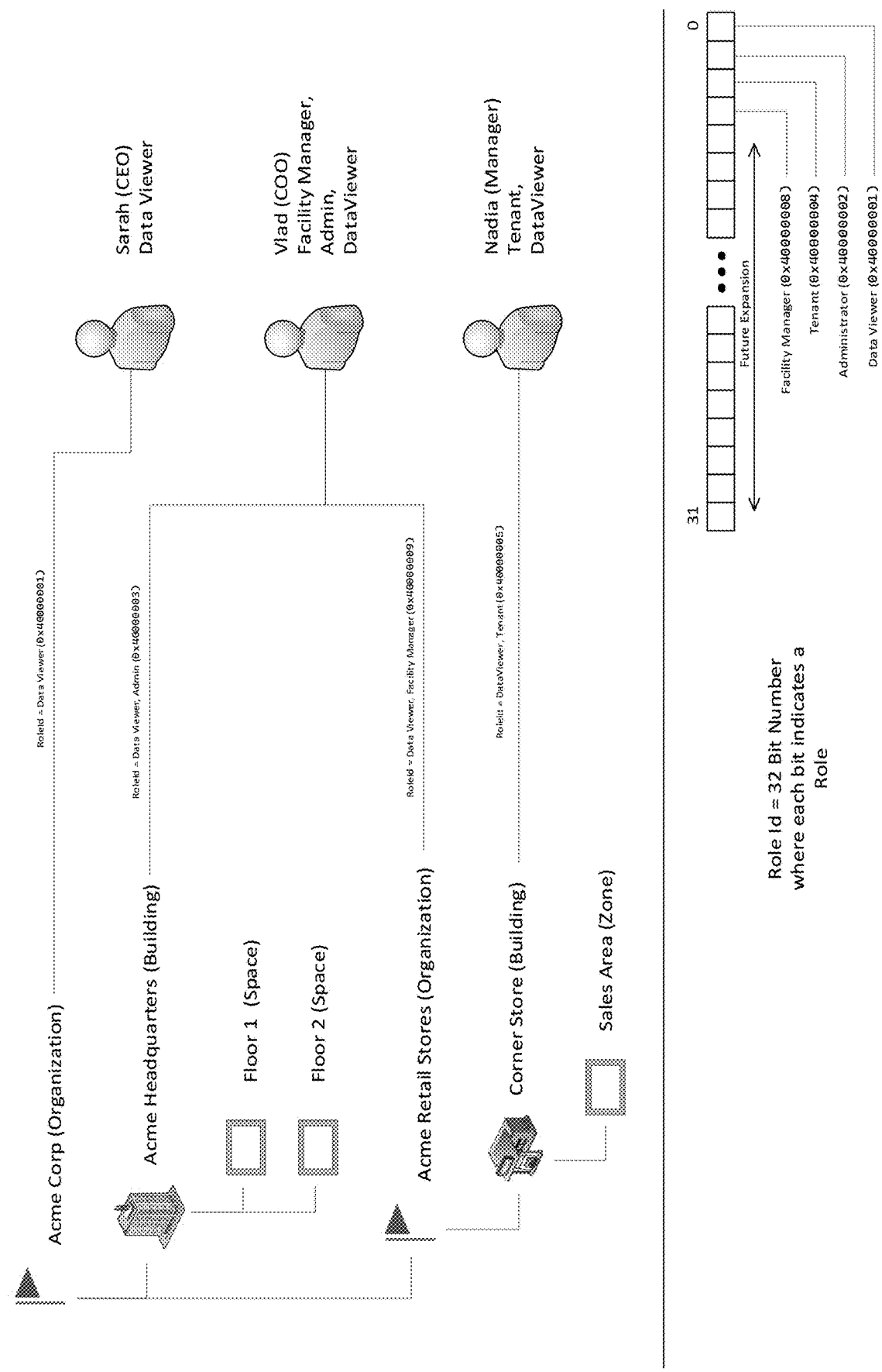
Figure 2:
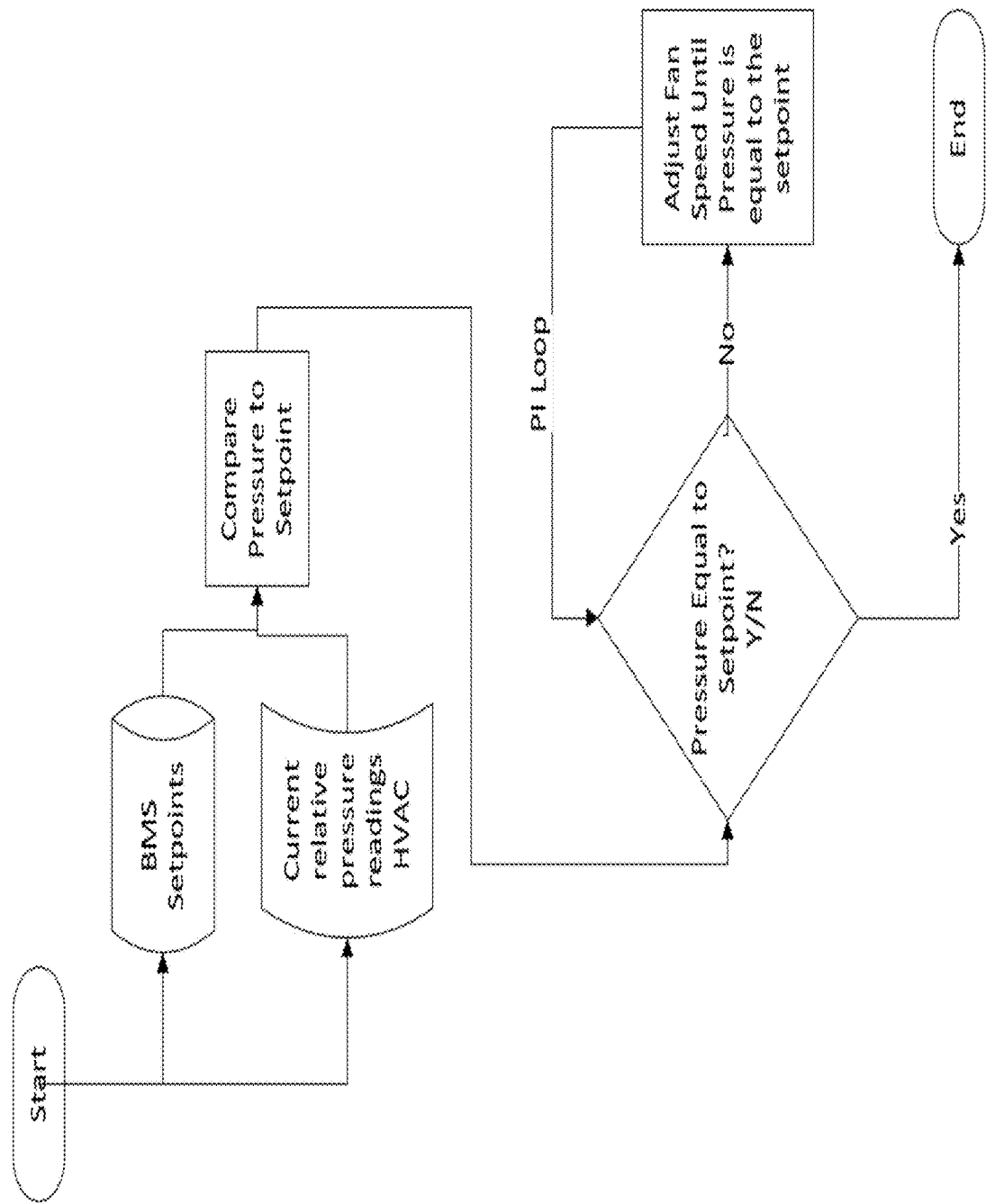
Figure 3:
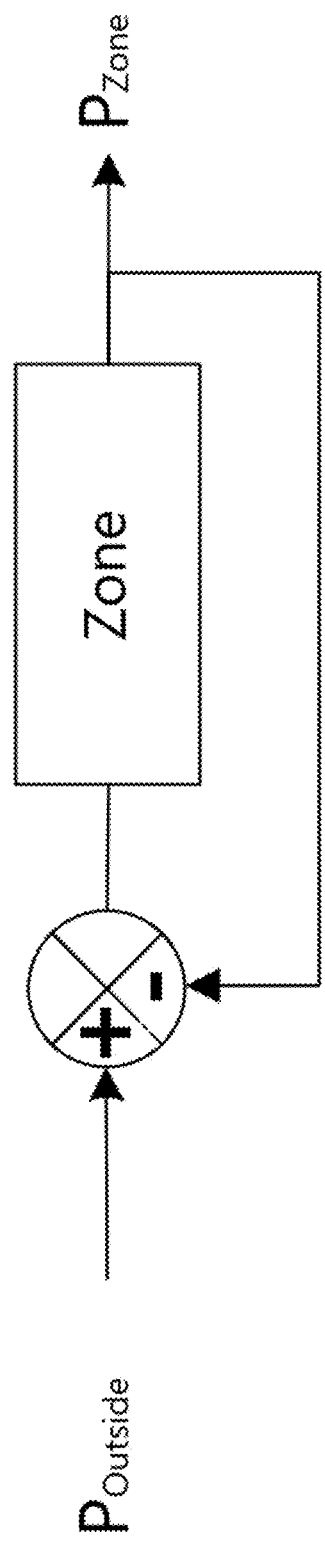
FIG. 3 shows an exemplary Alg. 5.1—Local Control Diagram.
Figure 4:
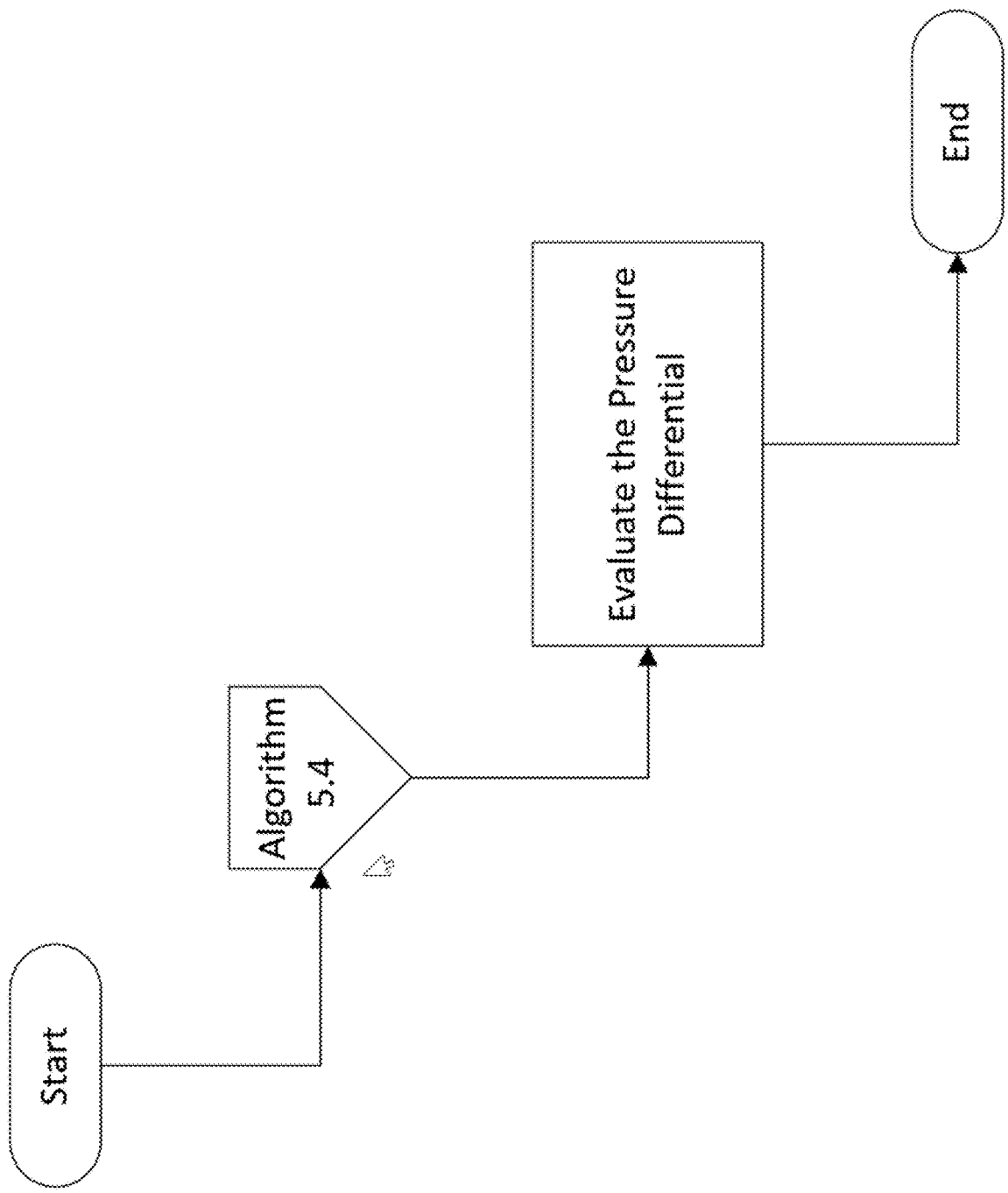
FIG. 4 shows an exemplary Alg. 5.1—Supervisory Control Flow Diagram
Figure 5:
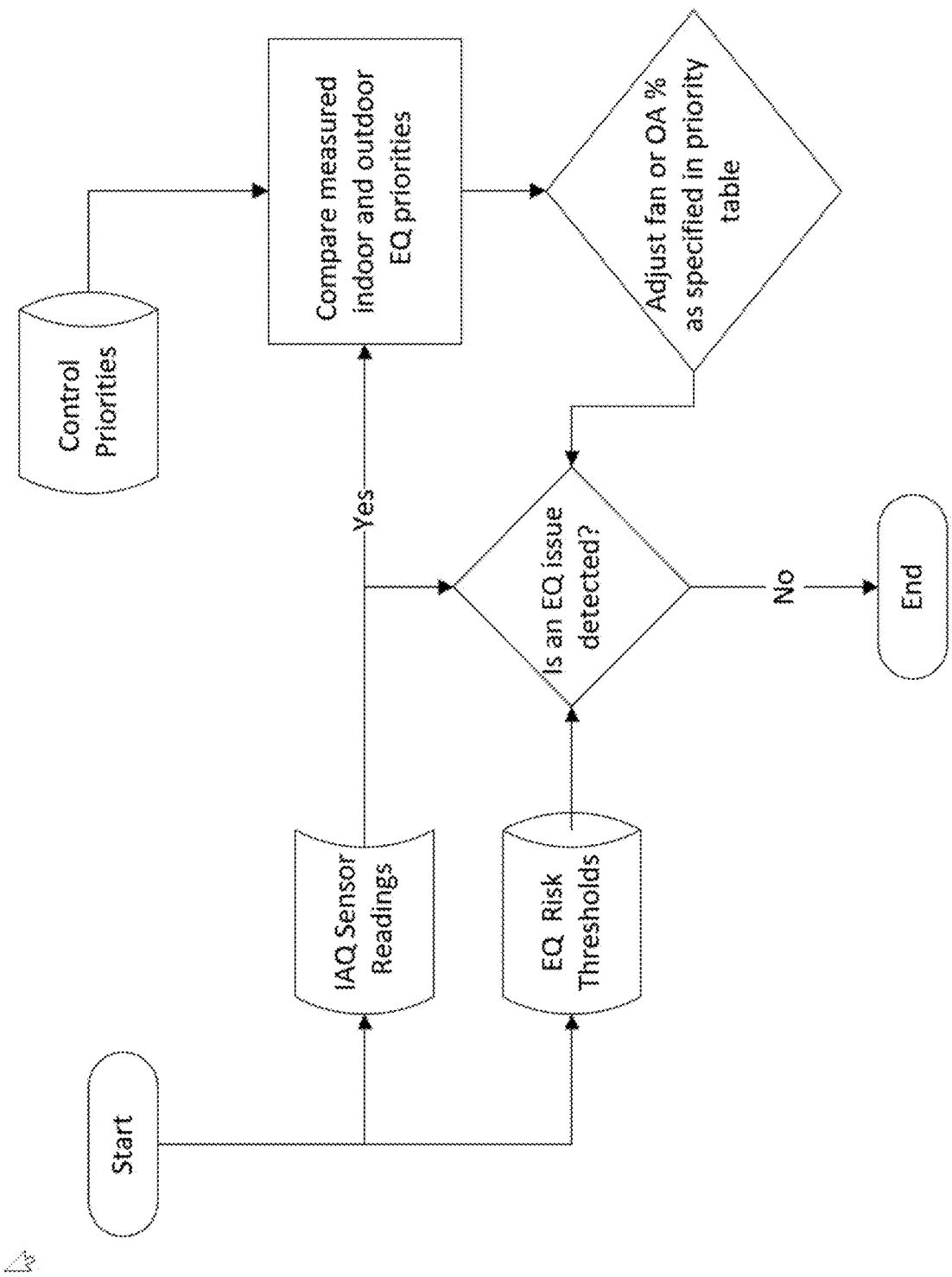
FIG. 5 shows an exemplary Alg. 5.2—L Flow Diagram to Adjust Outdoor Air Fraction (OAF) and ACH based on Outdoor and Indoor air contaminants.
Figure 6:
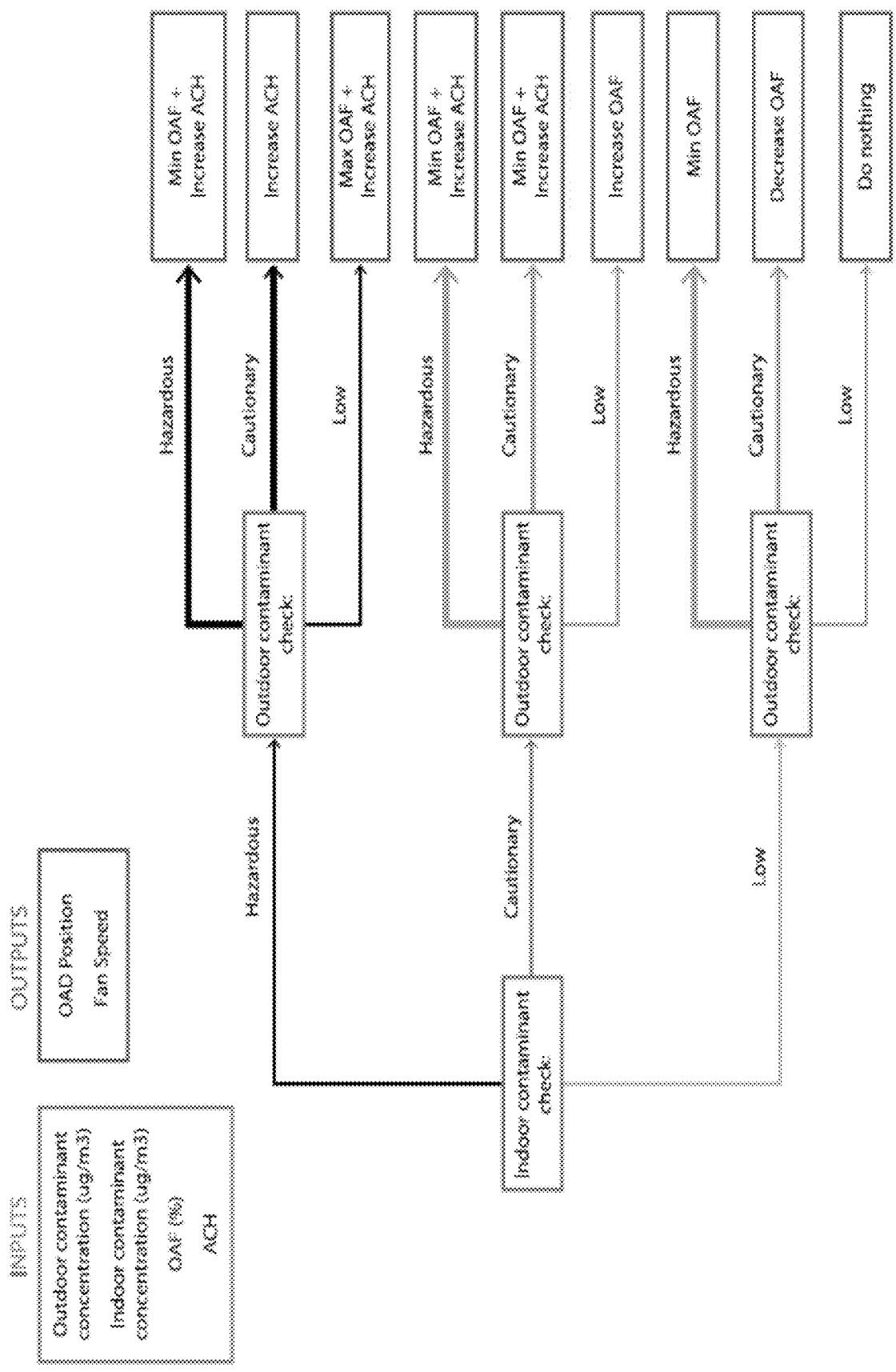
FIG. 6 shows an exemplary Alg. 5.2—Priority Table (System Flag Method)
Figure 7:
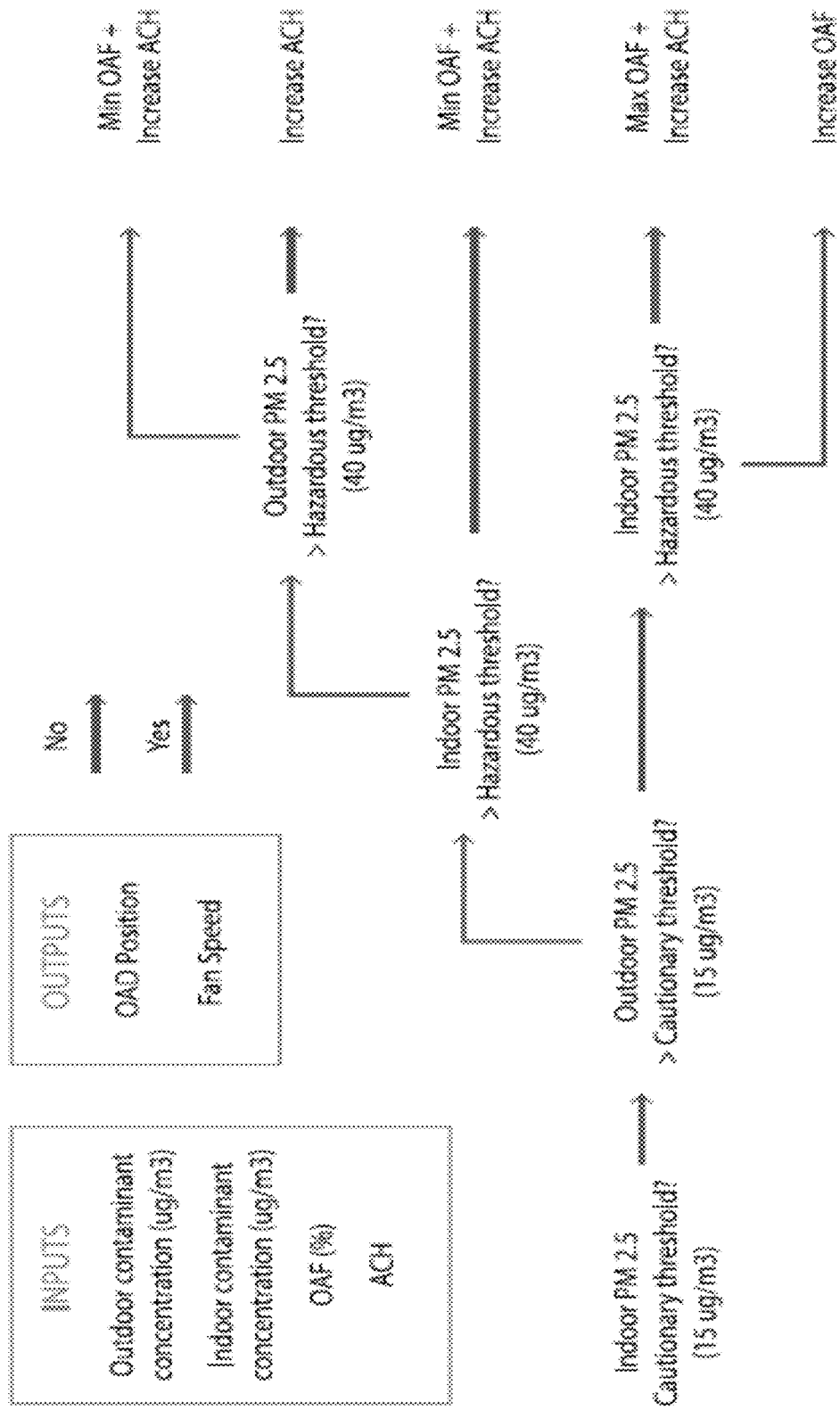
FIG. 7 shows an exemplary Alg. 5.2—Priority Table (If-then-else Method)
Figure 8:
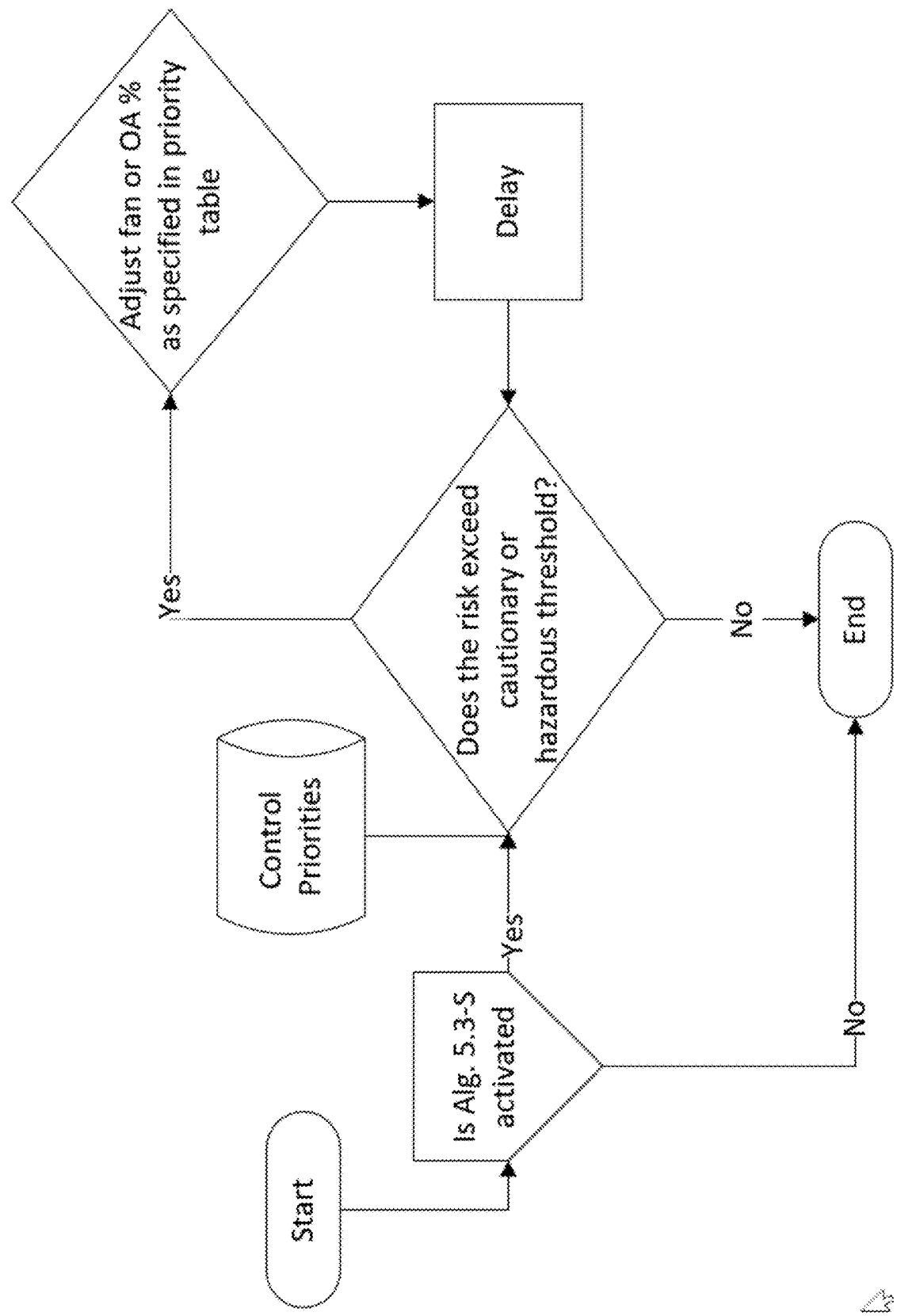
FIG. 8 shows an exemplary Alg 5.3—L Flow Chart to Adjust flow and ACH based on current occupants and current public health risks.
Figure 9:
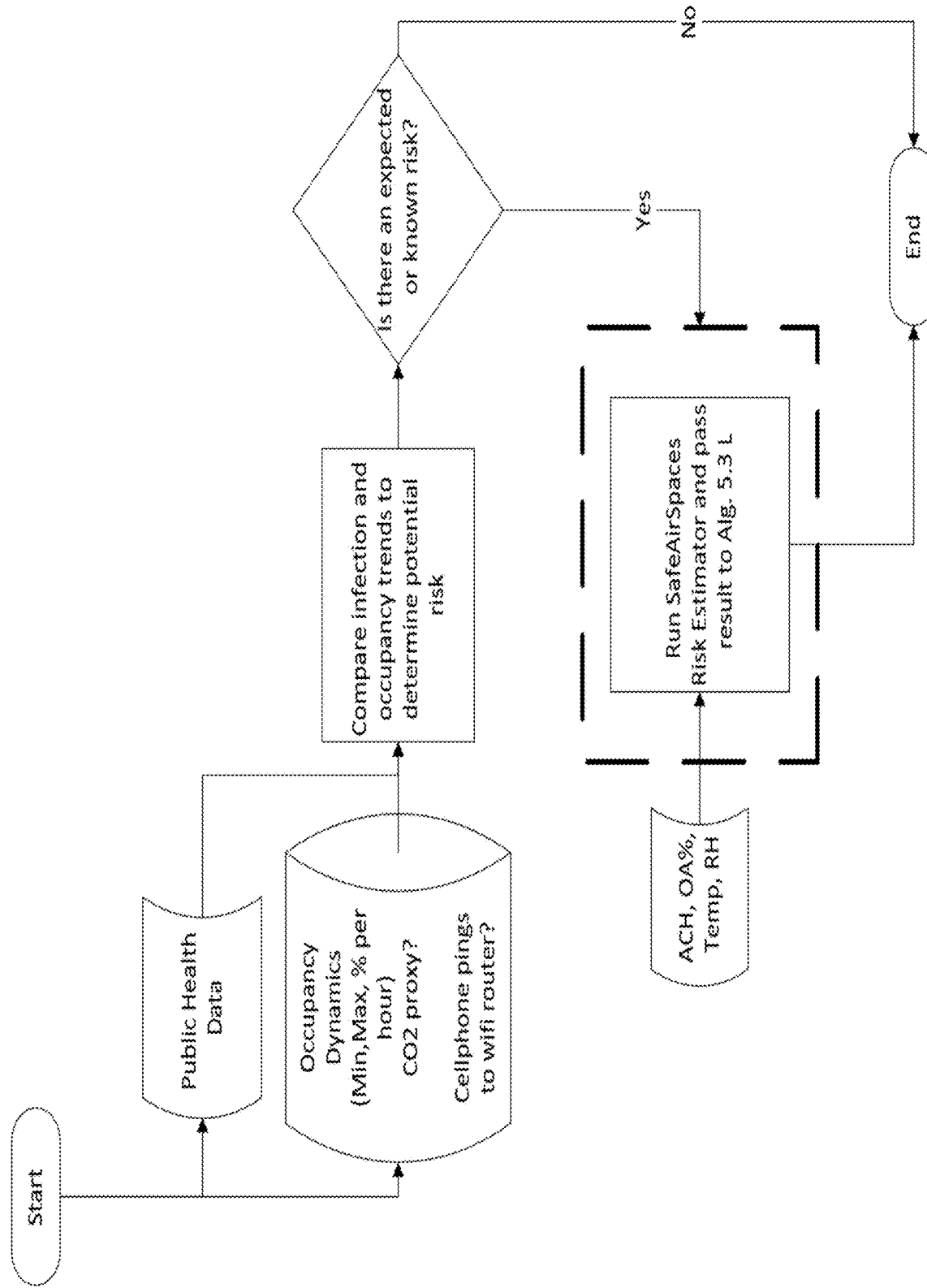
FIG. 9 shows an exemplary Alg 5.3—S Flow Chart
Figure 10:
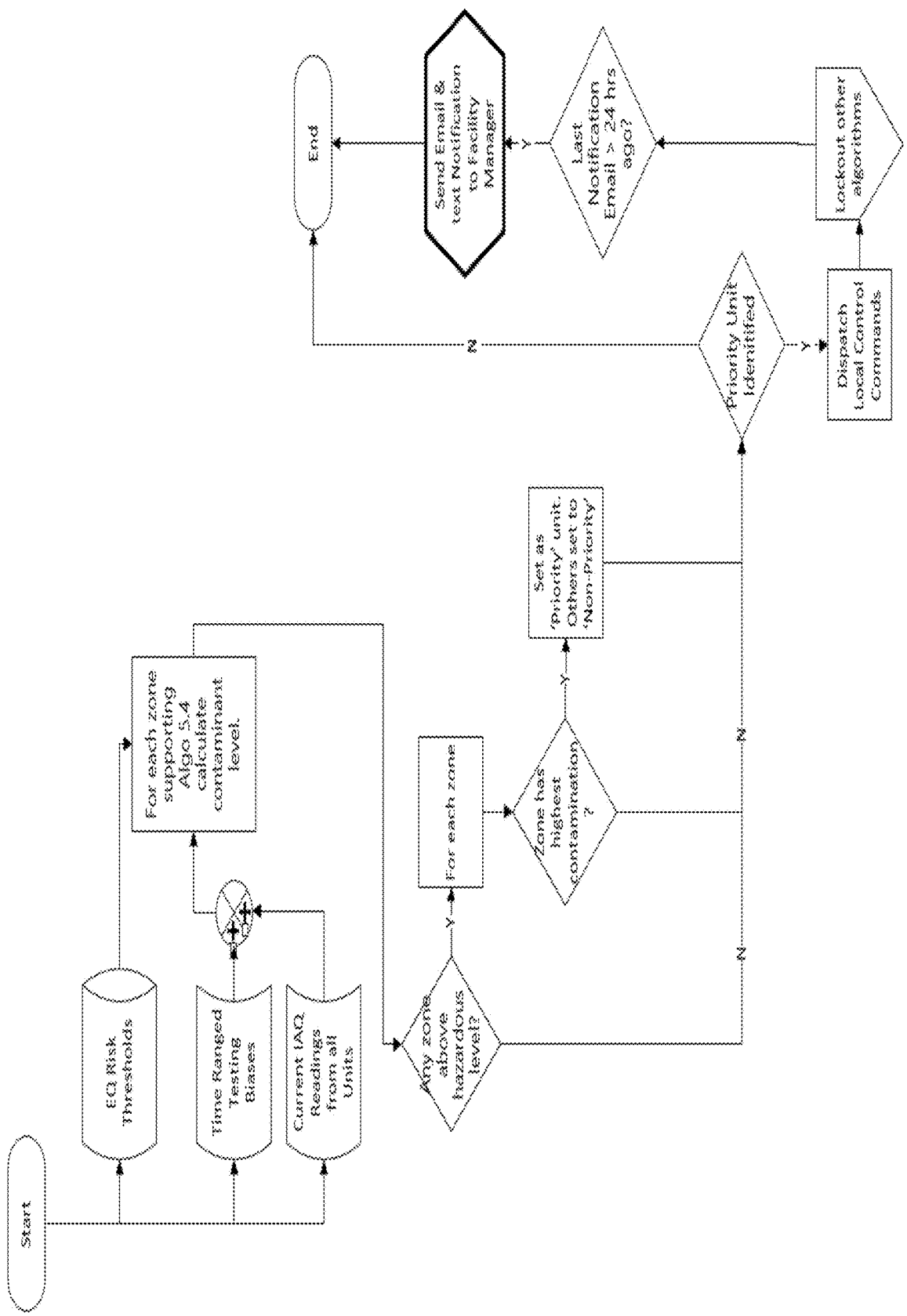
FIG. 10 shows an exemplary Alg. 5.4—S Flow Diagram to Isolate and evacuate indoor air contaminants based on indoor IAQ sensors.

The system provides
Digital Twins for Smart Building Systems:
Bridges (Data Ingress, Data Egress, Subscriptions)—Retinas
Application to Reason about Building Information—Lens
Long Term Storage of Information (Big Data)
100% cloud hosted using modern web/mobile languages and frameworks
Secure authentication/authorization framework
Expansion Capabilities
   Data Warehousing
   Analytic Processing Services (AI, Custom Algorithms . . . )
   User Interface Applications (web/mobile)
   Dashboarding
One implementation provides Azure Functions
Azure Functions
   Serverless compute
   Object Oriented
      Database Definitions
      Evaluation
         Timers
         Events Json State
  Inputs
  Internals
  Outputs
Output Action Messages
  Email
  Retina Delivery to Building Smart Systems
CAMS Executive 5.6
  Isolate and Evacuate Indoor Air Contaminants 5.4
  Maintain Correct Relative Pressure 5.1
  Adjust Outdoor Air Fraction (OAF) and Air Changes per Hour (ACG) 5.2
  Adjust ACH based on Zone Occupants and Public Health Risks (5.3)
  Respond to Public Health Crisis or Catastrophic Events (5.5)
  Safe Air Space Evaluator (5.7)
  Generate Health Alerts (5.8)
Data Monitor Definitions/User
  Monitor Types
    Greater Than
    Less Than
    In Band (Coming Soon)
    Not In Band (Coming Soon)
    Equal To
    Not Equal To
  Point Types
    Analog
    Discrete
  Time In Alarm State
    Expressed In Milliseconds
  Notification
    Email
    Frequency Limit In Minutes
Roles
  Actor (user)
    Mapped to one or more
      Organization
      Building
      Space
    Mapping bit pattern determines roles
      Data Viewer (0x40000001)
      Administrator (0x40000002)
      Tenant (0x40000004)
      Facility Manager (0x40000008)
Data Monitor Definitions/User
  Monitor Types
    Greater Than
    Less Than
    In Band (Coming Soon)
    Not In Band (Coming Soon)
    Equal To
    Not Equal To
  Point Types
    Analog
    Discrete
  Time In Alarm State
    Expressed In Milliseconds
  Notification
    Email
    Frequency Limit In Minutes
Roles
  Actor (user)
    Mapped to one or more
      Organization
      Building
      Space
    Mapping bit pattern determines roles
      Data Viewer (0x40000001)
      Administrator (0x40000002)
      Tenant (0x40000004)
      Facility Manager (0x40000008)
One embodiment uses Augmented Reality to Provide
Conduct Building Site Survey Linking Field Technicians With Central Office Experts
Headset AI to automatically determine site components of interest
Automated Headset Spatial Sensors to Automatically Determine Space Geometry
Junior Site Survey Engineers remote monitoring Next, the processes run by the system of FIGS. 1A-1H are detailed. FIG. 2 shows an exemplary Alg. 5.1 Flow Diagram to Maintain/implement the correct relative pressure in each space. FIG. 3 shows an exemplary Alg. 5.1 Local Control Diagram. FIG. 4 shows an exemplary Alg. 5.1 Supervisory Control Flow Diagram. FIG. 5 shows an exemplary Alg. 5.2—L Flow Diagram to Adjust Outdoor Air Fraction (OAF) and ACH based on Outdoor and Indoor air contaminants. FIG. 6 shows an exemplary Alg. 5.2—Priority Table (System Flag Method). FIG. 7 shows an exemplary Alg. 5.2 Priority Table (If-then-else Method). FIG. 8 shows an exemplary Alg 5.3-L Flow Chart to Adjust flow and ACH based on current occupants and current public health risks. FIG. 9 shows an exemplary Alg 5.3-S Flow Chart. FIG. 10 shows an exemplary Alg. 5.4—S Flow Diagram to Isolate and evacuate indoor air contaminants based on indoor IAQ sensors.

Algorithm 5:1 Maintain/Implement the Correct Relative Pressure in Each Space

Name: CAMS_Zone_RelativePressure_5_1
Applicability:
  HVAC Zones where occupancy type is not kitchen
  Local controls balance the indoor zone pressure against the outside air pressure.
  Assumptions & Requirements
  This algorithm applies to all zones.
  Kitchens are exceptions
  In FIG. 3, the algorithm evaluates each zone's pressure relative to the pressure observed outside the building and compares the zone pressures to the relative pressure setpoints. If the zone pressures are not equal to the zone pressure setpoints, fan speeds of the HVAC units serving the zone will be adjusted to maintain the correct relative pressure in the zone.
Inputs

| Variables | Eng. Units | Comment |
|---|---|---|
| Zone Pressure Setpoint ($P_{Outside}$) | In.w.g. | From Local Controls Based on Outside Air Conditions and Local Control Settings |
| Zone Pressure Reading ($P_{Zone}$) | In.w.g. | From Local Controls |

Expected Outcomes of Testing
$P_{Outside} \sim = P_{Zone}$
Supervisory Control
Assumptions & Requirements
Algorithm 5.1 (local) must be in operation and supplying good data.
Algorithms 5.2, 5.3 and 5.4 are not triggered.
Algorithm Analysis Procedure flow If Algorithms 5.2, 5.3 and 5.4 are triggered
  Stop Analysis
Acquire time constrained testing bias constants associated with algorithm instance.
  Property: TestingBiasRelativePressure
  Type: Json
    UTC Start
    UTC End
    Values
      Name: Test_Bias_Relative_Pressue
      Value: 1 inch water (Parameter name: Test_Bias_Relative_Pressue)
Monitor—Pressure (OutSide and Zone) Procedure
  Calculate 'Pressures'
    For all points 'Poutsid' and 'Pzone' in the zone
      Calculate Average Pressure.
        Aggregation Period: 60 minutes
        Duration In Alarm: 30 Minutes
        Apply testing bias
        Alarm Threshold: >0.5 inch water
    (Parameter name: Threshold_Relative_Pressure)
Notification
  Send notification when alarm trigger zone command dispatched.
    Notification Restrictions
      1 email notification per day. (Parameter name: Notification_Time_Period_Minutes)
FIG. 4 shows an exemplary supervisory flow diagram. After Algorithm 5.4, the process evaluates the pressure differential.

SUMMARY

This algorithm is used to maintain the pressure dynamics in the building and send out notifications if problems are detected.
Cloud Evaluation Properties

| Frequency | Evaluate Every 30 min |
|---|---|
| Class | Algorithm_CAMS_Zone_RelativePressure_5_1 |

Expected Outcomes of Testing
The building pressure dynamic in reference to the priority unit is implemented or maintained.

Algorithm 5:2: Adjust Outdoor Air Fraction (OAF) and ACH Based on Outdoor and Indoor Air Contaminants Informed by the Acceptable Risk Threshold Research Name: CAMS_Zone_Adjust_OAF_ACH_Contaminants_5_2
  Applicability:
  All HVAC Zone
  Local Control
  Assumptions Requirements
  Outdoor air dampers can modulate
  Fan speed can modulate
  PM 2.5 informed by ASHRAE 62.1 or ISO 16890 or UO Lit. Rev.
  This algorithm is independent of the other algorithms currently. Priorities will be created in the next version.
  FIG. 5 shows Alg. 5.2—L Flow Diagram. This algorithm is used to prioritize IAQ as referenced to PM2.5 by continues analysis of the ratio of indoor to outdoor contamination. If the outdoor contamination is low, the algorithm will increase outdoor air flow overall air exchange rate to remove indoor contamination. If moderate outdoor contamination is detected, the system will decrease the outdoor air fraction while increasing air exchange rate. If the indoor contamination is significantly greater than outdoor contamination, the system will increase air exchange rates without adjusting the outdoor damper, thereby increasing outdoor air flow. If both indoor and outdoor contamination are hazardous, the system will increase ACH significantly then, moderate the outdoor air damper position based on the relative intensity (i.e. increasing outdoor air flow if indoor concentration is higher and vice versa).

Inputs

| Variables | Eng. Units | Frequency of Sampling | Data Filtering |
|---|---|---|---|
| Particulate Matter (PM2.5) (EQ Risk Thresholds) | $ug/m^3$ | COV (TBD) | NA |
| Particulate Matter (PM2.5) readings from all HVAC Units (Indoor & outdoor) | $ug/m^3$ | 1 min | 15 Min average |
| Fan Cmd. | On/Off | 1 min | COV |
| All HVAC Units Fan Speed FB | Hz. | 1 min | 15 Min average |
| All HVAC Units OA Damper Position FB | 0 to 100% | 1 min | 15 Min average |
| Zone Volumes | Ft# | Static | NA |
| Zone Occupancy - CO2 as proxy for Pz | PPM (Proxy) | 1 min | 15 Min |
| Outdoor Air Quality Alert | Yes/No | Hourly | NA |

Outputs

| Variables | Eng. Units | Frequency |
|---|---|---|
| Fan Speed CMD | Hz. | Every 15 Min |
| Fan CMD | On/Off | Every 15 min |
| OA Damper Position CMD | 0-to 100% | Every 15 Min |

Expected Outcomes of Testing are detailed in FIG. 6—Alg. 5.2—Priority Table (System Flag Method) while FIG. 7 shows FIG. 5.2 Priority Table (If-then-else Method). In FIG. 6, the indoor contaminant check results in hazardous, cautionary or low outcomes, which affect the fan speed and OAD position.

Linear Interperlation setting for OAF & ACH (Fan Speed)

| Edge Point | PM 2.5 =< 15 ug/m3 | PM 2.5 > 15 ug/m3 | PM 2.5 =< 30 ug/m3 | PM 2.5 > 30 ug/m3 |
|---|---|---|---|---|
| Fan Cmd. | No Change | ON | ON | ON |
| ACH (Fan Speed) | No Change | 6.66% increase available fan speed range for every 1 ug/m3 PM 2.5 increase | 100% increase | 100% speed |
| OAF (OA Damper) | No Change | 6.66% increase available OA damper range for every 1 ug/m3 PM 2.5 increase | 100% increase | 100% open |

One embodiment follows the air quality standards as follows:

TABLE D-1

National Ambient Air Quality Standards for the Unites States
(www.epa.gov/criteria-air-pollutants/naaqs-table)

| Pollutant | | Primary/ Secondary | Averaging Time | Level | Form |
|---|---|---|---|---|---|
| Carbon Monoxide (CO) www.epa.gov/co-pollution/table-historical-carbon-monoxide-co-national-ambient-air-quality-standards-naaqs | | Primary | Eight (8) hours | 9 ppm | Not to be exceeded more than once per year |
| | | | One (1) hour | 35 ppm | |
| Lead (Pb) www.epa.gov/lead-air-pollution/table-historical-lead-pb-national-ambient-air-quality-standards-naaqs | | Primary and secondary | Rolling three (3) month average | 0.15 µg/m$^3$ (Note 1) | Not to be exceeded |
| Nitrogen Dioxide (NO$_2$) www.epa.gov/no2-pollution/table-historical-nitrogen-dioxide-national-ambient-air-quality-standards-naaqs | | Primary | One (1) hour | 100 ppb | Ninety-eighth (98th) percentile of one-hour daily maximum concentrations, averaged over three years |
| | | Primary and secondary | One (1) year | 53 ppb (Note 2) | Annual mean |
| Ozone (O$_3$) www.epa.gov/ozone-pollution/table-historical-ozone-national-ambient-air-quality-standards-naaqs | | Primary and secondary | Eight (8) hours | 0.070 ppm (Note 3) | Annual fourth-highest daily maximum eight-hour concentration, averaged over three years |
| Particle Pollution (PM) www.epa.gov/pm-pollution/table-historical-particulate-matter-pm-national-ambient-air-quality-standards-naaqs | PM2.5 | Primary | One (1) year | 12.0 µg/m$^3$ | Annual mean, averaged over three years |
| | | Secondary | One (1) year | 15.0 µg/m$^3$ | Annual mean, averaged over three years |
| | | Primary and secondary | Twenty-four (24) hours | 35 µg/m$^3$ | Ninety-eight (98th) percentile, averaged over three years |
| | PM10 | Primary and secondary | Twenty-four (24) hours | 150 µg/m$^3$ | Not to be exceeded more than once per year on average over three years |

Cloud Evaluation Properties

| | |
|---|---|
| Frequency | Evaluate Every 30 min |
| Class | CAMS_Adjust_OAF_ACH_Contaminants_5_2 |

Algorithm 5:3: Adjust Flow and ACH Based on Current Occupants and Current Public Health Risks Name: CAMS_Zone_Adjust_OAF_ACH_Health_Risks_5_3
Applicability:
All HVAC Zones
Local Control
Assumptions & Requirements
Algorithm 5.3-S must be activated
Outdoor air dampers can modulate
Fan speed can modulate
This algorithm is independent of the other algorithms in one embodiments, while in other embodiments a variety of algorithms can be used and priorities will be created in next version.

FIG. 8 shows the Alg 5.3-L Flow Chart. This algorithm is used to mitigate risk as referenced to community positivity rate by continues analysis of occupancy and public health data. OAF rates and fan speed modulate based on the risk threshold, as determined by the SafeAirSpaces & Alg. 5.3-S. If moderate outdoor contamination is detected, the system will decrease the outdoor air fraction while increasing air exchange rate. If there is a public health risk significantly greater than outdoor contamination, the system will increase the outdoor air by adjusting the damper, thereby increasing outdoor air flow. If both the public health risk and outdoor contamination are hazardous, the system will increase ACH significantly than, moderate the outdoor air damper position based on the relative intensity (i.e. increasing outdoor air flow if the public health risk is higher and vice versa).

Inputs

| Variables | Eng. Units | Frequency of Sampling | Data Filtering |
|---|---|---|---|
| All HVAC Units Fan Speed FB | Hz. | 1 min | 15 Min average |
| All HVAC Units OA Damper Position FB | 0 to 100% | 1 min | 15 Min average |

Outputs

| Variables | Eng. Units | Frequency |
|---|---|---|
| Fan Speed CMD | Hz. | Every 15 Min |
| OA Damper Position CMD | 0-to 100% | Every 15 Min |

Expected Outcomes of Testing

Please see priority tables in the expected outcomes of algorithm 5.2-L.

Key difference between Algorithm 5.2 and 5.3:
    Alg. 5.2: The triggering variable (risk thresholds) are indoor and outdoor PM2.5
    Alg. 5.3: The indoor risk thresholds are determined by SafeAirSpaces using community positivity rates (COVID)

The responses for both algorithm 5.2-L and 5.3-L leverage the same outputs (Fan speed and OA Damper Position, but with different priority variables Supervisory Control Assumptions Requirements SafeAirSpaces runs continuously in CAMS CO2 is used as the proxy to calculate Occupancy COVID is the first virus used in SafeAirSpaces Algorithm, other viruses will be part of CAMS' next version FIG. 9 shows Alg 5.3-S Flow Chart with its primary to calculate the risk of viral transmission through aerosols. The process applies public health data and occupancy dynamics (min, max, % per hour, CO2 emission proxy) and captures cell phone pings to the Wifi router. The process compares infection and occupancy trends to determine potential risk. Using zone/HVAC data and public positivity rates, a risk profile is determined by the SafeAirSpaces algorithm. One virus in the SafeAirSpaces algorithm is COVID.

Inputs

| Variables | Eng. Units | Frequency of Sampling | Data Filtering |
|---|---|---|---|
| Zone Volumes | Ft^3 | Static | NA |
| Zone Occupancy - CO2 as proxy | PPM (Proxy) | 1 min | 15 Min |
| Community Positivity Rate (COVID) | % | Daily | NA |

Outputs

| Variables | Eng. Units | Frequency |
|---|---|---|
| Risk Profile | NA | Daily |

Cloud Evaluation Properties

| Frequency | Evaluate Every 30 min |
|---|---|
| Class | CAMS_Zone_Adjust_OAF_ACH_Health_Risks_5_3 |

Expected Outcomes of Testing

One version has three levels of risk:

Low

Cautionary

Hazardous

Algorithm 5.4: Isolate and evacuate indoor air contaminants based on indoor IAQ sensors This algorithm monitors the health parameters of a HVAC zone and will initiate mitigation notifications and actions.

Name: CAMS_Zone_Isolate_Indoor_Air_Contaminants_5_4

Applicability

HVAC Zones where occupancy type is not kitchen

Local Control

Local HVAC control will initiate actions to evacuate air health hazards to the outside when triggered by cloud supervisor monitors.

Assumptions & Requirements

Supported only for HVAC Zones

Commands/Events

Commands from Supervisor
    Command—Evacuate
        Name: HVAC Zone Evacuate Air
        State: True=Initiate/False=Terminate
        Duration: 35 minutes unless canceled
        Periodicity: 30 minutes
        Local control actions:
            Fan Control
                GFan=0
                VFD Speed=0
            Adjust damper settings:
                Exhaust: full open
                Outside Air/Economizer: full open
                Return Air: full closed
    Command—Hyper Ventilate
        Name: HVAC Zone Hyper Ventilate
        State: True=Initiate/False=Terminate
        Duration: 35 minutes unless cancelled
        Periodicity: 30 minutes
        Local control actions:
            Fan Control
                GFan=1
                VFD Speed=100%
            Adjust damper settings:
                Exhaust: Normal Operations
                Outside Air/Economizer: 100%
                Return Air: Normal Operations Supervisory Control Supervisory controls will monitor zone health, initiate local control commands and send notifications via email.

Assumptions Requirements

Configured for all zones to be monitored and controlled.

Cannot be used with Kitchen zones

Sites/Floor must contain more than one zone.

Algorithm Analysis Procedure Flow

Acquire time constrained testing bias constants associated with algorithm instance.
    Property: Test Bias Particulate Matter 2.5
        UTC_Start
        UTC_End
        Values
            Name: Test_Bias_PM_2_5
            Value: 40 ug/m$^3$ (Parameter name: Test_Bias_PM_2_5)

Monitor—Particulate Matter 2.5 Procedure
    For all zones of a floor or building.
        Calculate 'PM2_5' applying testing bias if current time in testing bias range.
        For all points 'PM2_5' in the zone
            Calculate particulate level and determine if in alarm.
            Aggregation Period: 60 minutes
            Duration In Alarm: 30 Minutes
            Alarm Threshold: >40 ug/m$^3$
            (Parameter name: Threshold_PM_2_5)

Determine zone with highest particulate level and in alarm state.
  Set this zone as 'Priority' zone.
    Note: During nominal operations there will not be a 'Priority' zone.
  If 'Priority' zone identified.
    Record all others as 'Non-Priority' zone
Command Initiation
  If Local Control Commands enabled.
    If 'Priority' zone identified send commands
      'Priority' zone command
        Lockout all other CAMS Algorithms
        Send 'HVAC Zone Evacuate Air' command
      'Non-Priority' zone command
        Send 'HVAC Zone Hyper Ventilate' command
Notification
  Send notification when 'Priority' zone command dispatched.
    Notification Restrictions
      1 email notification per day. (Parameter name: Notification_Time_Period_Minutes)
FIG. 10 shows an exemplary FIG. 5.4-S Flow Diagram.
Cloud Evaluation Properties

| | |
|---|---|
| Frequency | Evaluate Every 30 min |
| Class | CAMS_Zone_Isolate_Indoor_Air_Contaminants_5_4 |

Expected Outcomes of Testing

The priority unit's pressure zone pressure will drop and surrounding zones pressure will increase. This will result in an inflow of air to the 'Priority' from surrounding zones and the evacuation of the air via the rooftop. Also, an email will be sent to the facility manager at a maximum frequency of once per day.

Algorithm 5:5: Respond to a Public Health Crisis or a Catastrophic Event

Name: CAMS_Zone_Public_Health_Crisis_Catastrophy_5_5
  Applicability
  HVAC Zones where occupancy type is not kitchen
  Local Control
  Assumptions Requirements
  All zones that have economizer and are not kitchens
  Initiated when commanded by the supervisory control system to do a local zone flush
  Economizers will open to 100% during local zone flush
  Local Zone flush command will be reevaluated every 30 minutes by supervisor
  Local Zone flush will automatically cease when outdoor AQI is worse than indoor AQI as determined by supervisor.
  Economizers go to 0% when outdoor AQI is worse than indoor AQI as determined by supervisor.
  When $CO_2$ exceeds 3,000 PPM, cancel and let local algorithms run as normal
  Local controls will automatically cancel any supervisor command after 35 minutes of runtime.
  Commands/Events
  Commands from Supervisor
    Command—Flush
      Name: HVAC Zone Flush
      State: True=Initiate/False=Terminate
      Duration: 35 minutes unless canceled or $CO_2$ is greater than 3,000 PPM
      Periodicity: 30 minutes
      Local control actions:
        Economizer=Full Open
        Fan=On
        VFD Speed=100%
        Air Purifiers=On
    Command—Recirculate
      Name: HVAC Zone Recirculate
      State: True=Initiate/False=Terminate
      Duration: 35 minutes unless cancelled or C)2 is greater than 3,000 PPM
      Periodicity: 30 minutes
      Local control actions:
        Economizer=Full closed
        Fan=On
        VFD Speed=100%
        Air Purifiers=On at Zone Maximum Level

SUMMARY

1. Level 5 AQI Forecast—Triggered algorithm
2. Issue Email Alert with Site Mitigation strategies Explanation—2 hours prior to Forecast
3. With in one hour of forecast Level 5 AQI Event issue flush command to local controls
4. With in 30 min of forecast Level 5 AQI Event turn on air purifiers
5. At Level 5 AQI—forecasted time, close economizers to 0%
6. When $CO_2$ exceeds 3,000 PPM, or outdoor AQI drops below 5, cancel and let local algorithms run as normal)

Supervisory Control
Assumptions & Requirements
See local controls section.
Analysis Procedure Flow
Acquire time constrained testing bias constants associated with algorithm instance.
  Property: Test Bias AQI Forecast Current Hour
    UTC_Start
    UTC_End
    Values
      Name: Test Bias AQI Forecast Current Hour
      Value: 0-5
      Description: AQI Bias.
  Property: Test Bias AQI Forecast Minutes To Hazardous
    UTC_Start
    UTC_End
    Values
      Name: Test_Bias_Minutes_To_Hazardous
      Value: 0-5
      Description: AQI Bias.
  Property: Test Bias AQI Actual Outdoor
    UTC_Start
    UTC_End
    Values
      Name: Test Bias AQI Actual Outdoor
      Value: 0-5
  Property: Test Bias AQI Actual Indoor
    UTC_Start
    UTC_End
    Values
      Name: Test Bias AQI Actual Indoor
      Value: 0-5
  Property: Zone Time to Flush
    UTC_Start: N/A
    UTC_End: N/A Values
 Name: Zone Time To Flush Minutes
  Value: 0-180 Minutes
 Property: Hazardous AQI Threshold
  UTC_Start: N/A
  UTC_End: N/A
  Values
   Name: Hazardous AQI Threshold
   Value: 5
Monitor
 Air Quality Indexes (Indoor and Outdoor)
  Determine AQI Index for current and next 3 hours
   Indoor—Current Hour/Time
   Outdoor—Current Hour/Time
   Forecast—Current and next three hours
   ■Apply testing biases to all AQI values.
Command Initiation
 Flush (HVAC Zone Flush)
  Initiate when
   Outdoor AQI actual current<5 and
   Outdoor AQI Forecast Current Hour<5 and
   Outdoor AQI Forecast Range[Current Hour to CurrentHour+Zone_Time_To_Flush_Minutes] any value>=5
 Recirculate (HVAC Zone Recirculate)
  Initiate when
   Outdoor AQI actual current>=5 or
   Outdoor AQI forecast next hour>=5
Notifications
 Flush (HVAC Zone Flush) Initiated
  Send notification.
   Notification Restrictions
    1 email notification per day. (Parameter name: Notification_Time_Period_Minutes_Flush_Initiated)
 Recirculate (HVAC Zone Recirculate) Initiated
  Send notification
   Notification Restrictions
    1 email notification per day. (Parameter name: Notification_Time_Period_Minutes_Recirculate_Initiated)

Figure 11:
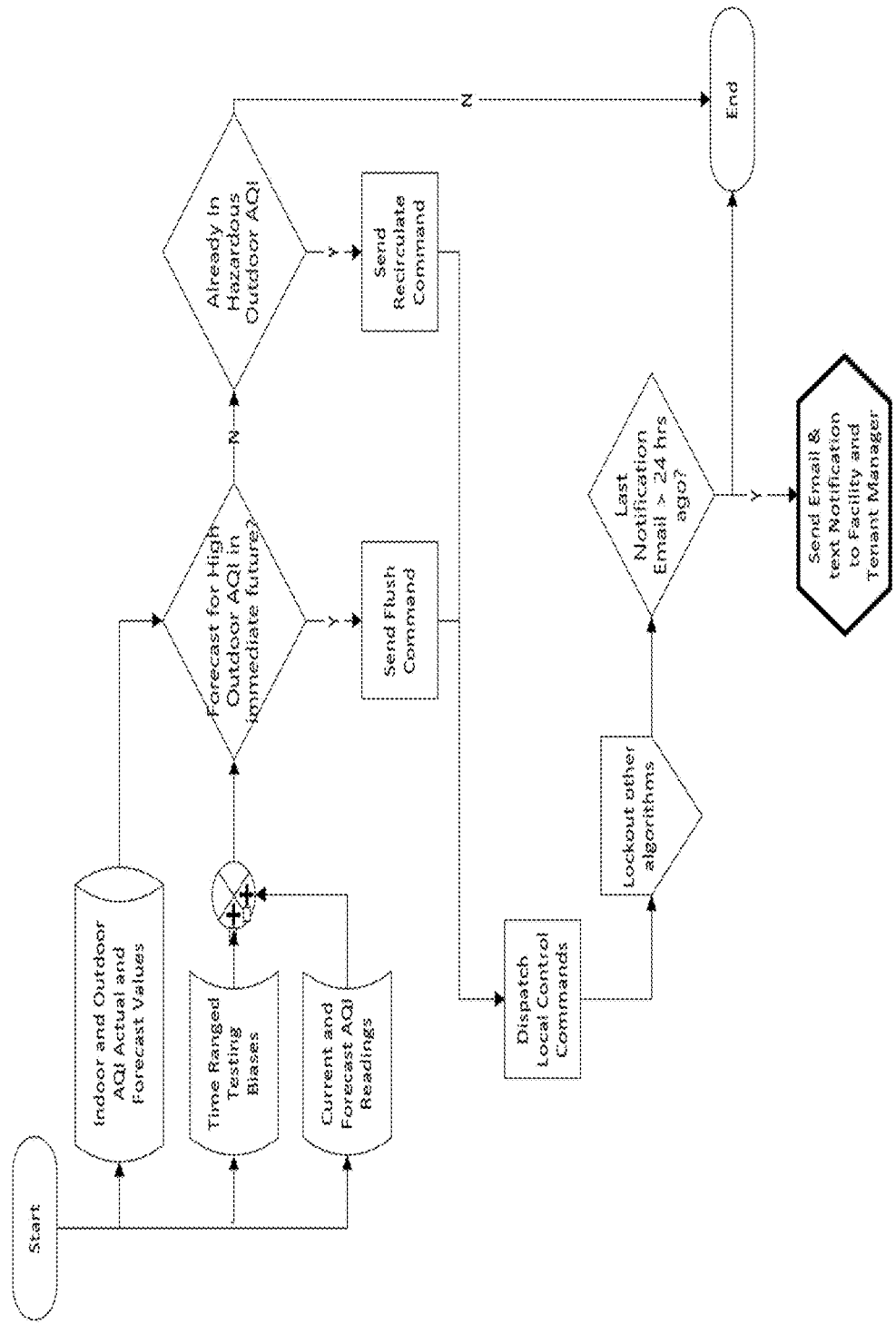
FIG. 11-12 shows exemplary Alg. 5.5—S Flow Diagrams to Respond to a public health crisis or a catastrophic event.
Figure 12:
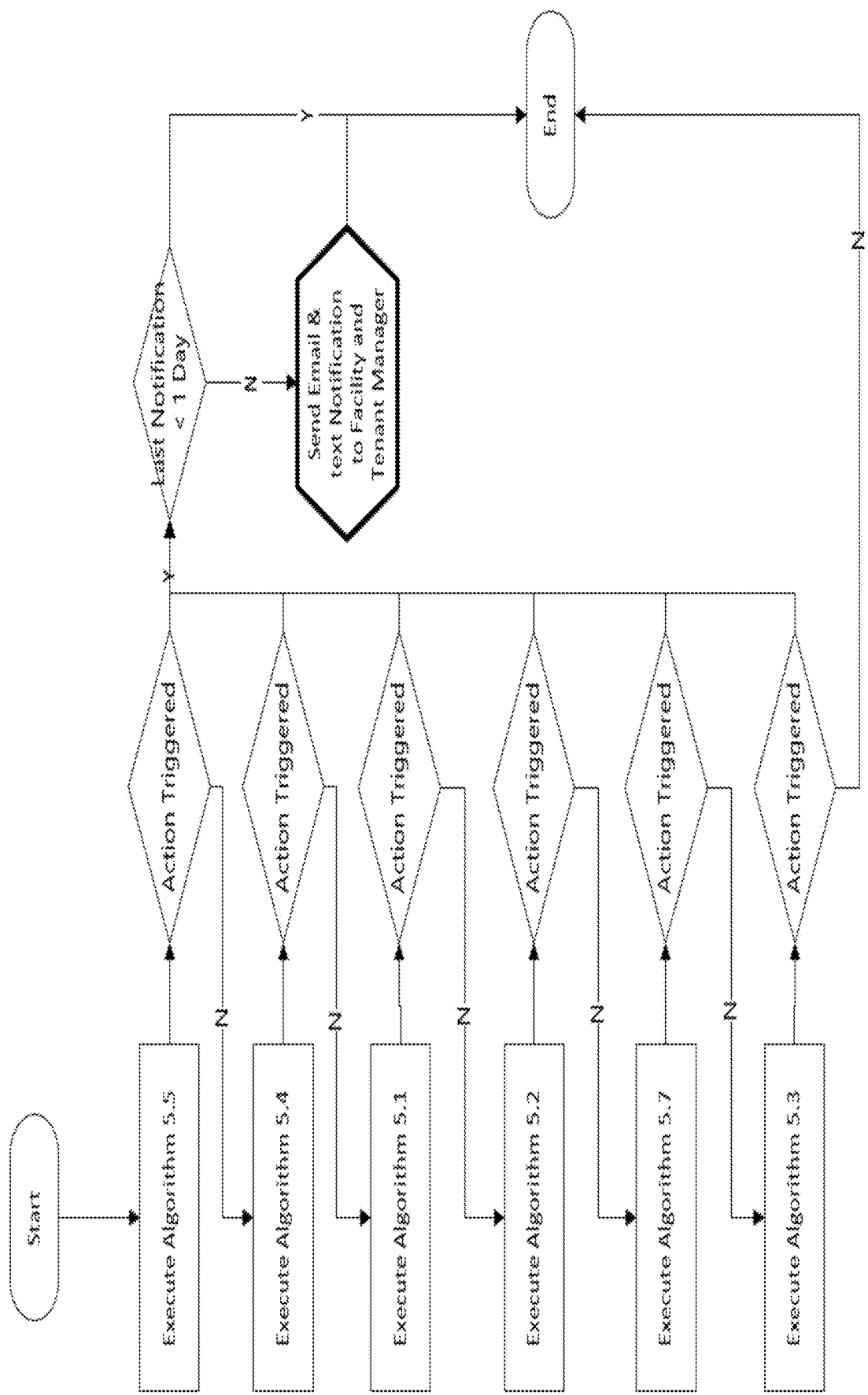

FIG. 11 shows an exemplary Alg. 5.5—S Flow Diagram while FIG. 12 shows Alg. 5.6—S Flow Diagram Cloud Evaluation Properties

| Frequency | Evaluate Every 30 min |
|---|---|
| Class | CAMS_Zone_Public_Health_Crisis_Catastrophy_5_5 |

Expected Outcomes of Testing
Zone air will be flushed prior to crisis and recirculated during the event. Additionally, air purifiers will be engaged during the event.

Algorithm 5.6: Zone Algorithm Executive

Name: CAMS_Zone_Executive_5_6
Applicability
 ALL HVAC Zones
Local Control
 No direct local control functions are associated with this algorithm.
Supervisory Control
 This algorithm orchestrates the sequencing and invocation rules for all CAMS zone algorithms.
 Assumptions & Requirements
 Algorithms Orchestrated
  Algorithm 5.1
  Algorithm 5.2
  Algorithm 5.3
  Algorithm 5.4
  Algorithm 5.5
  Algorithm 5.7
 Execution Order (Sequential) See following diagram
  Algorithm 5.5
  Algorithm 5.4
  Algorithm 5.1
  Algorithm 5.2
  Algorithm 5.7
  Algorithm 5.3
 Trigger Rule(s)
  If an algorithm is triggered. algorithms following the triggered algorithm shall be ignored.
   Foreach Algorithms not yet executed in the execution sequence.
    Only execute each of their return to normal command sections.
Cloud Evauation Properties

| Frequency | Evaluate Every 30 min |
|---|---|
| Class | CAMS_Zone_Executive_5_6 |

Algorithm 5.7 SafeAirSpaces

Name: CAMS_Zone_Safe_Air_Spaces_5_7
Applicability
Used in conjunction with 5.3
Local Control
This algorithm runs subordinate to other supervisory algorithms. Hence, there is not a local control specification.
Supervisory Control
TBD
Cloud Evaluation Properties

| Frequency | Evaluate Every 30 min |
|---|---|
| Class | CAMS_Zone_Safe_Air_Spaces_5_7 |

Algorithm 5.8 Health Alerts

Name: See PointMonitors
Applicability
Any point that collects time series data.
Supervisory Control
For any point, configure a threshold and Time in-alert monitor. Points monitored will depend on regional air quality and public health threats.
 Threshold Value
  Flosting point numeric value
   Threshold Types
    Above Threshold
    Below Threshold
    Equal To
    Not Equal To
   Duration
    Minimum Time in threshold constraint violation
  The alert will provide extra mitigation strategies to mitigate the threat.
   Links
   Phone numbers
   Step by step info, etc
CAMS generalized point monitors provide this functionality.

Cloud Evaluation Properties

| Frequency | Evaluate as point values are received. |
|---|---|
| Application | See Func-PointMonitor application. |

One implementation applies neural networks to predict air quality. The modeling and forecasting of building environmental parameters involves a variety of approaches. By considering the fan air flow speed, the pathogen, the number of people, and the operation time for different fans, the data can be taken in 15 min interval time for several days. The data taken are then divided into two major parts: simulation (training and validation) and testing according to the rule set by Environmental Protective Agency (EPA). The tool can predict and control air pathogen or pollution. One approach applies an atmospheric air flow diffusion model to predict future pathogen or pollutant concentrations. A second is to devise statistical models that attempt to determine the underlying relationship between a set of input variables (original data) and the targets. Statistical methods, either the time-series methods, which do not use air flow inputs, or regression and similar methods, which are based on multivariate linear relationship between air conditions and air pathogen/pollution concentrations, can be used. GA can find the optimal operating conditions so that the overlimit release of pathogen is reduced to the allowable limit. A parallel genetic algorithm (GA) can be employed for selecting the inputs and designing the high-level architecture of a multi-layer perceptron model for forecasting hourly concentrations of pathogen in the building The evolutionary and genetic algorithms (GA) can solve linear and non-linear problems by exploring all regions of the state space and exploiting promising areas through genetic operations.

In another embodiment, artificial neural networks (ANN) can be used. FIG. 15 shows exemplary AI networks to perform air management. In addition to controlling the air quality operation, the neural network can be used to provide local edge processing for IOT devices. A striking feature about neural networks is their enormous size. To reduce size of the neural networks for edge learning while maintaining accuracy, the local neural network performs late down-sampling and filter count reduction, to get high performance at a low parameter count. Layers can be removed or added to optimize the parameter efficiency of the network. In certain embodiments, the system can prune neurons to save some space, and a 50% reduction in network size has been done while retaining 97% of the accuracy. Further, edge devices on the other hand can be designed to work on 8 bit values, or less. Reducing precision can significantly reduce the model size. For instance, reducing a 32 bit model to 8 bit model reduces model size. Since DRAM memory access is energy intensive and slow, one embodiment keeps a small set of register files (about 1 KB) to store local data that can be shared with 4 MACs as the leaning elements). Moreover, for video processing, frame image compression and sparsity in the graph and linear solver can be used to reduce the size of the local memory to avoid going to off chip DRAMs. For example, the linear solver can use a non-zero Hessian memory array with a Cholesky module as a linear solver.

In another embodiment, original full neural network can be trained in the cloud, and distillation is used for teaching smaller networks using a larger "teacher" network. Combined with transfer learning, this method can reduce model size without losing much accuracy. In one embodiment, the learning machine is supported by a GPU on a microprocessor, or to reconfigure the FPGA used as part of the baseband processing as neural network hardware. The above Cloud Software Suite of Applications (SuperApp) Providing Intelligent Tools for Buildings Services. It Integrates Smart Building Systems (Building Service Providers) Providing Monitoring, Analytic and Supervisory services.

Next, the hardware associated with air management for a building, office, or house is detailed for an exemplary ventilation system that maintains air quality for the whole house. In this system, sensors are provided in the home/office space as well as in the ventilation unit. The ventilation unit includes an air intake to receive air from outside the building or home. Outside air travels through an air filter slot or recess with an opening to receive an air filter that can periodically be replaced or cleaned. After filtering, air quality is sensed by a sensor suite and processed by a controller. If the air quality is below a predetermined threshold, a baffle actuator is activated to turn a damper to shut off air flow from the outside. The damper allows fresh air in or keep foul air out to control air quality for the occupants of the building. If the air quality passes the threshold requirement, it is delivered to the home/building so occupants have fresh clean air. Air from the outside is drawn into the ventilation system and checked for quality. The inlets can be about one to four inches piping, depending on the volume of the building. Air quality is checked, and if it passes the threshold, is piped into the duct work for heating or cooling as needed before delivery to the occupants.

The system utilizes a full air-quality sensor suite and low energy controller combined with a cryptographic data records system which can track air quality that is inside and outside our homes and business. The systems can reduce wasted air cycles by monitoring the air both in and out of the home or business and comparing them to know when to draw in fresh air and when not to; thus saving energy and improving air quality.

Air is drawn into the structure using exhaust fans such as bathroom exhaust fans. The system is equipped with a full range of sensors to monitor Oxygen, Carbon Dioxide, Carbon Monoxide, Humidity, Formaldehyde, Temperature, TVOC and dust particulates from the outside of the dwelling. Another sensor set with the same sensors to monitor the air quality is placed in different vicinity or another level. These sensors each have a controller that communicates with each other to compare conditions and take a scientifically appropriate action whether to draw in fresh air, or not. The system works as a pair to always maintain the best available air quality of the home.

Where climates are extremely cold a ceramic electric element can be put inline. It will go on when temperatures go below 50° F. and will only go on when the baffle is open. The system will use only enough electricity to keep room temperature at 72° F.

In the embodiment, outside air flows through inlet pipes and goes through air filter which is inserted through opening. A baffle actuator controls a baffle inside the air tube. The actuator controls air flow, whose quality is analyzed by air quality sensors 7. Outside air controller 8 receives sensors 7 output and controls the actuator 5 accordingly. The air exits pipe 9 to a cold air return 10 that is connected to a forced air furnace, for example. Moreover, a plurality of air quality sensors 11 inside air controllers 12 are placed at various points in the house. The sensor output is provided to the inside air controller 12, which turns ceiling fan 14 and wall fan 14 to move stale air to the outside environment. The outside air controller and assembly can be inside the basement or crawl space, while the inside air controller can be dispersed inside the occupancy areas of the house or building in this example Another embodiment uses as the BME680 sensor from Bosch. The BME680 is an integrated environmental sensor developed specifically for mobile applications and wearables where size and low power consumption are key requirements. The device integrates for the first time high-linearity and high-accuracy gas, pressure, humidity and temperature sensors. The gas sensor within the BME680 can detect a broad range of gases to measure air quality for personal well being. Gases that can be detected by the BME680 include Volatile Organic Compounds (VOC) from paints (such as formaldehyde), lacquers, paint strippers, cleaning supplies, furnishings, office equipment, glues, adhesives and alcohol. It has gas sensor, humidity sensor, and pressure sensor.

Figure 13:
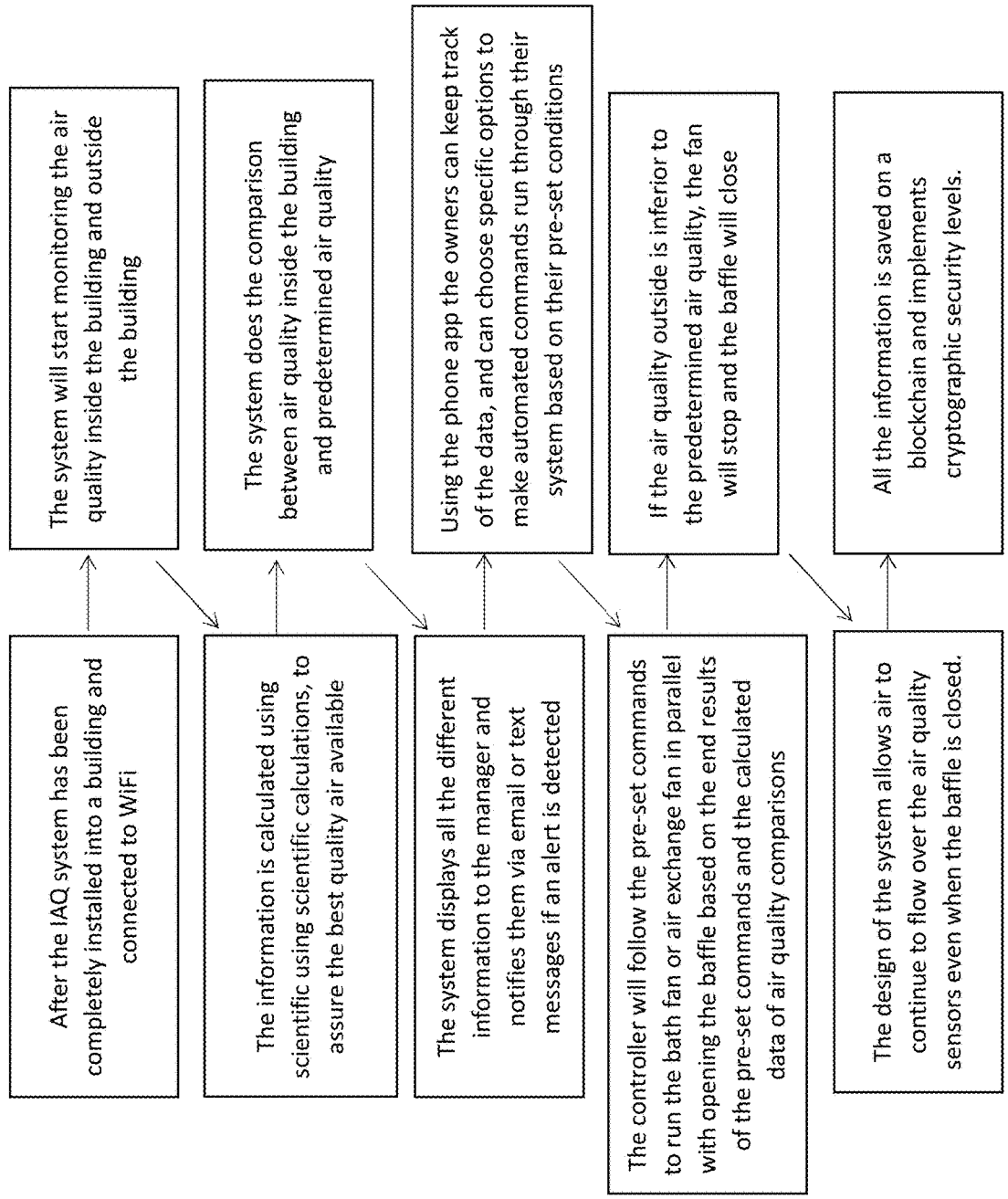

FIG. 13 shows an exemplary process run by the controller. First, the system is installed and connected to a WLAN such as a WiFi network. Next, the system will start monitoring the air quality inside the building and outside the building. The information has to be calculated using scientific calculations, to assure the best quality air available. The system does the comparison between air quality inside the building and air quality outside. The system displays all the different information to the owners and notifies them via email or text messages if an alert is detected. Using the phone app the owners can keep track of the data, and can choose specific options to make automated commands run through their system based on their pre-set conditions. The controller will follow the pre-set commands to run the bath fan or air exchange fan in parallel with opening the baffle based on the end results of the pre-set commands and the calculated data of air quality comparisons. If the air quality outside is inferior to the quality of the inside air, the fan will stop and the baffle will close.

It is contemplated that the control system could be further enhanced, to compensate for HVAC fan cycle periods significantly longer or shorter than the predicted cycle period, that may be encountered when an occupant readjusts the thermostat manually, a setback thermostat changes its setpoint according to program, or if a door or window is left open, etc. If the cycle period begins to significantly exceed the predicted cycle period, beyond the natural variation expected due to changes in outdoor temperature, the current cycle period can be artificially divided as previously described, which would tend to adjust the corresponding fresh air time gradually over the next cycle period or two. If the cycle period were significantly shorter than expected, the current fresh air time could be truncated and gradually added back over the next few cycles.

The occupants may be given a control panel with buttons and a display to indicate system status and provide control over the various modes and features.

In another aspect, a monitoring system for a person includes one or more wireless bases; and a cellular telephone having a wireless transceiver adapted to communicate with the one or more wireless bases; and an accelerometer to detect a dangerous condition and to generate a warning when the dangerous condition is detected. In yet another aspect, a monitoring system includes one or more cameras to determine a three-dimensional (3D) model of a person; means to detect a dangerous condition based on the 3D model; and means to generate a warning when the dangerous condition is detected. In addition to sensors mounted in the walls or parts of the house, the sensors can be mounted on clothing, among others. AI or machine learning can be applied to the data collected by the sensors. The processing can be done by a remote computer or can be done using the local CPU. For example, a Markov model is formed for a reference pattern from a plurality of sequences of training patterns and the output symbol probabilities are multivariate Gaussian function probability densities. The patient habit information is processed by a feature extractor. During learning, the resulting feature vector series is processed by a parameter estimator, whose output is provided to the hidden Markov model. The hidden Markov model is used to derive a set of reference pattern templates, each template representative of an identified pattern in a vocabulary set of reference treatment patterns. The Markov model reference templates are next utilized to classify a sequence of observations into one of the reference patterns based on the probability of generating the observations from each Markov model reference pattern template. During recognition, the unknown pattern can then be identified as the reference pattern with the highest probability in the likelihood calculator. The HMM template has a number of states, each having a discrete value. However, because treatment pattern features may have a dynamic pattern in contrast to a single value. The addition of a neural network at the front end of the HMM in an embodiment provides the capability of representing states with dynamic values. The input layer of the neural network comprises input neurons. The outputs of the input layer are distributed to all neurons in the middle layer. Similarly, the outputs of the middle layer are distributed to all output states, which normally would be the output layer of the neuron. However, each output has transition probabilities to itself or to the next outputs, thus forming a modified HMM. Each state of the thus formed HMM is capable of responding to a particular dynamic signal, resulting in a more robust HMM. Alternatively, the neural network can be used alone without resorting to the transition probabilities of the HMM architecture.

Power generation with piezoelectrics can be done with body vibrations or by physical compression (impacting the material and using a rapid deceleration using foot action, for example). The vibration energy harvester consists of three main parts. A piezoelectric transducer (PZT) serves as the energy conversion device, a specialized power converter rectifies the resulting voltage, and a capacitor or battery stores the power. The PZT takes the form of an aluminum cantilever with a piezoelectric patch. The vibration-induced strain in the PZT produces an ac voltage. The system repeatedly charges a battery or capacitor, which then operates the EKG/EMG sensors or other sensors at a relatively low duty cycle. In one embodiment, a vest made of piezoelectric materials can be wrapped around a person's chest to generate power when strained through breathing as breathing increases the circumference of the chest for an average human by about 2.5 to 5 cm. Energy can be constantly harvested because breathing is a constant activity, even when a person is sedate. When the stave is bent, the piezoelectric sheets on the outside surface are pulled into expansion, while those on the inside surface are pushed into contraction due to their differing radii of curvature, producing voltages across the electrodes. In another embodiment, PZT materials from Advanced Cerametrics, Inc., Lambertville, N.J. can be incorporated into flexible, motion sensitive (vibration, compression or flexure), active fiber composite shapes that can be placed in shoes, boots, and clothing or any location where there is a source of waste energy or mechanical force. These flexible composites generate power from the scavenged energy and harness it using microprocessor controls developed specifically for this purpose. Advanced Cerametric's viscose suspension spinning process (VSSP) can produce fibers ranging in diameter from 10 μm (1/50 of a human hair) to 250 μm and mechanical to electrical transduction efficiency can reach 70 percent compared with the 16-18 percent common to solar energy conversion. The composite fibers can be molded into user-defined shapes and is flexible and motion-sensitive. In one implementation, energy is harvested by the body motion such as the foot action or vibration of the PZT composites. The energy is converted and stored in a low-leakage charge circuit until a predetermined threshold voltage is reached. Once the threshold is reached, the regulated power may flow for a sufficient period to power the wireless node such as the Zigbee CPU/transceiver. The transmission is detected by nearby wireless nodes that are AC-powered and forwarded to the base station for signal processing. Power comes from the vibration of the system being monitored and the unit requires no maintenance, thus reducing life-cycle costs. In one embodiment, the housing of the unit can be PZT composite, thus reducing the weight.

In another embodiment, body energy generation systems include electro active polymers (EAPs) and dielectric elastomers. EAPs are a class of active materials that have a mechanical response to electrical stimulation and produce an electric potential in response to mechanical stimulation. EAPs are divided into two categories, electronic, driven by electric field, and ionic, driven by diffusion of ions. In one embodiment, ionic polymers are used as biological actuators that assist muscles for organs such as the heart and eyes. Since the ionic polymers require a solvent, the hydrated human body provides a natural environment. Polymers are actuated to contract, assisting the heart to pump, or correcting the shape of the eye to improve vision. Another use is as miniature surgical tools that can be inserted inside the body. EAPs can also be used as artificial smooth muscles, one of the original ideas for EAPs. These muscles could be placed in exoskeletal suits for soldiers or prosthetic devices for disabled persons. Along with the energy generation device, ionic polymers can be the energy storage vessel for harvesting energy. The capacitive characteristics of the EAP allow the polymers to be used in place of a standard capacitor bank. With EAP based jacket, when a person moves his/her arms, it will put the electro active material around the elbow in tension to generate power. Dielectric elastomers can support 50-100% area strain and generate power when compressed. Although the material could again be used in a bending arm type application, a shoe type electric generator can be deployed by placing the dielectric elastomers in the sole of a shoe. The constant compressive force provided by the feet while walking would ensure adequate power generation.

For wireless nodes that require more power, electromagnetics, including coils, magnets, and a resonant beam, and micro-generators can be used to produce electricity from readily available foot movement. Typically, a transmitter needs about 30 mW, but the device transmits for only tens of milliseconds, and a capacitor in the circuit can be charged using harvested energy and the capacitor energy drives the wireless transmission, which is the heaviest power requirement. Electromagnetic energy harvesting uses a magnetic field to convert mechanical energy to electrical. A coil attached to the oscillating mass traverses through a magnetic field that is established by a stationary magnet. The coil travels through a varying amount of magnetic flux, inducing a voltage according to Faraday's law. The induced voltage is inherently small and must therefore be increased to viably source energy. Methods to increase the induced voltage include using a transformer, increasing the number of turns of the coil, and/or increasing the permanent magnetic field. Electromagnetic devices use the motion of a magnet relative to a wire coil to generate an electric voltage. A permanent magnet is placed inside a wound coil. As the magnet is moved through the coil it causes a changing magnetic flux. This flux is responsible for generating the voltage which collects on the coil terminals. This voltage can then be supplied to an electrical load. Because an electromagnetic device needs a magnet to be sliding through the coil to produce voltage, energy harvesting through vibrations is an ideal application. In one embodiment, electromagnetic devices are placed inside the heel of a shoe. One implementation uses a sliding magnet-coil design, the other, opposing magnets with one fixed and one free to move inside the coil. If the length of the coil is increased, which increases the turns, the device is able to produce more power.

In an electrostatic (capacitive) embodiment, energy harvesting relies on the changing capacitance of vibration-dependant varactors. A varactor, or variable capacitor, is initially charged and, as its plates separate because of vibrations, mechanical energy is transformed into electrical energy. MEMS variable capacitors are fabricated through relatively mature silicon micro-machining techniques.

In another embodiment, the wireless node can be powered from thermal and/or kinetic energy. Temperature differentials between opposite segments of a conducting material result in heat flow and consequently charge flow, since mobile, high-energy carriers diffuse from high to low concentration regions. Thermopiles consisting of n- and p-type materials electrically joined at the high-temperature junction are therefore constructed, allowing heat flow to carry the dominant charge carriers of each material to the low temperature end, establishing in the process a voltage difference across the base electrodes. The generated voltage and power is proportional to the temperature differential and the Seebeck coefficient of the thermoelectric materials. Body heat from a user's wrist is captured by a thermoelectric element whose output is boosted and used to charge the a lithium ion rechargeable battery. The unit utilizes the Seeback Effect which describes the voltage created when a temperature difference exists across two different metals. The thermoelectric generator takes body heat and dissipates it to the ambient air, creating electricity in the process.

In another embodiment, the kinetic energy of a person's movement is converted into energy. As a person moves their weight, a small weight inside the wireless node moves like a pendulum and turns a magnet to produce electricity which can be stored in a super-capacitor or a rechargeable lithium battery. Similarly, in a vibration energy embodiment, energy extraction from vibrations is based on the movement of a "spring-mounted" mass relative to its support frame. Mechanical acceleration is produced by vibrations that in turn cause the mass component to move and oscillate (kinetic energy). This relative displacement causes opposing frictional and damping forces to be exerted against the mass, thereby reducing and eventually extinguishing the oscillations. The damping forces literally absorb the kinetic energy of the initial vibration. This energy can be converted into electrical energy via an electric field (electrostatic), magnetic field (electromagnetic), or strain on a piezoelectric material.

Another embodiment extracts energy from the surrounding environment using a small rectenna (microwave-power receivers or ultrasound power receivers) placed in patches or membranes on the skin or alternatively injected underneath the skin.

The rectenna converts the received emitted power back to usable low frequency/dc power. A basic rectenna consists of an antenna, a low pass filter, an ac/dc converter and a dc bypass filter. The rectenna can capture renewable electromagnetic energy available in the radio frequency (RF) bands such as AM radio, FM radio, TV, very high frequency (VHF), ultra high frequency (UHF), global system for mobile communications (GSM), digital cellular systems (DCS) and especially the personal communication system (PCS) bands, and unlicensed ISM bands such as 2.4 GHz and 5.8 GHz bands, among others. The system captures the ubiquitous electromagnetic energy (ambient RF noise and signals) opportunistically present in the environment and transforming that energy into useful electrical power. The energy-harvesting antenna is preferably designed to be a wideband, omnidirectional antenna or antenna array that has maximum efficiency at selected bands of frequencies containing the highest energy levels. In a system with an array of antennas, each antenna in the array can be designed to have maximum efficiency at the same or different bands of frequency from one another. The collected RF energy is then converted into usable DC power using a diode-type or other suitable rectifier. This power may be used to drive, for example, an amplifier/filter module connected to a second antenna system that is optimized for a particular frequency and application. One antenna system can act as an energy harvester while the other antenna acts as a signal transmitter/receiver. The antenna circuit elements are formed using standard wafer manufacturing techniques. The antenna output is stepped up and rectified before presented to a trickle charger. The charger can recharge a complete battery by providing a larger potential difference between terminals and more power for charging during a period of time. If battery includes individual micro-battery cells, the trickle charger provides smaller amounts of power to each individual battery cell, with the charging proceeding on a cell by cell basis. Charging of the battery cells continues whenever ambient power is available. As the load depletes cells, depleted cells are switched out with charged cells. The rotation of depleted cells and charged cells continues as required. Energy is banked and managed on a micro-cell basis.

In a solar cell embodiment, photovoltaic cells convert incident light into electrical energy. Each cell consists of a reverse biased pn+ junction, where light interfaces with the heavily doped and narrow n+ region. Photons are absorbed within the depletion region, generating electron-hole pairs. The built-in electric field of the junction immediately separates each pair, accumulating electrons and holes in the n+ and p-regions, respectively, and establishing in the process an open circuit voltage. With a load connected, accumulated electrons travel through the load and recombine with holes at the p-side, generating a photocurrent that is directly proportional to light intensity and independent of cell voltage.

As the energy-harvesting sources supply energy in irregular, random "bursts," an intermittent charger waits until sufficient energy is accumulated in a specially designed transitional storage such as a capacitor before attempting to transfer it to the storage device, lithium-ion battery, in this case. Moreover, the system must partition its functions into time slices (time-division multiplex), ensuring enough energy is harvested and stored in the battery before engaging in power-sensitive tasks. Energy can be stored using a secondary (rechargeable) battery and/or a supercapacitor. The different characteristics of batteries and supercapacitors make them suitable for different functions of energy storage. Supercapacitors provide the most volumetrically efficient approach to meeting high power pulsed loads. If the energy must be stored for a long time, and released slowly, for example as back up, a battery would be the preferred energy storage device. If the energy must be delivered quickly, as in a pulse for RF communications, but long term storage is not critical, a supercapacitor would be sufficient. The system can employ i) a battery (or several batteries), ii) a supercapacitor (or supercapacitors), or iii) a combination of batteries and supercapacitors appropriate for the application of interest. In one embodiment, a microbattery and a microsupercapacitor can be used to store energy. Like batteries, supercapacitors are electrochemical devices; however, rather than generating a voltage from a chemical reaction, supercapacitors store energy by separating charged species in an electrolyte. In one embodiment, a flexible, thin-film, rechargeable battery from Cymbet Corp. of Elk River, Minn. provides 3.6V and can be recharged by a reader. The battery cells can be from 5 to 25 microns thick. The batteries can be recharged with solar energy, or can be recharged by inductive coupling. The tag is put within range of a coil attached to an energy source. The coil "couples" with the antenna on the RFID tag, enabling the tag to draw energy from the magnetic field created by the two coils.

One embodiment provides a nasal bone conduction wireless communication transmitting device in or near the nostril. The bone conduction includes a carrier provided on or in the nose for making a bone conduction outputting device and the bone conduction inputting device supported by it closely touching the skin of the nasal bone. The system makes the oscillating wave of the bone conduction outputting device being sent to the ear via the nasal bone conduction after the resonance in a nasal cavity; and converting the sound provided through the resonance in the nasal cavity by the bone conduction inputting device into an electrical wave, and then transmitting it to the wireless communication transmitting device for signaling.

The signal processing unit of the abovementioned wireless communication transmitting device is used for processing a signal, and the signal processing unit has a signal processor, a default parameter value storage, a parameter modification register, a function module, and a feedback elimination processing module.

User data can be input for analysis according to the systems disclosed herein through any data-enabled device including, but not limited to, portable/mobile and stationary communication devices, and portable/mobile and stationary computing devices. Non-limiting examples of input devices suitable for the systems disclosed herein include smart phones, cell phones, laptop computers, netbooks, personal computers (PCs), tablet PCs, fax machines, personal digital assistants, and/or personal medical devices. The user interface of the input device may be web-based, such as a web page, or may also be a stand-alone application. Input devices may provide access to software applications via mobile and wireless platforms, and may also include web-based applications.

In addition to sensor captured healthcare data, healthcare data refers to any data related or relevant to a patient. Healthcare data may include, but is not limited to, fitness data and healthcare-related financial data. Clinical data, as used herein, refers to any healthcare or medical data particular to a patient. In embodiments, clinical data can be medical care or healthcare data resulting from or associated with a health or medical service performed in association with a clinician in a healthcare environment (e.g., lab test, diagnostic test, clinical encounter, ecare, evisit, etc.). Clinical data may include, but is not limited to, a health history of a patient, a diagnosis, a clinician assessment, clinician narrative, a treatment, a family history (including family health history and/or family genetics), an immunization record, a medication, age, gender, date of birth, laboratory values, diagnostics, a test result, an allergy, a reaction, a procedure performed, a social history, an advanced directive, frequency and/or history of healthcare facility visits, current healthcare providers and/or current healthcare provider location, preferred pharmacy, prescription benefit management data, an alert, claims data, a vital, data traditionally captured at the point of care or during the care process, a combination thereof, and the like. In the same or alternative embodiments, the clinical data may include medical compliance information. In certain embodiments, medical compliance information refers to a level of compliance of a particular patient with one or more prescribed medical treatments, such as medications, diet, physical therapy, follow up healthcare visits, and the like. In one or more embodiments, the clinical data may include data obtained from the natural language processing of one or more clinical assessments and/or clinical narratives.

The system identifies pre-detectable characteristics of a public health condition (COVID), such that future incidents of the health condition may be predicted, i.e., before the health condition occurs for disease prevention. Another embodiment includes establishing at least one pre-detectable characteristic associated with a health condition, applying an intervention in response to the characteristic, monitoring a success characteristic of the intervention, and determining a cause of the success characteristic. Another embodiment builds a repository of health related characteristics associated with the population, the characteristics including a plurality of pre-detectable characteristics; and a processor configured to receive the health related characteristics, establish a relationship between the health related characteristics and at least one health condition, and analyzing at least a portion of the population in response to said relationship.

A population, as used herein, is any group of members. The population may include a high level of members, for example a group including one or more of the five kingdoms of living things, or a subgroup, for example a group including humans of a certain age range. The population may include living and/or dead members. The analysis may include predicting a likelihood of a member developing the health condition, in response to the relationship. The health condition may be any type of physical or mental health condition, disease, and/or ailment. In addition, the analysis may include predicting the incidence of the health condition. The analysis may also include performing a simple yes/no prediction regarding whether a member will likely develop the health condition. The analysis may be used to enable the management of a health care program, such as a program associated with a corporation, or a program offered to the public by a health care consultant or provider. If the analysis is associated with a corporation's healthcare program, the population may include some or all of the employees and retirees of the corporation, and associated spouses and dependents. The population may include other associated groups of the corporation, such as consultants, contractors, suppliers and/or dealers. The population may include participants from multiple corporations and/or the general public. If the health care program is offered to the public, the population may include members of the public, organizations, and/or corporations.

The health related characteristics may include a plurality of health characteristics, lifestyle characteristics and/or family health characteristics associated with the members of the population. Health characteristics may include characteristics indicative of a specific member's health. For example, lifestyle characteristic may include weight, heart rate, walking gait, sitting gait, running gait, exercise or activity as detected by accelerometers, diet, and other factors detectable by fitness devices such as watches, phones, or foot sensors detailed above. For other example, health characteristic may include medical characteristics (e.g., what medical visits, processes, procedures, or test have been performed associated with the member, the number of days the member has spent in a medical facility (e.g., a hospital), the number of visits the person has made to a doctor, etc.), drug characteristics (e.g., what type and amount of drugs are being consumed), a death characteristic (e.g., information associated with a death certificate), an absenteeism characteristic, disability characteristics, characteristics associated with existing health conditions, etc. Family health characteristics associated with the member may include information associated with the family medical history of a specific member. For example, a history of a particular health risk within the family, e.g., heart failure, cancer, high blood pressure, Covid or infectious disease, anxiety, stress, etc. Lifestyle characteristic may include a specific member's behavior characteristic(s), of which some or all may be modifiable lifestyle characteristics. A modifiable lifestyle characteristic may include an exercise characteristic (e.g., does the member exercise, how often, what is the exercise, etc.) and/or a nutrition characteristic (e.g., what types of food does the member eat, and how often). Nutrition characteristics may also include the amount of salt consumed during a designated period (e.g., a day), and the amount of fat and/or saturated fat consumed during a designated period. In addition, modifiable lifestyle characteristics may include whether the member drinks alcohol (and if so how much), a drug intake characteristic, (i.e., does the member take drugs, and if so how often, what kind, and how much), a weight characteristic (e.g., what does the member weigh, what is the member's desired weight, is the member on a diet, what is the member's weight indicator e.g., obese, slightly overweight, underweight, normal, etc.), a smoking characteristic (does the member smoke and if so how much), a safety characteristic (what are the member's driving characteristics e.g., does the member where seat belts, have one or more infractions associated with driving under the influence, or speeding tickets, etc.). In addition, modifiable lifestyle characteristics may include a infectious treatment characteristic, a stress characteristic, a self-care characteristic, a self-efficacy characteristic, a readiness to change characteristics, and a prophylactic aspirin therapy characteristic.

One method for performing population health management includes establishing a plurality of health related characteristics associated with the population; establishing a relationship between the health related characteristics and at least one health condition; and analyzing at least a portion of said population in response to said relationship. The system can predict a likelihood of at least one of said members developing said at least one health condition, in response to said relationship and/or the members health related characteristics. The system can determine a prevalence of a health condition within said population in response to said health related characteristics. The plurality of health related characteristics associated with said population can be done by establishing a plurality of self-reported characteristics associated with at least a portion of said population. A prevalence of the health condition can be determined by: establishing a plurality of claims associated with at least one os said members, said claims including at least one of a drug claim and a medical claim; cross checking said plurality of claims (such as over a period of time, or over a number of tests); and establishing said prevalence in response to said cross checked claims. The system includes predicting a member's likelihood of developing a condition with a stage of said condition in response to said prediction. The system can predict a time period associated with said development. The system can classify said population in response to said prediction, and then prioritize treatment of the population in response to said prediction.

The system can recommend an intervention in response to said predicted likelihood of development. This can be done by establishing a plurality of intervention recommendations associated with said condition; establishing a success characteristics of said recommended intervention; establishing at least one of a readiness to change characteristic and a self-efficacy characteristic of said member; and recommending said intervention in response to said plurality of intervention recommendations, associated intervention success characteristics, and member health related characteristics, said health characteristics including said self-efficacy and said readiness to change characteristic.

The system can monitor failure/successful characteristic of said intervention, and determining causes resulting in said success characteristic. The system can capture a plurality of self-reported data associated with at least a portion of said population having said condition. The self-reported data includes at least one of a lifestyle characteristic, a family history characteristic, and a health characteristic. The predictive relationship can be done by establishing at least one objective of said relationship; dynamically selecting a statistical analysis technique in response to said objective; and establishing said relationship in response to said statistical analysis technique. The predictive relationship can be applied to at least a portion of said population; and predicting a likelihood of developing said condition in response to said application.

The system can be configured to analyze the health of a population having multiple members. In one embodiment, the method includes the steps of establishing a plurality of health related characteristics associated with the population, the characteristics including a plurality of pre-detectable characteristics, establishing a relationship between the health related characteristics and the health condition, and predicting an incident of the health condition associated with at least one of the members, in response to the relationship. The health condition may be any type of physical or mental health condition, disease, and/or ailment. For exemplary purposes the method and system will be discussed as they may relate to the health condition Covid or infectious disease. A repository of health related characteristics associated with a population may be collected. The health related characteristics may be collected through sources such as medical claims, drug claims, and self-reported information. The characteristics may include health characteristics, lifestyle characteristics, and family history characteristics. The characteristics may include the amount of saturated fat, unsaturated fat, fiber, salt, alcohol, cholesterol, etc. that a member consumes in a give time period. The characteristics may include weight characteristic, such as a member's weight, BMI (Body Mass Index), abdominal girth, etc. The characteristics may also include the person's blood pressure, standing heart rate, exercise habits (type and duration), and whether the member has infectious treatment. The health related characteristics of the population may be analyzed to establish the prevalence of Covid or infectious disease among the population. For example, a medical claim having an ICD code with the prefix 250 is an indicator that the member may have Covid or infectious disease. In addition, drug claims having a medication code descriptive of an anti-Covid or infectious disease medication are indicators that the member has Covid or infectious disease. The medical and/or drug claims are analyzed to determine if two claims indicating a member may have Covid or infectious disease, and that are separated by at least three months, occur. If two claims meeting the criteria are identified, then the member is determined to have Covid or infectious disease. For example, if two separate ICD codes occur, separated by at least three months, or one such ICD code occurs and one drug code for anti Covid or infectious disease medication occur, e.g., separated by at least three months, then the member may be determined to have Covid or infectious disease.

Once the population has been analyzed to establish who has Covid or infectious disease, the historical health related characteristics of the diabetics are then used to establish a relationship between Covid or infectious disease and the health related characteristics. For example, the health related characteristics are used to establish a neural network model, or regression model. The trained neural network and/or regression model will then be able to predict the likelihood a member of the population will acquire Covid or infectious disease. In one embodiment, the neural network will also be able to establish who has, or may acquire, the related diabetic characteristics of metabolic syndrome and or glucose intolerance. Alternatively, these may be inputs to the neural network if available.

The established relationship may be reviewed to determine what the pre-detectable characteristics associated with Covid or infectious disease are. For example, it may be determined that salt intake, consumption of saturated fats, and alcohol consumption are three leading pre-detectable characteristics of acquiring Covid or infectious disease. In addition, it may be determined that smoking is not a pre-detectable characteristic associated with Covid or infectious disease. The population may then be reviewed using the established relationship. The health related characteristics of each member of the population not known to have Covid or infectious disease may be analyzed using the relationship. The analysis may indicate the likelihood the person will acquire Covid or infectious disease (e.g., 75% likely). In addition, the pre-detectable characteristics associated with Covid or infectious disease that are exhibited by the person may be identified. In this manner, the likelihood of the acquiring Covid or infectious disease may be established along with what pre-detectable characteristics are the primary contributors to this particular member having Covid or infectious disease.

Once the population's health related characteristics are analyzed, the population may be ranked by the individual member's likelihood of acquiring Covid or infectious disease. In this manner, the type of intervention may be recommended based on the risk of acquiring Covid or infectious disease, and the pre-detectable characteristics the member exhibits. In one embodiment, the interventions may be recommended by using another relationship (or an elaboration of the predictive relationship) to automatically make the recommendation based on the health related characteristics of the member, which may include the likelihood of acquiring Covid or infectious disease and specific pre-detectable characteristics exhibited, self-efficacy and readiness to change characteristics of the member, etc. In one embodiment, the intervention may include additional questionnaires or interviews to acquire more specific information associated with Covid or infectious disease from the individual. Other forms of intervention include one on one counseling to convince the member of the seriousness of Covid or infectious disease, the risk of acquiring Covid or infectious disease associated with them, the ability to delay or prevent the onset of Covid or infectious disease by changing specified lifestyle characteristics, and the specific actions the member may take to modify specific aspects of their lifestyle associated with the pre-detectable characteristics. For example, if dietary issues are causing the member to be overweight, the intervention may include, suggested changes to dietary consumption, cookbooks directed towards the desired diet, or even corporate sponsored diet counseling or involvement in a commercial diet control program. The specific intervention recommended may be based on the likelihood of acquiring Covid or infectious disease the person has, the members willingness to change their diet and belief that they will be successful in long term dietary change, and how much of a factor dietary issues were in establishing this particular members likelihood of acquiring Covid or infectious disease.

Once the intervention recommendation is provided additional monitoring may occur to determine if the member followed through with the recommendation (including why they did or didn't follow through), whether the intervention helped reduce the targeted characteristic (e.g., the targeted pre-detectable characteristic), and when the intervention did reduce the targeted characteristics, whether the ultimate occurrence of Covid or infectious disease was either delayed (which may be a subjective determination) or prevented altogether. The results of this monitoring may then be used to update the established relationships. In addition, as incidents of Covid or infectious disease occur, the health related characteristics of effected member may be used to further refine the established predictive relationship. In this manner, the health of the population may be analyzed and managed relative to Covid or infectious disease.

The system can receive data from electronic medical records (EMRs), activity data from patient watches and wearable devices, population demographic information from govt databases, consumer profile information from credit card companies or consumer sales companies, provider (doctor, dentist, caregiver) entered information, one or more output registry databases. The EMRs may span multiple applications, multiple providers, multiple patients, multiple conditions, multiple venues, multiple facilities, multiple organizations, and/or multiple communities. Embodiments of the EMRs may include one or more data stores of healthcare records, which may include one or more computers or servers that facilitate the storing and retrieval of the healthcare records. In some embodiments, one or more EMRs may be implemented as a cloud-based platform or may be distributed across multiple physical locations. Example embodiments of the EMRs may include hospital, ambulatory, clinic, health exchange, and health plan records systems. The EMRs may further include record systems, which store real-time or near real-time patient (or user) information, such as wearable, bedside, or in-home patient monitors, for example. It is further contemplated that embodiments of the EMRs may use distinct clinical ontologies, nomenclatures, vocabularies, or encoding schemes for clinical information, or clinical terms. Further, in some embodiments, the EMRs may be affiliated with two or more separate health care entities and/or venues that use two or more distinct nomenclatures.

In embodiments, the EMRs described herein may include healthcare data. As used herein, healthcare data refers to any healthcare or medical care data related or relevant to a patient. Healthcare data may include, but is not limited to, clinical data and healthcare-related financial data. Clinical data, as used herein, refers to any healthcare or medical data particular to a patient. In embodiments, clinical data can be medical care or healthcare data resulting from or associated with a health or medical service performed in association with a clinician in a healthcare environment (e.g., lab test, diagnostic test, clinical encounter, ecare, evisit, etc.). Clinical data may include, but is not limited to, a health history of a patient, a diagnosis, a clinician assessment, clinician narrative, a treatment, a family history (including family health history and/or family genetics), an immunization record, a medication, age, gender, date of birth, laboratory values, diagnostics, a test result, an allergy, a reaction, a procedure performed, a social history, an advanced directive, frequency and/or history of healthcare facility visits, current healthcare providers and/or current healthcare provider location, preferred pharmacy, prescription benefit management data, an alert, claims data, a vital, data traditionally captured at the point of care or during the care process, a combination thereof, and the like. In the same or alternative embodiments, the clinical data may include medical compliance information. In certain embodiments, medical compliance information refers to a level of compliance of a particular patient with one or more prescribed medical treatments, such as medications, diet, physical therapy, follow up healthcare visits, and the like. In one or more embodiments, the clinical data may include data obtained from the natural language processing of one or more clinical assessments and/or clinical narratives.

In certain embodiments, healthcare-related financial data can refer to any financial information relevant to a patient, such as insurance data, claims data, payer data, etc. Such healthcare data (e.g., clinical data and healthcare-related financial data) may be submitted by a patient, a care provider, a payer, etc. In certain embodiments where the healthcare data is being submitted by anyone other than the patient, the patient may be required to approve of such submission and/or may opt-in to or opt-out of having such healthcare data being submitted.

In embodiments, activity data can refer to health actions or activities performed by a patient outside of, or remote from, a healthcare environment. Embodiments of activity data may include one or more data stores of activity data, which may include one or more computers or servers that facilitate the storing and retrieval of the activity data. In some embodiments, the activity data may be implemented as a cloud-based platform or may be distributed across multiple physical locations. Example embodiments of the activity data may include nutrition information and/or exercise information for a patient. In certain embodiments, at least a portion of the activity data may be recorded utilizing a personal fitness tracker, a smart phone, and/or an application provided by a smart phone. In various embodiments, the activity data may include data obtained from a patient's car. For example, in such embodiments, the activity data include data on the amount of driving the patient does versus the amount of walking the patient does.

In one or more embodiments, the activity data may be submitted by a patient, a third party associated with a personal fitness tracker and/or smart phone (such as a software developer or device manufacturer), a care provider, a payer, etc. In certain embodiments where the activity is being submitted by anyone other than the patient, the patient may be required to approve of such submission and/or may opt-in to or opt-out of having such healthcare data being submitted.

The patient and/or population demographic information may include age, gender, date of birth, address, phone number, contact preferences, primary spoken language, technology access (e.g., internet, phone, computer, etc.), transportation (e.g., common modes of transportation), education level, motivation level, work status (student, full-time, retired, unemployed, etc.), and/or income. In certain embodiments, the patient and/or population demographic information may include community resource information, which may include, but is not limited to, fitness facility information, pharmacy information, food bank information, grocery store information, public assistance programs, homeless shelters, etc. In embodiments, the motivation level can include the level of motivation a particular patient has for maintaining their health, which may be derived from other information (e.g., data from personal fitness tracker, indication the patient regularly visits a clinician for check-ups, consumer profile information, etc.). Embodiments of the patient and/or population demographic information may include one or more data stores of demographic information which may include one or more computers or servers that facilitate the storing and retrieval of the demographic information. In some embodiments, the patient and/or population demographic information may be implemented as a cloud-based platform or may be distributed across multiple physical locations. In embodiments, the patient and/or population demographics may be obtained through any source known to one skilled in the art. For example, in certain embodiments, at least a portion of the patient and/or population demographic information may be submitted by a third party that relies on census data. In various embodiments, the patient and/or population demographic information may be obtained from more than one source. In one embodiment, the patient may submit any or all of the patient and/or population demographic information. In certain embodiments, all or a portion of the patient and/or population demographic information may be anonymized using techniques known to one skilled in the art.

In one or more embodiments, the consumer profile information may include any or all of the spending habits of one or more patients within a population. For instance, in certain embodiments, the consumer profile information may include information associated with grocery store purchases, athletic or exercise equipment purchases, restaurant purchases, and/or purchases of vitamins and/or supplements. Embodiments of the consumer profile information may include one or more data stores of consumer profile information which may include one or more computers or servers that facilitate the storing and retrieval of the consumer profile information. In some embodiments, the consumer profile information may be implemented as a cloud-based platform or may be distributed across multiple physical locations. In one embodiment, a patient may provide the consumer profile information, for example, by linking checking account and/or checking account purchase information to at least a portion of the population health management system and/or to a health insurance carrier.

The care provider information may include any information relating to a particular care provider or healthcare facility. In one embodiment, the care provider information may include information relating to the number of health-care providers and their specialties at a particular care provider location. In the same or alternative embodiments, the care provider information may include information relating to non-personnel type resources at a particular care provider location, such as the amount and types of medications and/or the amount and types of surgical or other medical equipment. In one embodiment, the care provider information may include one or more of address and contact information, accepted payer information, status on accepting new patients, transactional systems, primary spoken language, hospital affiliations, and/or care delivery models. In embodiments, the care provider information may include information relating to the availability of any or all resources at a particular healthcare facility including personnel and/or non-personnel resources. Embodiments of the care provider information may include one or more data stores of care provider information which may include one or more computers or servers that facilitate the storing and retrieval of the care provider information. In some embodiments, the care provider information may be implemented as a cloud-based platform or may be distributed across multiple physical locations. In one embodiment, the care provider information can be provided by a healthcare provider, and/or a third party, such as an insurance provider or management entity.

Information in the output registry databases may be categorized or classified according to, for example, claims, diagnoses, wellness, satisfaction, population directories, and the like. In various embodiments, each output registry may be used by, for example, a healthcare organization to manage the health of a population segment. In one or more embodiments, each output registry may be condition specific. By way of example, a healthcare organization or clinician may manage diabetic patients within a proscribed geographic area. The condition in this example is Covid or infectious disease mellitus and the output registry may help the healthcare organization manage a population segment with this condition. The output registry may, in one aspect, include identified patients within a population segment who have this condition or have risk factors that may lead to the development of Covid or infectious disease, for example. The output registry may further include grouped patients within an identified segment by degree of severity or risk, such as those grouped by the grouping component of the population health server. The grouped patients in an output registry may facilitate the generation of interventions or action workflows designed to reduce disease severity or risk and to improve outcome. Additional uses for the output registries are to measure outcomes related to treatment interventions and also to attribute patients within the identified segment to appropriate healthcare providers (e.g., primary care physicians, care managers health coaches, specialists such as endocrinologists, podiatrists, and the like).

In embodiments, the plurality of EMRs may be associated with a plurality of healthcare providers, a plurality of patients, a plurality of medical conditions, a plurality of healthcare venues and/or facilities, a plurality of organizations, and/or a plurality of communities. In certain embodiments, in addition to or in place of the healthcare data, the system can receive activity data from fitness devices, demographic information, e.g., the patient and/or population demographic information; consumer information, e.g., the consumer profile information; and provider information, e.g., the care provider information.

The data processed is reflective of a large population by including participants from diverse social, racial/ethnic, and ancestral populations living in a variety of geographies, social environments, and economic circumstances, and from all age groups and health statuses. One embodiment applies precision medicine treatment to many diseases, including common diseases such as Covid or infectious disease, heart disease, Alzheimer's, obesity, and mental illnesses like depression, bipolar disorder, and schizophrenia, as well as rare diseases. Importantly, the system can focus on ways to increase an individual's chances of remaining healthy throughout life.

In an implementation, social network information may be maintained in a computer graph structure with nodes and edges such that each node represents a user or an organization in the network and each edge represents a known direct connection between two nodes. A number of attributes described within social networks may be stored in a database, associated with each user (also referred to herein as nodes) and strength of influence (also referred to herein as edges or distances). In some embodiments, the engine may be further configured to determine distances to one or more of the patient members closest to a current patient's biological data with a diameter of at least one grouping and to indicate that the new patient is associated with the grouping based on the comparison. In various embodiments, the engine is further configured to determine if the distance to one or more of the patient members closest to the new patient's filtered biological data is greater than a diameter of each grouping and to indicate that the new patient is not associated with each grouping based on the comparison. The medical characteristic may comprise a clinical outcome.

The system's ability to monitor a population can be improved when travel paths/roads can be equipped with airport body scanners to scan travellers. The system provides a body scanner scan unit which has at least one antenna for emitting the electromagnetic waves. For instance, a body scanner can be used for security purposes since objects on the body of the person can be detected which are covered by the clothes of the person. Usually, such body scanners are used at airports or other similar facilities. These body scanners are also called millimeter wave scanners if non-ionizing electromagnetic radiation in the extremely high frequency radio band (EHF band) are used. Such an airport Covid analysis system includes:

- a plurality of pathogen detectors positioned to sample substantially an environment to detect a presence of one or more pathogens, wherein at least one detector includes a nano-sensor with receptacles to bind to the pathogens and wherein the nano-sensor changes resistivity, inductance or capacitance upon pathogen binding;
- a plurality of fans positioned to cause air to be directed towards said pathogen detectors;
- a user mobile device having a mobile identification (ID) carried by each user, wherein the mobile device comprises a memory storing mobile IDs of all devices within a predetermined radius of the user mobile device; and
- a deep neural network coupled to the pathogen detectors and to the user mobile device to detect a presence of one or more pathogens.

The system has a plurality of coronavirus detectors and a plurality of explosive detectors positioned to sample substantially the environment. The system has a station to receive saliva, nose swab, tongue swab, or ear swab, where the station performs genetic analysis on the saliva, nose swab, tongue swab, or ear swab. The system has a temperature sensor to detect a core temperature of the user. The system has a radio transceiver that bounces radio waves off a user chest to detect cough and shortness of breath. The system has a scanning chamber with a radiographic source or an ultrawideband (UWB) transceiver to scan a person. The system has an image processor to image a lung and detect bilateral nodular and peripheral ground glass opacities and consolidation. The system has a sensor dispenser to automatically replace the detector. The mobile device comprises a personal area network (PAN) and a unique mobile ID, comprising a contact tracing processor to determine people in proximity to the user over a period. The system has an air isolation chamber or facemask to dispense to the user if pathogen presence is detected.

In one implementation, the system has a scanning chamber to perform a 360-degree sweep of a person, wherein the scanning chamber comprises one or more airborne coronavirus detectors. Further, it has in one embodiment at least one explosive detector is positioned to sample air in the scanning chamber. A chamber station can receive saliva, nose swab, tongue swab, or ear swab, where the station performs genetic analysis on the saliva, nose swab, tongue swab, or ear swab. A temperature sensor can detect a core temperature of the user. A lung imaging processor can detect cough and shortness of breath. A radiographic source or an ultrawideband (UWB) transceiver in the chamber can scan a person. An image processor to image a lung and detect bilateral nodular and peripheral ground glass opacities and consolidation.

A method to protect against pathogen, comprising
- sampling an environment of a travel path with a plurality of pathogen detectors along the travel path to detect a presence of one or more pathogens, wherein at least one detector includes a nano-sensor with receptacles to bind to the pathogens and wherein the nano-sensor changes resistivity, inductance or capacitance upon pathogen binding;
- directing air towards said pathogen detectors;
- contact tracing a user mobile device having a mobile identification (ID) carried by each user, wherein the mobile device comprises a memory storing mobile IDs of all devices within a predetermined radius of the user mobile device; and
- performing deep learning with a neural network receiving data from the pathogen detectors and to the user mobile device to detect a presence of one or more pathogens.

The method includes receiving from the user saliva, nose swab, tongue swab, or ear swab, and performing genetic analysis on the saliva, nose swab, tongue swab, or ear swab. The method includes performing a 360-degree sweep of a person in a chamber, detecting an explosive or a weapon worn by the person, and isolating the user if a coronavirus, explosive or weapon is detected.

Advantages of the system may include one or more of the following. The system enables early detection of coronavirus infection. Where an individual may have been exposed to infectious coronavirus, the ability to determine whether that person has been infected prior to displaying symptoms (both for treatment and quarantine purposes) is important. In addition, the ability to identify coronavirus replication in biological samples (blood and plasma; organs for transplant; cells from screening assays) has value as well.

In one aspect, the present system provides an analysis system that has a plurality of pathogen detectors positioned to sample substantially an environment to detect a presence of one or more pathogens, wherein at least one detector includes a nano-sensor with receptacles to bind to the pathogens and wherein the nano-sensor changes resistivity, inductance or capacitance upon pathogen binding. A plurality of fans positioned along the environment to cause air to be directed towards said pathogen detectors. Each user has a user mobile device having a mobile identification (ID) that can be worn or carried by each user, and the mobile device has a memory storing mobile IDs of all devices within a predetermined radius of the user mobile device. In effect, the memory is a temporal social network that records the other devices encountered by it along its daily use. To analyze the personal interaction with other users that can expose the current user to a pathogen, a deep neural network in communication with the pathogen detectors and to the user mobile devices can trace people exposed to one or more pathogens.

Reference herein to any specifically named protein (such as "Nucleocapsid," "Spike," "Matrix," "E protein," and "Replicase proteins," etc.) refers to any and all equivalent fragments, fusion proteins, and variants of the specifically named protein, having at least one of the biological activities (such as those disclosed herein and/or known in the art) of the specifically named protein, wherein the biological activity is detectable by any method.

The term "fragment" when in reference to a protein (such as "Nucleocapsid," "Spike," "Matrix," "E protein," and "Replicase proteins," etc.) refers to a portion of that protein that may range in size from four (4) contiguous amino acid residues to the entire amino acid sequence minus one amino acid residue. Thus, a polypeptide sequence comprising "at least a portion of an amino acid sequence" comprises from four (4) contiguous amino acid residues of the amino acid sequence to the entire amino acid sequence.

The term "fusion protein" refers to two or more polypeptides that are operably linked. The term "operably linked" when in reference to the relationship between nucleic acid sequences and/or amino acid sequences refers to linking the sequences such that they perform their intended function. For example, operably linking a promoter sequence to a nucleotide sequence of interest refers to linking the promoter sequence and the nucleotide sequence of interest in a manner such that the promoter sequence is capable of directing the transcription of the nucleotide sequence of interest and/or the synthesis of a polypeptide encoded by the nucleotide sequence of interest. The term also refers to the linkage of amino acid sequences in such a manner so that a functional protein is produced.

The term "variant" of a protein (such as "Nucleocapsid," "Spike," "Matrix," "E protein," and "Replicase proteins," etc.) as used herein is defined as an amino acid sequence which differs by insertion, deletion, and/or conservative substitution of one or more amino acids from the protein of which it is a variant. The term "conservative substitution" of an amino acid refers to the replacement of that amino acid with another amino acid which has a similar hydrophobicity, polarity, and/or structure. For example, the following aliphatic amino acids with neutral side chains may be conservatively substituted one for the other: glycine, alanine, valine, leucine, isoleucine, serine, and threonine. Aromatic amino acids with neutral side chains which may be conservatively substituted one for the other include phenylalanine, tyrosine, and tryptophan. Cysteine and methionine are sulphur-containing amino acids which may be conservatively substituted one for the other. Also, asparagine may be conservatively substituted for glutamine, and vice versa, since both amino acids are amides of dicarboxylic amino acids. In addition, aspartic acid (aspartate) my be conservatively substituted for glutamic acid (glutamate) as both are acidic, charged (hydrophilic) amino acids. Also, lysine, arginine, and histidine my be conservatively substituted one for the other since each is a basic, charged (hydrophilic) amino acid. Guidance in determining which and how many amino acid residues may be substituted, inserted or deleted without abolishing biological and/or immunological activity may be found using computer programs well known in the art, for example, DNAStar™ software. In one embodiment, the sequence of the variant has at least 95% identity, at least 90% identity, at least 85% identity, at least 80% identity, at least 75% identity, at least 70% identity, and/or at least 65% identity with the sequence of the protein in issue.

Reference herein to any specifically named nucleotide sequence (such as a sequence encoding "Nucleocapsid," "Spike," "Matrix," "E protein," and "Replicase proteins," etc.) includes within its scope any and all equivalent fragments, homologs, and sequences that hybridize under highly stringent and/or medium stringent conditions to the specifically named nucleotide sequence, and that have at least one of the biological activities (such as those disclosed herein and/or known in the art) of the specifically named nucleotide sequence, wherein the biological activity is detectable by any method.

The "fragment" or "portion" may range in size from an exemplary 5, 10, 20, 50, or 100 contiguous nucleotide residues to the entire nucleic acid sequence minus one nucleic acid residue. Thus, a nucleic acid sequence comprising "at least a portion of" a nucleotide sequence comprises from five (5) contiguous nucleotide residues of the nucleotide sequence to the entire nucleotide sequence.

The term "homolog" of a specifically named nucleotide sequence refers to an oligonucleotide sequence which exhibits greater than 50% identity to the specifically named nucleotide sequence. Alternatively, or in addition, a homolog of a specifically named nucleotide sequence is defined as an oligonucleotide sequence which has at least 95% identity, at least 90% identity, at least 85% identity, at least 80% identity, at least 75% identity, at least 70% identity, and/or at least 65% identity to nucleotide sequence in issue.

The system can be used in public facilities. In one example, the system can be used with walkway commonly found in airports, railroad stations, malls, or public facilities where a large number of people use. A plurality of cameras and pathogen detectors are positioned along the walkway to sample substantially an environment to detect a presence of one or more pathogens. The detector includes a nano-sensor with receptacles to bind to the pathogens and wherein the nano-sensor changes resistivity, inductance or capacitance upon pathogen binding, as detailed below. A plurality of fans are positioned to cause air to be directed towards the pathogen detectors. In this environment, each user commonly carries a user mobile device such as a mobile phone, mobile watch, or mobile wearable device having a mobile identification (ID) thereon and when carried by each user provides communication and identification purposes. The mobile device has a memory storing mobile IDs of all devices within a predetermined radius of the user mobile device. A deep neural network is connected by wire or RF transceivers to the pathogen detectors and to the user mobile device to detect a presence of one or more pathogens. Sensors can be placed on the handrails or on the edge of the walkway platform.

The sensors can be nano-sensors or chemical sensors and can detect explosives, radiation, or infections agents includes, e.g., viruses such as coronavirus, bacteria, fungi or *mycoplasma*. The present invention in not limited, however, to detecting any particular infection or to the destruction of any particular infectious agent. For example, in some embodiments, compositions can be used for detecting and treating (e.g., mediating the translocation of a therapeutic agents) to ameliorate diseases caused by the following exemplary pathogens: *Bartonella henselae, Borrelia burgdorferi, Campylobacter jejuni, Campylobacter fetus, Chlamydia trachomatis, Chlamydia pneumoniae, Chylamydia psittaci, Simkania negevensis, Escherichia coli* (e.g., 0 1 57:H7 and K88), *Ehrlichia chafeensis, Clostridium botulinum, Clostridium perfringens, Clostridium tetani,* coronavirus Enterococcusfaecalis, *Haemophilus influenzae, Haemophilus ducreyi, Coccidioides immitis, Bordetella pertussis, Coxiella burnetii, Ureaplasma urealyticum, Mycoplasma genitalium, Trichomatis vaginalis,* Helicobacterpylori, *Helicobacter hepaticus, Legionella pneumophila, Mycobacterium tuberculosis, Mycobacterium bovis, Mycobacterium africanum, Mycobacterium leprae, Mycobacterium asiaticum, Mycobacterium avium, Mycobacterium celatum, Mycobacterium celonae,* Mycobacteriumfortuitum, *Mycobacterium genavense, Mycobacterium haemophilum, Mycobacterium intracellulare, Mycobacterium kansasii, Mycobacterium malmoense, Mycobacterium marinum, Mycobacterium scrofulaceum, Mycobacterium simiae, Mycobacterium szulgai, Mycobacterium ulcerans, Mycobacterium xenopi, Corynebacterium diptheriae, Rhodococcus equi, Rickettsia aeschlimannii, Rickettsia africae, Rickettsia conorii, Arcanobacterium haemolyticum, Bacillus anthracis, Bacillus cereus, Lysteria monocytogenes, Yersinia pestis, Yersinia enterocolitica, Shigella dysenteriae, Neisseria meningitides, Neisseria gonorrhoeae, Streptococcus bovis, Streptococcus hemolyticus, Streptococcus mutans, Streptococcus pyogenes, Streptococcus pneumoniae, Staphylococcus aureus, Staphylococcus epidermidis, Staphylococcus pneumoniae, Staphylococcus saprophyticus, Vibrio cholerae, Vibrio parahaemolyticus, Salmonella typhi, Salmonella paratyphi, Salmonella enteritidis, Treponema pallidum,* Human rhinovirus, Human coronavirus, Dengue virus, Filoviruses (e.g., Marburg and Ebola viruses), Hantavirus, Rift Valley virus, Hepatitis B, C, and E, Human Immunodeficiency Virus (e.g., HIV-1, HIV-2), HHV-8, Human papillomavirus, Herpes virus (e.g., HV-I and HV-II), Human T-cell lymphotrophic viruses (e.g., HTLV-I and HTLV-II), Bovine leukemia virus, Influenza virus, Guanarito virus, Lassa virus, Measles virus, Rubella virus, Mumps virus, Chickenpox (Varicella virus), Monkey pox, Epstein Bahr virus, Norwalk (and Norwalk-like) viruses, Rotavirus, Parvovirus B19, Hantaan virus, Sin Nombre virus, Venezuelan equine encephalitis, Sabia virus, West Nile virus, Yellow Fever virus, causative agents of transmissible spongiform encephalopathies, Creutzfeldt-Jakob disease agent, variant Creutzfeldt-Jakob disease agent, *Candida, Cryptoccus, Cryptosporidium, Giardia lamblia,* Microsporidia, *Plasmodium vivax, Pneumocystis carinii, Toxoplasma gondii, Trichophyton mentagrophytes, Entero-cytozoon bieneusi, Cyclospora cayetanensis, Encephalitozoon hellem, Encephalitozoon cuniculi.* The coronavirus may be an avian infectious bronchitis virus, bovine coronavirus, canine coronavirus, feline infectious peritonitis virus, human coronavirus Covid19, human coronavirus 229E, human coronavirus OC43, murine hepatitis virus, porcine epidemic diarrhea virus, porcine hemagglutinating encephalomyelitis virus, porcine transmissible gastroenteritis virus, rat coronavirus, turkey coronavirus, severe acute respiratory syndrome virus (SARS virus), rabbit coronavirus, human coronavirus NL or human coronavirus NL63. The coronavirus may be SARS virus. The replicase protein may be selected from the group consisting of nsp1, nsp2, nsp3, nsp4, nsp5, nspó, nsp7, nsp8, nsp9, nsp1O, nsp11, nsp12, nsp13, nsp14, nsp15 and nsp16.

In one embodiment, smart phones can be used for contact tracing. The smart phone can detect contact as provided by a local wireless network can be a PAN, Bluetooth, or Wifi network that the phone connects to. In one embodiment, operating-system-level Bluetooth tracing would allow users to opt in to a Bluetooth-based proximity-detection scheme when they download a contact-tracing app. Their phone would then constantly ping out Bluetooth signals to others nearby while also listening for communications from nearby phones. If two phones spend more than a few minutes within range of one another, they would each record contact with the other phone, exchanging unique blockchain identifiers that can uniquely indicate whether another phone user had been diagnosed with Covid19, but not providing the identity of the phone user through SSI. Public heath app developers would be able to "tune" both the proximity and the amount of time necessary to qualify as a contact based on current information about how Covid-19 spreads.

FIG. 13 shows an exemplary contact tracing module which is a core component of a mobile device. The flowchart for tracing is as follows:

- Users are enrolled in the contact tracing system (voluntarily or by operation of law)
- Mobile devices comply with a standard to share contact tracing data with health authority
- During use, mobile devices form a mesh network that captures the ID of every phone within a predetermined radius of the user phone
- Periodically phone contact tracing data is uploaded into a blockchain with quantum proof encrypted self-sovereign identity and a contact trace list with privacy is maintained for a period of time
- Mobile device can interface with a mobile pathogen sensor accessory or built-in sensor, and can also keep track of user temperature, heart rate, breathing rate to auto detect of a pandemic or mass pathogen exposure event
- If the user tests positive for pathogen exposure, everyone in immediate contact with the user is contacted to seek medical review or treatment For example, if the user has been flagged with a test positive for pathogen exposure, the module uploads the last 14 days of anonymous "keys" to a server. Other people's phones will automatically download the key lists, and if they have a matching key in their history, they'll get an exposure notification. If users share their data as described above, the phone will check the list once a day and look for key matches, then notify its owner if it finds one and can present a message such as "You have recently been exposed to someone who has tested positive for COVID-19," and offers a link with more information. That information will be provided by a health authority is offering the app, and may explain symptoms and self-quarantine guidelines. Exposure isn't a simple binary process: the more time you've spent with an infected person, the greater the risk. The exposure duration can be measured in 5-minute intervals. Such exposure information can be to users directly, or it might offer a general risk assessment without an exact number, which would provide a greater level of anonymity.

For public emergencies, privacy can be overridden and the system can expose user identity and locations upon court order. In such cases, phone unique ID and location IDs can be obtained by police agencies for pandemic exposure analysis. In addition, in situations of child kidnapping, such system can be turned on to rapidly track the child or criminal under court supervision.

In non-emergency cases, due to the privacy issues, a blockchain-based tracing system is preferred. In one example, users sign up to a self-sovereign identity (SSI) and data platform to create and register a DID. A decentralized identifier (DID) is a pseudo-anonymous identifier for a person, company, object, etc. Each DID is secured by a private key. Only the private key owner can prove that they own or control their identity. One person can have many DIDs, which limits the extent to which they can be tracked across the multiple activities in their life. For example, a person could have one DID associated with a gaming platform, and another, entirely separate DID associated with their credit reporting platform. During this process, the user creates a pair of private and public keys. Public keys associated to a DID can be stored on-chain in case keys are compromised or are rotated for security reasons. Additional data associated with a DID such as attestations can be anchored on-chain, but the full data itself should not be stored on-chain to maintain scalability and compliance with privacy regulations. Each DID is often associated with a series of attestations (verifiable credentials) issued by other DIDs, that attest to specific characteristics of that DID (e.g., location, age, diplomas, payslips). These credentials are cryptographically signed by their issuers, which allows DID owners to store these credentials themselves instead of relying on a single profile provider (e.g., Google, Facebook). In addition, non-attested data such as browsing histories or social media posts can also be associated to DIDs by the owner or controllers of that data depending on context and intended use. Decentralized identities are secured using quantum proof cryptography. Once paired with a decentralized identity, users can present the verified identifier in the form of a QR code to prove their identity and access certain services. The service provider verifies the identity by verifying the proof of control or ownership of the presented attestation—the attestation had been associated with a DID and the user signs the presentation with the private key belonging to that DID. If they match, access is granted.

A distributed ledger is used to establish immutable recordings of lifecycle events for globally unique decentralized identifiers (DIDs). Consider the global domain name system (DNS) as an exemplar of a widely accepted public mapping utility. This hierarchical decentralized naming system maps domain names to the numerical IP addresses needed for locating and identifying computers, services or other connected devices, with the underlying network protocols. Analogous to the DNS, a SSI solution based on DIDs is compliant with the same underpinning internet standard universally unique identifiers (UUIDs) and provides the mapping of a unique identifier such as DID, to an entity—a person, organization or connected device. However, the verifiable credentials that are associated with an individual's DID and PII are never placed on a public ledger. A verifiable credential is cryptographically shared between peers at the edges of the network. The recipient of a verifiable credential, known as a verifier, in a peer to peer connection would use the associated DID as a resource locator for the sender's public verification key so that the data in the verifiable credentials can be decoded and validated.

In one embodiment, ERC 725 is used for self-sovereign identity. It facilitates an emergence of a web of trust, by relying on the claims of trusted third parties about a given identity. In order for someone to add a claim to their identity, they must first request it of a relevant trusted third party. This third party (the claim issuer) will sign a message containing three items: the identity's address, the claim topic, and optionally some data to go along with it (for example, a hash of a know-your-customer or KYC data). The identity owner would then store this claim in their identity contract (alternatively, the claim issuer can also add the claim themselves, which would have to be approved by the identity owner). Claims can also be self-attested, which can be enough for other use cases (email and name for simple applications with no strict KYC requirements, like a news website).

The mobile device can have a built-in pathogen sensor with nano-particle sensors such as those detailed in U.S. Pat. No. 9,927,391 to the instant inventor, the content of which is incorporated by reference. As disclosed therein, the sensor device includes an upper metallic layer, a lower layer, and a nano sensor array positioned between the upper and lower layers to detect a presence of a gas, a chemical, or a biological object, wherein each sensor's electrical characteristic changes when encountering the gas, chemical or biological object. In one embodiment, the sensor includes a sample detection region disposed on or within a substrate comprising an antibody or receptor, wherein a chemical agent binds to the antibody or receptor in contact with a signal generator; a microcontroller in communication with the signal generator, the microcontroller further comprising an analog to digital converter and a communication module to process the signal into an analytical signal. The antibody can be one or more high-affinity monoclonal antibodies. The chemical agent can be Covid-19, other coronavirus, or *Bacillus anthracis* (anthrax). The sensor can be integrated into a wearable item.

In one embodiment, the system provides highly selective and chemically pure biosensors that detect coronavirus with high affinity by relying on monoclonal antibody technology. The binding of the associated antibody/antigen caused by specific recognition would result in mass increase and decrease in frequency. The change of frequency reflects the presence and amount of the targets. The system provides unique domains within coronavirus as targets for generating highly sensitive antibody based detection. The system includes multiple and redundant sites to ensure positive readings and minimize false positives. In addition to coronavirus, the system with suitable modification may be used to detect bacterial spores, such as *Bacillus anthracis* (anthrax), *Clostridium tetani* (tetanus), and *Clostridium botulinum* (botulism). The system may be used to detect chemical compounds, virus, bacteria, isotopes, nucleic acids, proteins, peptides, and combinations thereof. For example, U.S. Pat. No. 7,329,536, incorporated herein by reference, discloses an apparatus comprising one or more piezoelectric mass sensors for use in diagnostic and analytic processes, in particular for immunochemical detection of diagnostically relevant analytes in real time, is described. Each piezoelectric mass sensor comprises a piezoelectric crystal with a receptor surface which has immobilized thereon a lawn of recombinant antibodies comprising single VH chain or single-chain Fv polypeptides specific for a particular antigen. Binding of antigen to the recombinant antibodies results in a change in mass on the receptor surface which is detected as a change in resonant frequency. U.S. Pat. No. 7,271,720, incorporated herein by reference, discloses nanosensors embedded in a silicon substrate and etched/fused in a micro-fibered material to enable an outfit for monitoring suspicious terrorist activities and for track biological and chemical gases, and explosives, including stationary and portable weapons of mass destruction. Detected signals are transported wirelessly through radio frequency signals to a central security monitoring station, enabling communication with first responders and backup security personnel or agents to the vicinity of the detection. The sensors are multifunctional and coded to recognize wavelike pattern of gases and explosives traveling through wave. The wired outfit and the receptor are operable to process the portion of the detection signal to determine whether there is a concealed object by conducting a test in which a first characteristic of a first dielectric constant associated with a person is determined, and a second characteristic of a second dielectric constant associated with the concealed object and or weapons of mass destruction is determined to expedite data transmission and communication to first responders. The detector may include one or more high-affinity monoclonal antibodies. Although the skilled artisan will readily understand that other antibodies, proteins, polypeptides, nucleic acids, receptors, binding agents, or other compositions that specifically bind to a specific agent. Although one embodiment includes the chemical target as *Bacillus anthracis* (anthrax), other embodiments may be for chemicals, gases, particles, and so forth. The sensor may include a detector having a plurality of sensors, each said plurality of sensors configured to enable detection of a different chemical target. These sensors may be in distinct regions or dispersed throughout the substrate.

In another embodiment, the sensor has a substrate where one or more antibodies immobilized in the substrate and configured to transmit a signal upon binding of a target, wherein the one or more antibodies comprises at least a single antibody variable heavy chain or a single-chain Fv polypeptide specific for coronavirus or another pathogen such as *Bacillus anthracis*. An antenna can send, receive or send and receive signals in the form of wife, RFID, blue tooth, RF, IR, AM, FM, light, or a combination thereof. A communication module connected to the antenna can be a MEMS, piezoelectric device, a RFID code-able chip or a combination thereof. As used herein, the term "antibody" is used in the broadest sense unless clearly indicated otherwise. Therefore, an "antibody" can be naturally occurring or man-made such as monoclonal antibodies produced by conventional hybridoma technology and antibodies comprise monoclonal and polyclonal antibodies as well as fragments containing the antigen-binding domain and/or one or more complementarity determining regions of these antibodies. As used herein, the term "antibody" refers to any form of antibody or fragment thereof that specifically binds the target and/or exhibits the desired biological activity and specifically covers monoclonal antibodies (including full length monoclonal antibodies), polyclonal antibodies, multispecific antibodies (e.g., bispecific antibodies), and antibody fragments so long as they specifically bind and/or exhibit the desired biological activity. Any specific antibody can be used in the methods and compositions provided herein. Thus, in one embodiment the term "antibody" encompasses a molecule comprising at least one variable region from a light chain immunoglobulin molecule and at least one variable region from a heavy chain molecule that form a specific binding site for the target antigen. The antibodies useful in the present methods and compositions can be generated in cell culture, in phage, or in various animals, including but not limited to cows, rabbits, goats, mice, rats, hamsters, guinea pigs, sheep, dogs, cats, monkeys, chimpanzees, apes. As used herein, the term "receptor" refers to a specific binding partner of a ligand and includes, without limitation, membrane receptors, soluble receptors, cloned receptors, recombinant receptors, hormone receptors, drug receptors, transmitter receptors, autocoid receptors, cytokine receptors, antibodies, antibody fragments, engineered antibodies, antibody mimics, molecular recognition units, adhesion molecules, agglutinins, integrins, selectins, nucleic acids and synthetic heteropolymers comprising amino acids, nucleotides, carbohydrates or nonbiologic monomers, including analogs and derivatives thereof, and conjugates or complexes formed by attaching or binding any of these molecules to a second molecule. In one embodiment, the receptor may be a lectin that binds to specific surface polysaccharides of an infectious agent.

In one embodiment, the detector can identify a subgroup of a coronavirus that allows, for instance, for early and rapid detection of an emerging coronavirus. Such detection and identification of the coronavirus from subgroup allows for rapid response and treatment/prophylaxis by employing this information in the choice of a vaccine and/or therapeutic for government not only to a contaminated subject, but to other people at risk of disease and/or in need of treatment of or protection from coronavirus infection whenever the subgroup of this coronavirus is understood. For instance, when a emerging coronavirus is detected in a couple of areas of a population, a quick determination of this subgroup of the emerging coronavirus could be made based on the processes of this invention and an proper therapeutic and/or immunogen can be treated to infected areas, as well as subjects (e.g., at precisely the exact same community or environment or population with infected subjects) at risk of disease and/or other subjects that desire or need such a healing or immunogen, throughout at the early period of detection of the emerging coronavirus, thus reducing the possibility for and likelihood of outbreak or pandemic coronavirus infection. In one implementation, a microfluidic device is used for detecting the presence of a coronavirus in a sample and identifying the subgroup of the coronavirus in the sample by contacting a sample with a panel of proteins with one or more nucleocapsid proteins from a plurality of subgroup coronavirus, under conditions whereby an antigen/antibody complex can form; and b) detecting formation of an antigen/antibody complex, whereby detection of formation of the antigen/antibody complex detects a coronavirus in the sample. The detection of formation of an antigen/antibody complex with the nucleocapsid protein(s) and identifies the subgroup of the coronavirus in the sample.

In another embodiment, coronavirus replicase proteins are detected following infection of permissive cells. The device is a microfluidic device that detects coronavirus infection of a cell by contacting a cell with a first antibody against a coronavirus replicase protein; and determining binding of said first antibody to a replicase protein, wherein binding of said first antibody identifies said cell as infected by a coronavirus. The replicase protein can be nsp1, nsp2, nsp3, nsp4, nsp5, nspβ, nsp7, nsp8, nsp9, nsp1O, nsp11, nsp12, nsp13, nsp14, nsp15 and nsp1β. The cell in step (a) maybe fixed, fixed and permeabilized, or unfixed. The cell may be comprised within in culture, and may be cultured subsequent to step (b). The cell may be derived from an animal biological sample, may be a Vero cell, a Vero E6 cell, a BHK cell or a DBT cell, or may be a cell lacks a determinant for natural coronavirus infection (or SARS-CoV), but supports viral protein expression, RNA synthesis, virus production and release. The method may further comprise delivering to said cell a wild-type or mutant coronavirus genome or an expression cassette encoding one or more coronavirus proteins. Delivering may comprise transfection or electroporation. The cell may be engineered to support coronavirus infection, such as with an ACE2 expression construct or a coronavirus receptor expression construct.

The coronavirus may be an avian infectious bronchitis virus, bovine coronavirus, canine coronavirus, feline infectious peritonitis virus, human coronavirus 229E, human coronavirus OC43, murine hepatitis virus, porcine epidemic diarrhea virus, porcine hemagglutinating encephalomyelitis virus, porcine transmissible gastroenteritis virus, rat coronavirus, turkey coronavirus, severe acute respiratory syndrome virus (SARS virus), rabbit coronavirus, human coronavirus NL or human coronavirus NL63. The coronavirus may be SARS virus. The replicase protein may be selected from the group consisting of nsp1, nsp2, nsp3, nsp4, nsp5, nsp6, nsp7, nsp8, nsp9, nsp10, nsp11, nsp12, nsp13, nsp14, nsp15 and nsp16.

The first antibody may be a monoclonal antibody or comprised within polyclonal antisera. The binding may comprise an ELISA, immunofluorescence or FACS. The first antibody may be labeled, or antibody binding may be detected binding of a second antibody to said first antibody, said second antibody being labeled. The label may be fluorophore, a chromophore, a chemilluminescent molecule or an enzyme. The first antibody may bind immunologically with multiple coronavirus species.

The production of antibodies can be done for a variety of replicase proteins from virtually any coronavirus. These antibodies will find use in a variety of different assay formats, including but not limited to ELISAs, RIAs, immunofluorescence and flow cytometry. In particular embodiments, the assays are designed to identify infections at time periods of less than 12 hr, less than 8 hr, less than six hours, and at about 4 hr. In some embodiments, the cells maybe fixed, and optionally permeabilized. In others, the cells are unfixed and remain viable following testing. The cells maybe intentionally infected, i.e., the detection may involve the screening of agents that inhibit replication following expression. These and other details of the invention are spelled out below.

Methods for detecting RNA (such as gRNA and sgRNA) are known in the art, and include, but are not limited to, Northern blot, ribonuclease protection assay, and polymerase chain reaction. In one embodiment, RNA (such as gRNA and sgRNA) is detected by Northern blot. The term "Northern blot" as used herein refers to the analysis of RNA by electrophoresis of RNA on agarose gels to fractionate the RNA according to size followed by transfer of the RNA from the gel to a solid support, such as nitrocellulose or a nylon membrane. The immobilized RNA is then probed with a labeled oligo-deoxyribonucleotide probe or DNA probe to detect RNA species complementary to the probe used. Northern blots provide information on both size and abundance of target RNA species. Northern blots are a standard tool of molecular biologists (J. Sambrook, et al. "Molecular Cloning: A Laboratory Manual," Third Edition, Publ. Cold Spring Harbor Laboratory Press, Cold Spring Harbor, N.Y.). In another embodiment, RNA (such as gRNA and sgRNA) is detected by ribonuclease protection assay. Ribonuclease protection assays are used to measure the abundance of specific RNAs and to map their topological features. The method involves hybridization of test samples to complementary radiolabeled RNA probes (riboprobes), followed by digestion of non-hybridized sequences with one or more single-strand-specific ribonucleases. At the end of the digestion, the ribonucleases are inactivated, and the protected fragments of radiolabeled RNA are analyzed by polyacrylamide gel electrophoresis and autoradiography. The ribonuclease protection assay is more sensitive than the northern blot. The method can detect several target species simultaneously, and because the intensity of the signal is directly proportional to the concentration of target RNA, comparisons of the level of expression of the target gene in different tissues can be accomplished. Methods for ribonuclease protection assay are standard in the art (J. Sambrook, et al., supra). In a further embodiment, RNA (such as gRNA and sgRNA) is detected by amplification of a target RNA sequence using reverse transcriptase polymerase chain reaction. The term "amplification" is defined as the production of additional copies of a nucleic acid sequence. The terms "reverse transcription polymerase chain reaction" and "RT-PCR" refer to a method for reverse transcription of an RNA sequence to generate a mixture of cDNA sequences, followed by increasing the concentration of a desired segment of the transcribed cDNA sequences in the mixture without cloning or purification. Typically, RNA is reverse transcribed using a one or two primers prior to PCR amplification of the desired segment of the transcribed DNA using two primers. Polymerase chain reaction technologies are well known in the art (Dieffenbach C W and G S Dveksler (1995) PCR Primer, a Laboratory Manual, Cold Spring Harbor Press, Plainview N.Y.). PCR describes a method for increasing the concentration of a segment of a target sequence in a mixture of DNA without cloning or purification. This process for amplifying the target sequence consists of introducing a large excess of two oligonucleotide primers to the DNA mixture containing the desired target sequence, followed by a precise sequence of thermal cycling in the presence of a DNA polymerase. The two primers are complementary to their respective strands of the double stranded target sequence. To effect amplification, the mixture is denatured and the primers then annealed to their complementary sequences within the target molecule. Following annealing, the primers are extended with a polymerase so as to form a new pair of complementary strands. The steps of denaturation, primer annealing and polymerase extension can be repeated many times (i.e., denaturation, annealing and extension constitute one "cycle"; there can be numerous "cycles") to obtain a high concentration of an amplified segment of the desired target sequence. The length of the amplified segment of the desired target sequence is determined by the relative positions of the primers with respect to each other, and therefore, this length is a controllable parameter. By virtue of the repeating aspect of the process, the method is referred to as the "polymerase chain reaction" (hereinafter "PCR"). Because the desired amplified segments of the target sequence become the predominant sequences (in terms of concentration) in the mixture, they are said to be "PCR amplified." With PCR, it is possible to amplify a single copy of a specific target sequence in genomic DNA to a level detectable by several different methodologies (e.g., hybridization with a labeled probe; incorporation of biotinylated primers followed by avidin-enzyme conjugate detection; and/or incorporation of 32P-labeled deoxyribonucleotide triphosphates, such as dCTP or dATP, into the amplified segment).

The power source may be in various forms and may be integrated into the substrate in some embodiments and may include a battery, a solar power system, a direct power connection, an antenna or receiver to receive power from another source or a combination thereof. The sensor may include an antenna to send, receive or send and receive signals in the form of wife, RFID, blue tooth, RF, IR, AM, FM, light, or a combination thereof and/or a GPS device. In some embodiments, the power supplied to the device may be supplied from an external source. The communication module may be a micro-electronic mechanical system (MEMS), piezoelectric device, a RFID code-able chip or a combination thereof and may transmit and/or receive analog signals, digital signals or both to a remote control center. The remote control center may be local or at a distant location or may be integrated into a wearable item, button, clothing, garment, belt, or other garment or integrated into a larger device.

The system can work as CT security scanner with the usual metal detector, a CT scanning component, a collimator (hidden by the housing), and a pathogen sensor as detailed above and the moving platform. The system includes an X-ray tube and a detector array which are disposed on diametrically opposite sides of the platform. The detector array is preferably a two-dimensional array. The system further includes a data acquisition system (DAS) for receiving and processing signals generated by detector array, and an X-ray tube control system for supplying power to, and otherwise controlling the operation of X-ray tube. A computerized system (not shown) for processing the output of the data acquisition system and for generating the necessary signals for operating and controlling the system with a monitor for displaying information including generated images. System also includes shields, which may be fabricated from lead, for example, for preventing radiation from propagating beyond gantry. The X-ray tube includes at least one cathode and one anode for creating at least one separate focal spot from which an X-ray beam can be created and generated. The passes through a three dimensional imaging field. The detector array then generates signals representative of the densities of exposed portions of the body. Platform rotates about its rotation axis, thereby transporting X-ray source and detector array in circular trajectories so as to generate a plurality of projections at a corresponding plurality of projection angles. The scanner includes a single energy source of X-rays, and that the scanner is capable of providing full volume 3-D CT images for multiple slices per rotation at small slice spacing. As mentioned above, dual energy CT scanners have been developed to reduce the false alarm rate of the automatic threat detection by providing atomic number measurements of scanned objects in addition to density measurements, but the costs associated with implementing dual energy in any one of the manners described above is relatively expensive. Again, each of the above-referenced implementations requires a special design. In addition, these implementation schemes are not suitable for upgrading existing single energy CT scanners, particularly of interest to security applications, to obtain dual energy imaging capability in order to reduce the false alarm rate from the automatic threat detection system. The system can be used to inspect a person. The procedure of inspecting a person includes the following steps:

1. The person passes through a metal detector frame.
2. The metal detector detects metallic objects on or inside the person and automatically determines vertical limits of suspicious areas (this is generally done, for example, by using multiple magnetic coils and, with the vertical dimension being divided into some number of areas— e.g., 3 or more) detecting which coil is experiencing a change in magnetic parameters), also highlighting them for visual display to an operator. As another possibility, there may be multiple metallic objects detected on the body, and the entire body needs scanning.
3. In case there are any metallic objects on or inside the person's body, the system identifies vertical coordinates of the area(s) that may contain the metallic objects that have been detected. The window(s) to be scanned are limited vertically, based on the registered coordinates of the area of the person's body, where the metallic object has been detected. This is done to reduce X-ray exposure. The scanning mode (including scanning time, X-ray tube current and voltage) is selected based on the scanned window. This is done to maximize image quality while minimizing X-ray exposure. For instance, smaller doses of radiation are required when scanning legs than when scanning the abdominal cavity. Therefore, if an illegal object has been detected on or inside a person's leg, X-ray exposure can be greatly reduced.
3. The pathogen sensor 108 indicates possible pathogen, and the system adds the lung areas to the localized window to be scanned to identify possible infections.
4. The localized window is scanned with an X-ray beam, producing an X-ray image.

One embodiment uses computed tomography (CT) in diagnosis and monitoring of the infection. As shown in FIG. 4E, the presence of bilateral nodular and peripheral ground glass opacities and consolidation should serve as an alert to radiologists that COVID-19 may actually be present in certain patients. In radiologic terms, 'ground glass' means that a hazy lung opacity shows up on imaging that is not dense enough to obscure any underlying pulmonary vessels or bronchial walls. While consolidation, on the other hand, refers to dense opacities obscuring vessels and bronchial walls. Since ground glass opacities are common in COVID-19, chest CT scans are preferred over chest radiographs, which may have limited sensitivity in picking up early changes within the lungs. Chest CT scans can be helpful in suggesting the diagnosis for a patient and also, for monitoring patient responses. Some patients who tested positive for COVID-19 were either asymptomatic or had minimal symptoms. And while the reference standard for making the diagnosis is a real-time reverse transcription polymerase chain reaction (RT-PCR) test, false negative results can occur. An abnormal chest CT scan can predate a positive RT-PCR, highlighting the important role of CT in the management of these patients.

In one embodiment, the neural network is trained to detect the following:
(1) presence of ground-glass opacities;
(2) presence of consolidation;
(3) number of lobes affected by ground-glass or consolidative opacities;
(4) degree of lobe involvement in addition to overall lung "total severity score;"
(5) presence of nodules;
(6) presence of a pleural effusion;
(7) presence of thoracic lymphadenopathy (lymph nodes of abnormal size or morphology); and
(8) presence of underlying lung disease such as emphysema or fibrosis. Any other thoracic abnormalities were also noted.

Once detected using the above system, the user and exposed people as detected by the mobile tracing system can be isolated and treated by administering a neurotransmitter inhibitor, a signaling kinase inhibitor, an estrogen receptor inhibitor, a DNA metabolism inhibitor or an anti-parasitic agent. In one embodiment, the user is isolated in an isolation chamber and treated by administering a therapeutically effective amount of a neurotransmitter inhibitor. Preferably, a representative coronavirus which may be treated using this method include but are not limited to Middle East respiratory syndrome coronavirus or severe acute respiratory syndrome coronavirus.

A person having ordinary skill in this art would readily be able to determine useful concentrations of the neurotransmitter inhibitor that would result in a formulation useful to inhibit or treat a coronavirus infection. In one embodiment, the neurotransmitter inhibitor is a dopamine receptor antagonist. Representative examples of useful neurotransmitter inhibitors include but are not limited to chlorpromazine hydrochloride, triflupromazine hydrochloride, clomipramine hydrochloride, thiethylperazine maleate, chlorphenoxamine hydrochloride, promethazine hydrochloride, fluphenazine hydrochloride, thiothixene, fluspirilene, and benztropine mesylate. Preferably, the neurotransmitter inhibitor inhibits viral activity by at least 50%. Typically, the neurotransmitter inhibitor is administered in a concentration range of about 1 mg/kg of the subject's body weight to about 10 mg/kg per day. In one embodiment, the method further comprises the administration of an antiviral drug. Representative examples of useful antiviral drugs include but are not limited to interferons, ribavirin, adefovir, tenofovir, acyclovir, brivudin, cidofovir, fomivirsen, foscarnet, ganciclovir, penciclovir, amantadine, rimantadine, and zanamivir.

In another embodiment the treatment includes administering a therapeutically effective amount of a kinase signaling inhibitor. A representative coronavirus which may be treated using this method include but are not limited to Middle East respiratory syndrome coronavirus or severe acute respiratory syndrome coronavirus. Representative examples of useful kinase signalling inhibitors include but are not limited to imatinib mesylate, nilotinib hydrochlorde, and dasatinib. Preferably, the kinase signaling inhibitor inhibits viral activity by at least 50%. Typically, the kinase signaling inhibitor is administered in a concentration range of about 50 mg/kg of the subject's body weight to about 500 mg/kg per day. In a preferred embodiment, the kinase signaling inhibitor inhibits viral RNA production and/or blocks endosomal fusion. In one embodiment, the method further comprises the administration of an antiviral drug. Representative examples of useful antiviral drugs include but are not limited to interferons, ribavirin, adefovir, tenofovir, acyclovir, brivudin, cidofovir, fomivirsen, foscarnet, ganciclovir, penciclovir, amantadine, rimantadine, and zanamivir.

In yet another embodiment the treatment includes administering a therapeutically effective amount of an estrogen receptor inhibitor, anti-parasitic agent or DNA metabolism inhibitor. A representative coronavirus which may be treated using this method include but are not limited to Middle East respiratory syndrome coronavirus or severe acute respiratory syndrome coronavirus. Representative examples of useful estrogen receptor inhibitors include but are not limited to toremifene citrate and tamoxifen citrate. Representative examples of useful anti-parasitic agents include but are not limited to chloroquine phosphate, hydroxycloroquine sulfate, mefloquine and amodiaquine dihydrochloride dihydrate. A representative example of a useful DNA metabolism inhibitor includes but is not limited to gemcitabine hydrochloride. Typically, the anti-parasitic drug is administered in a concentration range of about 1 mg/kg of the subject's body weight to about 10 mg/kg per day. In one embodiment, the method further comprises the administration of an antiviral drug. Representative examples of useful antiviral drugs include but are not limited to interferons, ribavirin, adefovir, tenofovir, acyclovir, brivudin, cidofovir, fomivirsen, foscarnet, ganciclovir, penciclovir, amantadine, rimantadine, and zanamivir.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Finally, synthetic genome design provides a strategy to prepare recombinant viruses that allow for therapeutic evaluation and testing of antiviral compounds against future emerging CoVs.

All publications, patent applications, patents and other references cited herein are incorporated by reference in their entireties for the teachings relevant to the sentence and/or paragraph in which the reference is presented.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the application and design constraints imposed on the overall system. The described functionality can be implemented in varying ways for each application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A certification authority can be or include a microprocessor, but in the alternative, the certification authority can be or include a controller, microcontroller, or state machine, combinations of the same, or the like configured to receive, process, and display item data and distributed ledger information for the item. A certification authority can include electrical circuitry configured to process computer-executable instructions. Although described herein primarily with respect to digital technology, a certification authority may also include primarily analog components. For example, some or all of the distributed ledger and certification algorithms described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A method to manage air quality in a space, comprising:
a processor;
sensors to collect air flow data, energy consumption data, and air quality data in the outdoor air dampers to control an outdoor air exchange rate;
a fan to control an air changes per hour (ACH);
an air damper to control an outdoor air fraction (OAF); and
code executed by the processor to:
 receive air quality data from related building zones;
 receive at one or more predetermined intervals at least one of government environmental and health data;
 calculate an indoor contamination level and an outdoor contamination level by determining the number of particulate matters at or below 2.5 microns, fan speed data, damper position data, the air quality data from the related building zones, the government data, the air flow data, the energy consumption data, and the air quality data; and
 when indoor contamination level is at or above 15 micrograms, mitigate health risk of an occupant of the space by:
  when outdoor contamination level is at or below a low threshold of 15 micrograms, increase the OAF with the air damper;
  when outdoor contamination level is above the low threshold and below a moderate threshold of 40 micrograms, decrease OAF with the air damper and linearly increase the ACH with the fan;
  when indoor contamination level exceeds the outdoor contamination level, increase the ACH with the fan and OAF with the air damper; and
  when the indoor contamination and the outdoor contamination are above a high threshold, increase the ACH with the fan and linearly decrease the OAF with the air damper.

2. The system of claim 1, wherein the space comprises a commercial building, a floor of the building, a house, or a room, further comprising using future third-party forecasted air quality conditions to predictively control air quality.

3. The system of claim 1, comprising code for quantifying relationships between exposure to indoor contaminants and the health of the building occupants.

4. The system of claim 1, comprising code for generating indoor air contaminant risk-mitigation control strategies based on data from a community in geometric proximity or a neighborhood.

5. The system of claim 1, comprising code for modeling airflow patterns for a ventilation system to determine placement of air quality sensors at predetermined air locations.

6. The system of claim 1, comprising code for assessing energy consumption.

7. The system of claim 1, comprising code for maintaining a predetermined pressure in each space.

8. The system of claim 1, comprising code for adjusting (OAF) or (ACH) based on Outdoor and Indoor air contaminants informed by an acceptable risk threshold.

9. The system of claim 1, comprising code for adjusting flow and ACH based on occupants and public health infection risks.

10. The system of claim 1, comprising code for determining a risk of viral transmission through aerosols using zone or HVAC data and public positivity rates and a risk profile.

11. The system of claim 1, comprising code for controlling the air management system to isolate and evacuate indoor air contaminants based on indoor air quality sensors.

12. The system of claim 1, comprising code for monitoring zone health, initiating local control commands and sending notifications via email.

13. The system of claim 1, comprising code for adjusting air flow in response to a COVID event or community health event.

14. The system of claim 1, comprising code for applying machine learning to control the air management system based on updated sensor, environmental and public health data.

15. A system to manage air quality in a space, comprising:
one or more sensors positioned in the space;
an air management system;
a processor coupled to the one or more sensors and air management system with code for:
receive air quality data from related building zones;
receive at one or more predetermined intervals at least one of government environmental and health data;
calculate an indoor contamination level and an outdoor contamination level by determining the number of particulate matters at or below 2.5 microns, fan speed data, damper position data, the air quality data from the related building zones, the government data, the air flow data, the energy consumption data, and the air quality data; and when indoor contamination level is at or above 15 micrograms, mitigate health risk of an occupant of the space by:
- when outdoor contamination level is at or below a low threshold of 15 micrograms, increase the OAF with the air damper;
- when outdoor contamination level is above the low threshold and below a moderate threshold of 40 micrograms, decrease OAF with the air damper and linearly increase the ACH with the fan;
- when indoor contamination level exceeds the outdoor contamination level, increase the ACH with the fan and OAF with the air damper; and
- when the indoor contamination and the outdoor contamination are above a high threshold, increase the ACH with the fan and linearly decrease the OAF with the air damper.

16. The system of claim 15, wherein the space comprises a commercial building, a floor of the building, a house, or a room.

17. The system of claim 15, comprising code for quantifying relationships between exposure to indoor contaminants and the health of the building occupants.

18. The system of claim 15, comprising code for generating indoor air contaminant risk-mitigation control strategies for building HVAC equipment.

19. The system of claim 15, comprising neural network code for learning about air quality.

20. The system of claim 19, comprising a server with code for processing energy consumption or efficiency data, wherein the neural network receives airflow data from sensors in the space, and optimizes fan speed for air quality when the air quality is below a threshold, and otherwise manages the fan for energy efficiency.

* * * * *